United States Patent
Haga et al.

(10) Patent No.: US 7,843,887 B2
(45) Date of Patent: Nov. 30, 2010

(54) MOBILE STATION DEVICE AND COMMUNICATION PARTNER SELECTION METHOD

(75) Inventors: Hiroki Haga, Kanagawa (JP); Masayuki Hoshino, Osaka (JP); Katsuhiko Hiramatsu, Osaka (JP); Atsushi Sumasu, Osaka (JP)

(73) Assignee: Panasonic Corporation, Osaka (JP)

( * ) Notice: Subject to any disclaimer, the term of this patent is extended or adjusted under 35 U.S.C. 154(b) by 882 days.

(21) Appl. No.: 11/718,371

(22) PCT Filed: Nov. 1, 2005

(86) PCT No.: PCT/JP2005/020127

§ 371 (c)(1),
(2), (4) Date: May 1, 2007

(87) PCT Pub. No.: WO2006/049177

PCT Pub. Date: May 11, 2006

(65) Prior Publication Data

US 2008/0008130 A1    Jan. 10, 2008

(30) Foreign Application Priority Data

| Nov. 2, 2004 | (JP) | ............................. 2004-319478 |
| Nov. 9, 2004 | (JP) | ............................. 2004-325230 |
| Nov. 9, 2004 | (JP) | ............................. 2004-325231 |
| Jan. 17, 2005 | (JP) | ............................. 2005-008652 |

(51) Int. Cl.
*H04W 4/00* (2009.01)
*H04W 36/00* (2009.01)
*H04W 72/00* (2009.01)

(52) U.S. Cl. ...................... 370/332; 370/334; 370/331; 455/436; 455/437; 455/452.2

(58) Field of Classification Search ................. 370/331, 370/332, 334, 339; 455/436, 437, 452.1, 455/452.2
See application file for complete search history.

(56) References Cited

U.S. PATENT DOCUMENTS 6,980,833 B1    12/2005    Hiramatsu (Continued)

FOREIGN PATENT DOCUMENTS

CN    1288617    3/2001

(Continued)

OTHER PUBLICATIONS

PCT International Search Report dated Jan. 24, 2006 w/ English translation.

(Continued)

*Primary Examiner*—Un C Cho
(74) *Attorney, Agent, or Firm*—Dickinson Wright PLLC

(57) ABSTRACT

It is possible to surely improve the throughput in a handover area in the MIMO communication and increase the cell coverage. Channel estimation units (104-1, 104-2) perform a channel estimation by using a common pilot signal transmitted from each base station device and acquire a channel matrix for each cell. Singular value decomposition processing units (105-1, 105-2) perform singular value decomposition processing by using a channel matrix corresponding to each cell. Channel capacity calculation units (106-1, 106-2) compare a singular value for each path to a threshold value and calculate the number of singular values above a predetermined threshold value as the channel capacity. A cell selection unit (107) compares the channel capacity sizes and selects a base station device corresponding to a greater channel capacity.

6 Claims, 31 Drawing Sheets

U.S. PATENT DOCUMENTS

| | | | |
|---|---|---|---|
| 7,184,791 B2 * | 2/2007 | Nilsson et al. | 455/522 |
| 7,423,994 B2 * | 9/2008 | Liu et al. | 370/331 |
| 7,639,660 B2 * | 12/2009 | Kim et al. | 370/343 |
| 2002/0119799 A1 | 8/2002 | Moulsley et al. | |
| 2002/0187753 A1 | 12/2002 | Kim | |
| 2003/0036385 A1 | 2/2003 | Uehara | |
| 2003/0185309 A1 | 10/2003 | Pautler | |
| 2005/0007982 A1 | 1/2005 | Miyoshi | |
| 2005/0083888 A1 * | 4/2005 | Smee et al. | 370/332 |
| 2005/0181831 A1 | 8/2005 | Doi | |

FOREIGN PATENT DOCUMENTS

| | | |
|---|---|---|
| CN | 1387327 | 12/2002 |
| CN | 1406447 | 3/2003 |
| CN | 1502180 | 6/2004 |
| JP | 2003264869 | 9/2003 |
| JP | 2004064654 | 2/2004 |
| WO | 02067603 | 8/2002 |
| WO | 02082689 | 10/2002 |
| WO | 03081806 | 10/2003 |

OTHER PUBLICATIONS

3GPP TR 25.848 v4.0.0. "Physical layer aspects of UTRA High Speed Downlink Packet Access" (section 6.4), Mar. 2001, pp. 14-16.

Chinese Office Action dated Dec. 11, 2009.

* cited by examiner

MOBILE STATION DEVICE AND COMMUNICATION PARTNER SELECTION METHOD

TECHNICAL FIELD

The present invention relates to a mobile station apparatus and communicating party selection method, and more particularly to a mobile station apparatus and communicating party selection method whereby a communicating party is selected in a system to which MIMO (Multiple Input Multiple Output) communication is applied.

BACKGROUND ART

In recent years, there has been investigation into performing Fast Cell Selection (FCS) whereby, when a mobile station apparatus is located in an area near the boundaries of a plurality of cells or sectors (hereinafter referred to as a "handover area"), a base station apparatus or antenna constituting a communicating party is switched over at high speed in a short time cycle, such as a slot, for example, in response to instantaneous reception level fluctuation (see Non-patent Document 1, for example).

FIG. 1A is a drawing showing an example of a base station apparatus selection operation by means of FCS. As shown in this figure, a mobile station apparatus 10 is switching its communicating party between a base station apparatus 20 and a base station apparatus 30 in order from first slot 40.

To be specific, mobile station apparatus 10 receives common pilot channel signals (hereinafter referred to as "common pilot signals") transmitted from base station apparatus 20 and base station apparatus 30, and measures the reception SIR (Signal to Interference Ratio). The results of this measurement are shown in FIG. 1B. In this figure, the solid line shows the reception SIR of the signal from base station apparatus 20, and the dotted line shows the reception SIR of the signal from base station apparatus 30.

Then mobile station apparatus 10 selects the base station apparatus whose reception SIR is larger on a slot-by-slot basis, and transmits information relating to the selected base station apparatus to base station apparatus 20 and base station apparatus 30. The slot-by-slot selected base station apparatus in this case is shown by a solid line (that is, base station apparatus 20) or dotted line (that is, base station apparatus 30) at the bottom of FIG. 1B.

Base station apparatus 20 and base station apparatus 30 receive information relating to the selected base station apparatus from mobile station apparatus 10, and the slot-by-slot selected base station apparatus transmits a dedicated channel, high-speed packet channel, or suchlike data signal (hereinafter referred to as "dedicated data signal") in the slots indicated by hatching in FIG. 1A.

Having mobile station apparatus 10 located in a handover area switch the selected base station apparatus in a short time cycle such as a slot in this way enables mobile station apparatus 10 reception quality and throughput to be improved.

Also, Patent Document 1, for example, describes a technology whereby base station apparatuses report the amount of traffic, and a mobile station apparatus located in a handover area switches the selected base station apparatus based on the amount of traffic reported from each base station apparatus.

Non-patent Document 1: "Physical layer aspects of UTRA High Speed Downlink Packet Access" (section 6.4), 3GPP TR25.848 V4.4.0 (2001-03)

Patent Document 1: Unexamined Japanese Patent Publication No. 2003-264869

DISCLOSURE OF INVENTION

Problems to be Solved by the Invention

However, in MIMO communication in which different data sequences are transmitted simultaneously from a plurality of antennas, it is not necessarily possible to improve reception quality and throughput even if selected base station apparatus switching is performed by means of FCS as described above.

That is to say, in MIMO communication in which signals are transmitted using a plurality of paths with low mutual correlation, since the signals of all paths are mixed in a received signal, signals on different paths may be mutually destructive or constructive. There is thus a problem in that reception quality and throughput may not be improved if a base station apparatus is selected based simply on the reception SIR of a received signal or the amount of traffic. Also, if an improvement in reception quality or throughput cannot be achieved, the distance from a base station apparatus at which target throughput can be attained does not increase, and as a result, enlargement of the area covered by each base station apparatus (hereinafter referred to as "cell coverage") is difficult.

It is an object of the present invention to provide a mobile station apparatus and communicating party selection method that enable throughput in a handover area to be dependably improved, and cell coverage to be enlarged, in MIMO communication.

Means for Solving the Problems

A mobile station apparatus according to the present invention selects a communicating party in a mobile communication system to which MIMO communication is applied, and employs a configuration that includes: a receiving section that receives signals transmitted from a plurality of communicating party candidates; an acquisition section that acquires channel capacity per communicating party candidate indicating the reception quality or number of paths whereby the signals are propagated using a received signal; and a selection section that selects the communicating party candidate whose acquired channel capacity is largest as a communicating party.

A communicating party selection method according to the present invention selects a communicating party in a mobile communication system to which MIMO communication is applied, and includes: a receiving step of receiving signals transmitted from a plurality of communicating party candidates; an acquisition step of acquiring channel capacity per communicating party candidate indicating the reception quality or number of paths whereby the signals are propagated using a received signal; and a selection step of selecting the communicating party candidate whose acquired channel capacity is largest as a communicating party.

According to the above mobile station apparatus and communicating party selection method, since a base station apparatus or antenna corresponding to a cell or sector for which channel capacity indicating the path reception quality or number of paths is greatest is selected as a communicating party using a received signal, communication is performed with a base station apparatus or antenna for which quality or quantity per independent path is high, and it is possible for spatially multiplexed signals to be accurately separated in a mobile station apparatus. Therefore, throughput in a handover area can be dependably improved, and cell coverage can be enlarged, in MIMO communication.

ADVANTAGEOUS EFFECT OF THE INVENTION

The present invention enables throughput in a handover area to be dependably improved, and cell coverage to be enlarged, in MIMO communication.

BEST MODE FOR CARRYING OUT THE INVENTION

Embodiments of the present invention will now be described in detail with reference to the accompanying drawings.

A characteristic of Embodiments 1 through 4 described below is that a mobile station apparatus can select a base station apparatus or antenna of a cell or sector in which there are many mutually independent paths that can be used for MIMO communication.

Embodiment 1

Figure 1A:
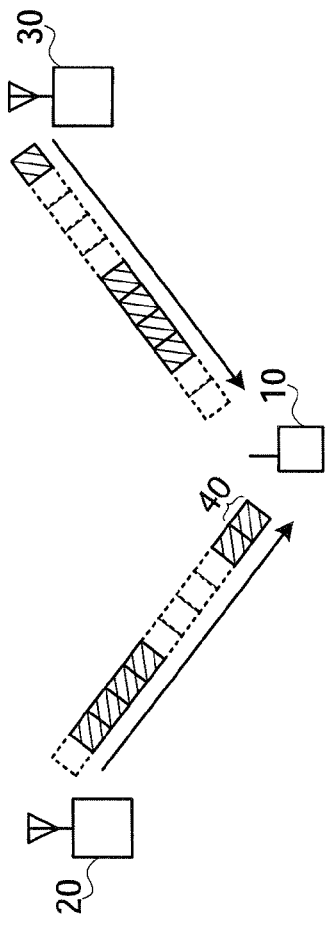
FIG. 1A is a drawing showing an example of a base station apparatus selection operation by means of FCS.
Figure 1B:
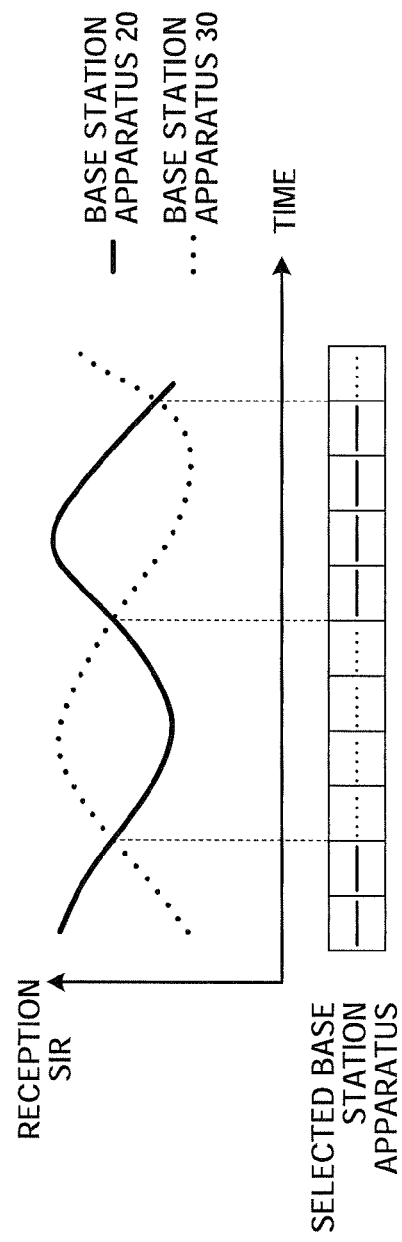
FIG. 1B is a drawing showing an example of reception SIR measurement results.
Figure 2:
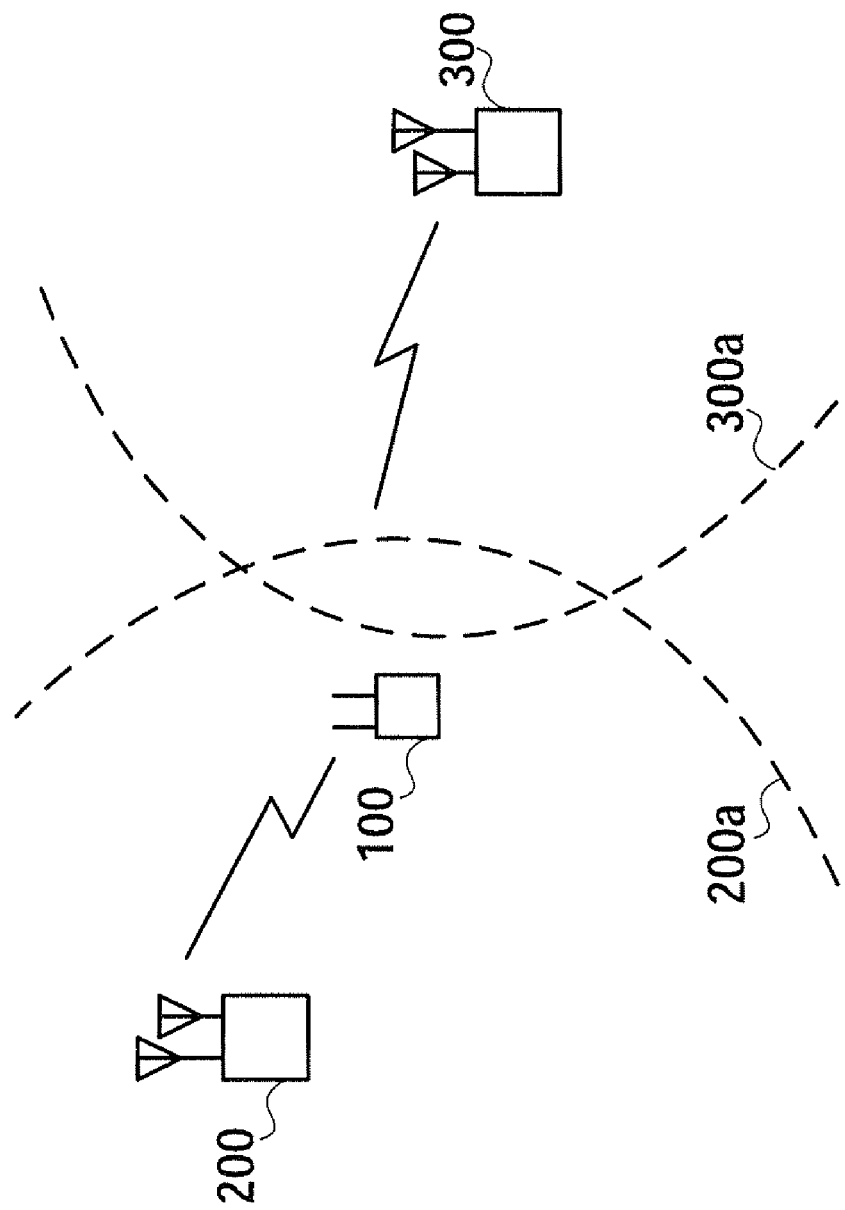
FIG. 2 is a drawing showing an example of a mobile communication system according to Embodiments 1 through 4 of the present invention.

FIG. 2 is a drawing showing an example of the configuration of a mobile communication system according to Embodiments 1 through 4 of the present invention. As shown in this figure, a mobile station apparatus 100 located in an area near the boundaries of a cell 200a covered by a base station apparatus 200 and a cell 300a covered by a base station apparatus 300 (a handover area) receives common pilot signals transmitted from both base station apparatus 200 and base station apparatus 300, which are communicating party candidates. Mobile station apparatus 100 switches to either base station apparatus 200 or base station apparatus 300 as the communicating party at short time-unit intervals, such as slot-by-slot, for example.

Figure 3:
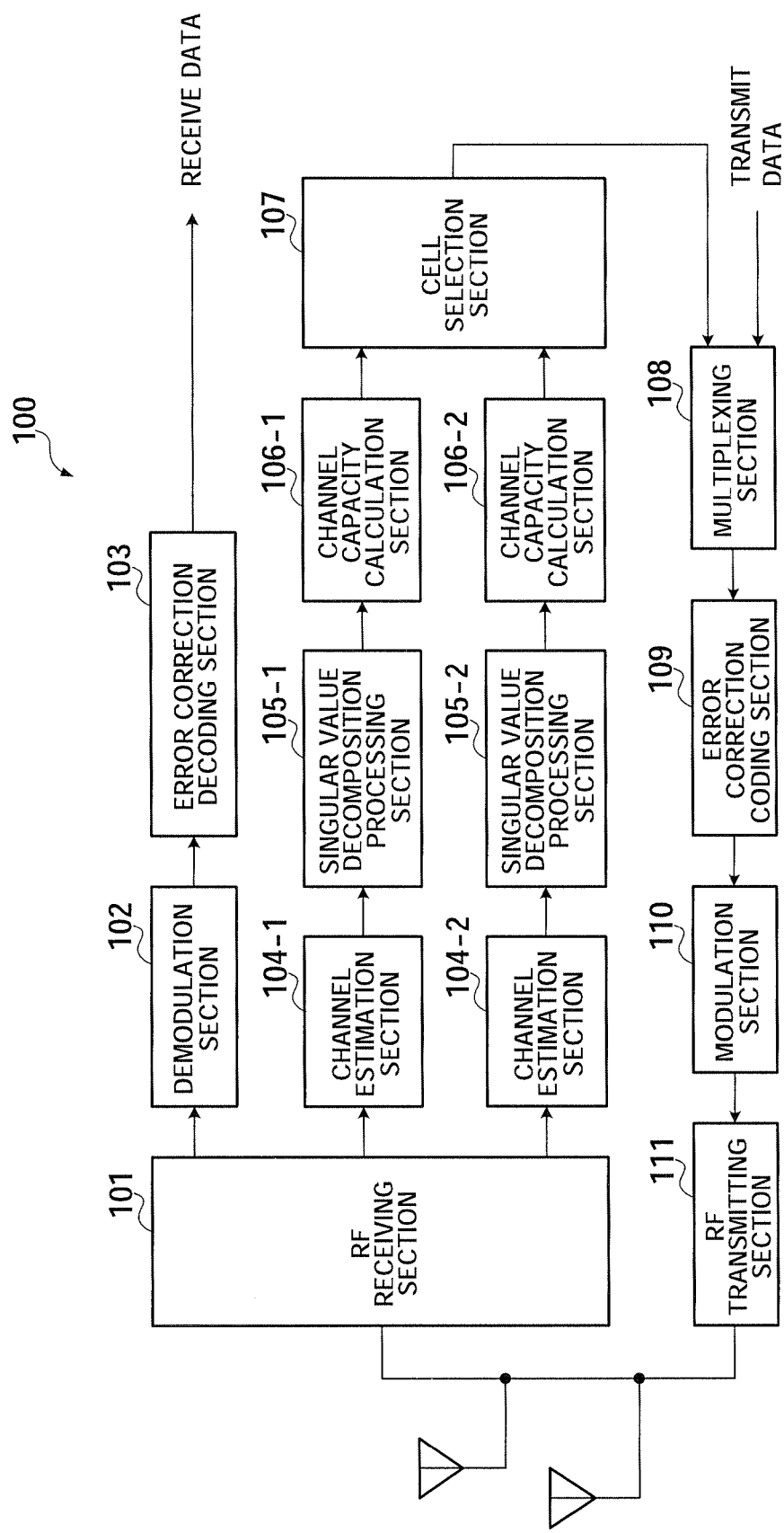
FIG. 3 is a block diagram showing the principal-part configuration of a mobile station apparatus according to Embodiment 1 of the present invention.

FIG. 3 is a block diagram showing the principal-part configuration of mobile station apparatus 100 according to this embodiment. Mobile station apparatus 100 shown in FIG. 3 has an RF (Radio Frequency) receiving section 101, a demodulation section 102, an error correction decoding section 103, channel estimation sections 104-1 and 104-2, singular value decomposition processing sections 105-1 and 105-2, channel capacity calculation sections 106-1 and 106-2, a cell selection section 107, a multiplexing section 108, an error correction coding section 109, a modulation section 110, and an RF transmitting section 111. In this embodiment, since mobile station apparatus 100 is assumed to be located near the boundaries of two cells, cell 200a and cell 300a, it has two of each processing section from the channel estimation section to the channel capacity calculation section for two communicating-party-candidate base station apparatuses. Therefore, in a case in which a mobile station apparatus is assumed to be located near the boundaries of three or more cells, one each of the above processing sections should be provided for each of the three or more communicating-party-candidate base station apparatuses.

RF receiving section 101 executes radio reception processing (down-conversion, A/D conversion, and so forth) on a signal received via a plurality of antennas, performs MIMO reception processing (spatial separation, and so forth) on a dedicated data signal transmitted from the selected base station apparatus and outputs the resulting signal to demodulation section 102, and also outputs a common pilot signal transmitted from base station apparatus 200 to channel estimation section 104-1, and outputs a common pilot signal transmitted from base station apparatus 300 to channel estimation section 104-2.

Demodulation section 102 demodulates the dedicated data signal, and outputs the obtained demodulated signal to error correction decoding section 103.

Error correction decoding section 103 performs error correction decoding on the demodulated signal, and outputs receive data.

Channel estimation sections 104-1 and 104-2 perform channel estimation for each path between the plurality of antennas using the common pilot signals transmitted from base station apparatus 200 and base station apparatus 300 respectively. If the number of mobile station apparatus 100 (receiving-side) antennas is designated $M_R$, and the number of base station apparatus 200 and base station apparatus 300 (transmitting-side) antennas is designated $M_T (\geqq M_R)$, a channel matrix A of size $M_R \times M_T$ is obtained as the channel estimation result. That is to say, if a base station apparatus transmit signal vector is designated x (t), and a propagation path noise signal vector is designated n(t), mobile station apparatus 100 received signal vector r (t) can be expressed as shown in Equation (1) below using channel matrix A.

[1]

$$r(t)=A \times (t)+n(t) \quad (1)$$

Channel estimation sections 104-1 and 104-2 find a channel matrix A that satisfies Equation (1) for cell 200a and cell 300a corresponding to base station apparatus 200 and base station apparatus 300 respectively. The number of base station apparatus 200 antennas and the number of base station apparatus 300 antennas may be different, but here, for the sake of explanation, it is assumed that both base station apparatuses have $M_T$ antennas.

Singular value decomposition processing sections 105-1 and 105-2 perform singular value decomposition processing for base station apparatus 200 and base station apparatus 300 respectively using channel matrixes A corresponding to the respective cells. Here, singular values are indicators showing the reception quality of independent paths in MIMO communication. Specifically, singular value decomposition processing sections 105-1 and 105-2 calculate a singular value by means of Equation (2) below.

[2]

$$A^H A = U \Lambda U^H \quad (2)$$

where, $\Lambda = \mathrm{diag}(\lambda_1, \ldots, \lambda_{M_R})$

In Equation (2) above, $A^H$ indicates a transposed conjugate of channel matrix A, U indicates a unitary matrix obtained by aligning eigenvectors, and $U^H$ indicates a transposed conjugate of unitary matrix U. Also, diag( ) indicates a diagonal matrix, and in Equation (2), $M_R$ singular values $\lambda_1$ through $\lambda_{M_R}$ appear in the diagonal component of matrix $\Lambda$. As it is here assumed that $M_T \geqq M_R$, $M_R$ singular values are found, whereas if $M_T < M_R$, $M_T$ singular values are found.

Channel capacity calculation sections 106-1 and 106-2 compare singular values $\lambda_1$ through $\lambda_{M_R}$ obtained by singular value decomposition processing sections 105-1 and 105-2 respectively with a predetermined threshold value, and calculate the number of singular values greater than or equal to the predetermined threshold value as the channel capacity. As stated above, singular values are indicators showing the reception quality of independent paths in MIMO communication. In MIMO communication, the larger the number of paths with high reception quality, the more accurately signals transmitted simultaneously from a plurality of antennas can be separated, and therefore the larger the number of singular values greater than or equal to the predetermined threshold value, the higher is the throughput. Channel capacity calculation sections 106-1 and 106-2 report their calculated channel capacities (that is, the numbers of singular values greater than or equal to the predetermined threshold value) to cell selection section 107.

Cell selection section 107 performs a size comparison of the channel capacities reported from channel capacity calculation sections 106-1 and 106-2, and takes the base station apparatus with the larger channel capacity as the selected base station apparatus. Then cell selection section 107 outputs selection information relating to the selected base station apparatus to multiplexing section 108.

Multiplexing section 108 multiplexes the selection information and transmit data, and outputs the obtained multiplexed data to error correction coding section 109.

Error correction coding section 109 performs error correction coding on the multiplexed data, and outputs the obtained error correction coded data to modulation section 110.

Modulation section 110 modulates the error correction coded data, and outputs the obtained modulated data to RF transmitting section 111.

RF transmitting section 111 performs MIMO transmission processing (such as spatial multiplexing) on the modulated data, executes predetermined radio transmission processing (such as D/A conversion and up-conversion), and then transmits a signal via the antennas.

A base station apparatus selection operation by mobile station apparatus 100 configured as described above will now be explained, referring to the sequence diagram shown in FIG. 4.

Figure 4:
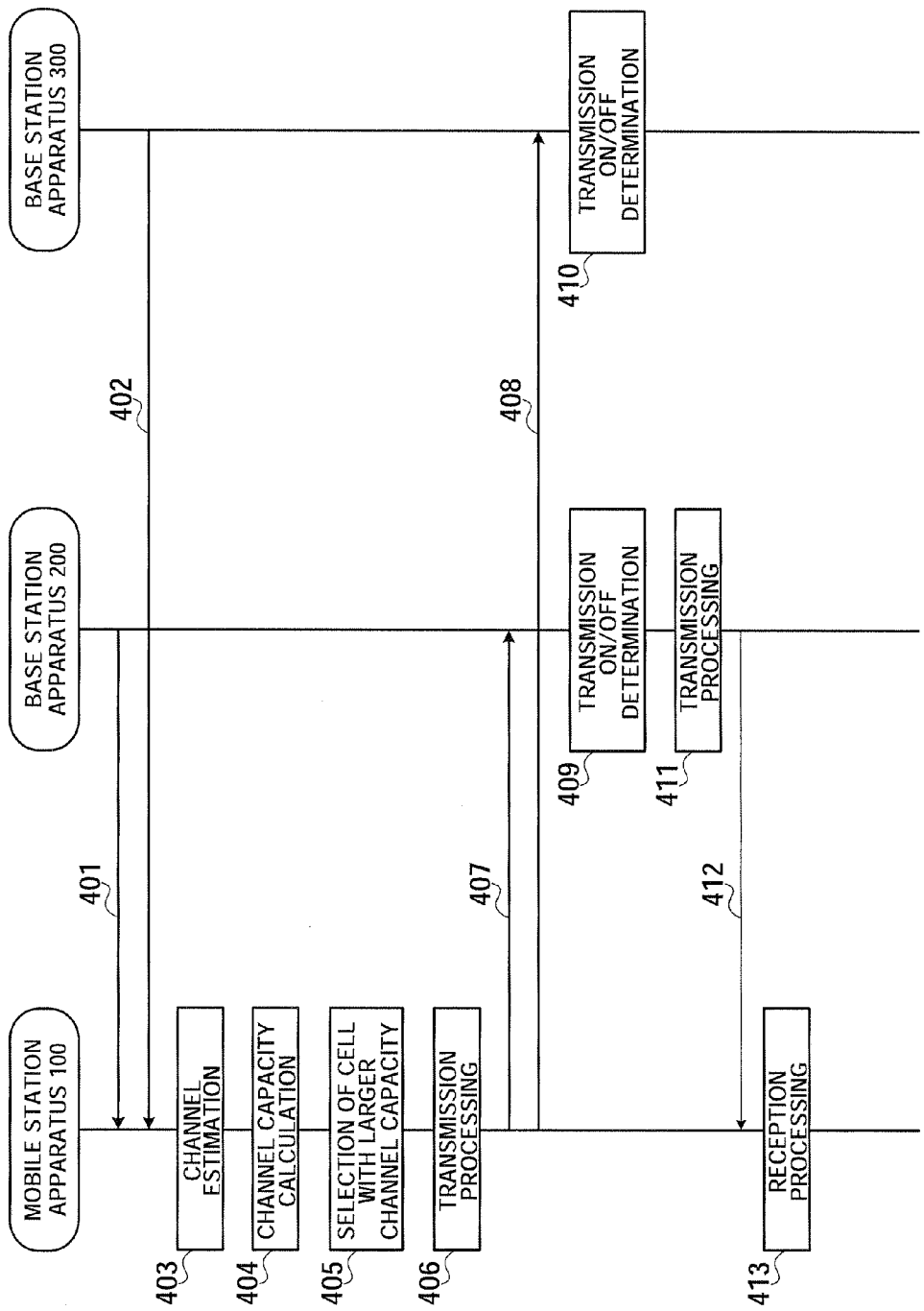
FIG. 4 is a sequence diagram showing a base station apparatus selection operation by a mobile station apparatus according to Embodiment 1.

First, as shown in FIG. 4, a common pilot signal 401 is transmitted from base station apparatus 200, and a common pilot signal 402 is similarly transmitted from base station apparatus 300. These common pilot signals 401 and 402 are received by RF receiving section 101 via the antennas of mobile station apparatus 100. Received common pilot signals 401 and 402 undergo predetermined radio reception processing (such as down-conversion and A/D conversion) by RF receiving section 101, after which common pilot signal 401 is output to channel estimation section 104-1, and common pilot signal 402 is output to channel estimation section 104-2.

Then channel estimation is performed by channel estimation sections 104-1 and 104-2 (403), and channel matrixes A of cell 200a and cell 300a corresponding respectively to base station apparatus 200 and base station apparatus 300 are found. The obtained channel matrixes A of cell 200a and cell 300a are output to singular value decomposition processing sections 105-1 and 105-2, and the pluralities of singular values in the respective cells are calculated using Equation (2) above. As described above, the number of singular values calculated is the same as the number of receiving-side (that is, base station apparatus 200 and base station apparatus 300) antennas or the number of receiving-side (that is, mobile station apparatus 100) antennas, whichever is smaller.

Then the pluralities of singular values are each compared with a predetermined threshold value by channel capacity calculation sections 106-1 and 106-2, the numbers of singular values greater than or equal to the predetermined threshold value are calculated as the channel capacities of cell 200a and cell 300a respectively (404). As described above, singular values are indicators showing the reception quality of independent paths in MIMO communication, and the larger the number of comparatively high singular values, the more accurately signals spatially multiplexed on the transmitting side can be separated on the receiving side. That is to say, a cell with a large number of singular values greater than or equal to the predetermined threshold value—in other words, a cell with a large channel capacity—has higher throughput when MIMO communication is performed.

The channel capacities of cell 200a and cell 300a calculated by channel capacity calculation sections 106-1 and 106-2 are output to cell selection section 107, and the cell corresponding to the larger channel capacity is selected (405). By this means, the selected base station apparatus that is to be the mobile station apparatus 100 communicating party is determined. Selection information relating to the selected base station apparatus is then output to multiplexing section 108.

Determination of the selected base station apparatus by means of singular value decomposition and channel capacity calculation as described above is performed in a short time cycle such as a slot, for example. Therefore, even in MIMO communication, it is possible to respond to propagation environment fluctuations, and always make a base station apparatus with a higher throughput the selected base station apparatus. Therefore, the distance from a base station apparatus at which target throughput can be attained can be extended to the maximum, and cell coverage can be enlarged.

Selection information is multiplexed with transmit data by multiplexing section 108, undergoes error correction coding by error correction coding section 109, and is modulated by modulation section 110. Then, the modulated data undergoes MIMO transmission processing (such as spatial multiplexing) by RF transmitting section 111, and is transmitted after undergoing predetermined radio transmission processing (such as D/A conversion and up-conversion) (406). In FIG. 4, selection information 407 is transmitted to base station apparatus 200, and selection information 408 is transmitted to base station apparatus 300. The contents of selection information 407 and selection information 408 are the same, reporting which base station apparatus has become the selected base station apparatus. It will be assumed here that base station apparatus 200 has become the selected base station apparatus.

By means of selection information 407 and selection information 408 respectively, base station apparatus 200 and base station apparatus 300 can each determine whether that station is the selected base station apparatus. Then base station apparatus 200 that has become the selected base station apparatus determines that it is to transmit data to mobile station apparatus 100 (409), and transmits a dedicated data signal 412 to mobile station apparatus 100 after performing predetermined transmission processing (411). Meanwhile, base station apparatus 300 that has not become the selected base station apparatus does not perform data transmission to mobile station apparatus 100 (410). The dedicated data signal transmitted from base station apparatus 200 undergoes reception processing by RF receiving section 101, demodulation section 102, and error correction decoding section 103 in mobile station apparatus 100 (413), and receive data is obtained.

Base station apparatus 200 and base station apparatus 300 may also transmit selection information 407 and selection information 408 to a higher-level control station, which combines selection information transmitted from each base station apparatus, and directs the selected base station apparatus (here, base station apparatus 200) to perform data transmission.

Thus, according to this embodiment, singular value decomposition processing is performed using common pilot signals transmitted from a plurality of base station apparatuses in a short time cycle, and taking the number of singular values greater than or equal to a predetermined threshold value as channel capacity, the base station apparatus with the largest channel capacity is made the selected base station apparatus. Consequently, a mobile station apparatus can always make a base station apparatus with a higher throughput its communicating party, and throughput in a handover area can be dependably improved, and cell coverage enlarged, in MIMO communication.

Embodiment 2

A characteristic of Embodiment 2 is that, in contrast to Embodiment 1, singular value decomposition processing is not performed, a determinant is used as channel capacity, and a base station apparatus is selected according to determinant size.

The configuration of a mobile communication system according to this embodiment is the same as that of the mobile communication system shown in FIG. 2, and therefore a description thereof is omitted.

Figure 5:
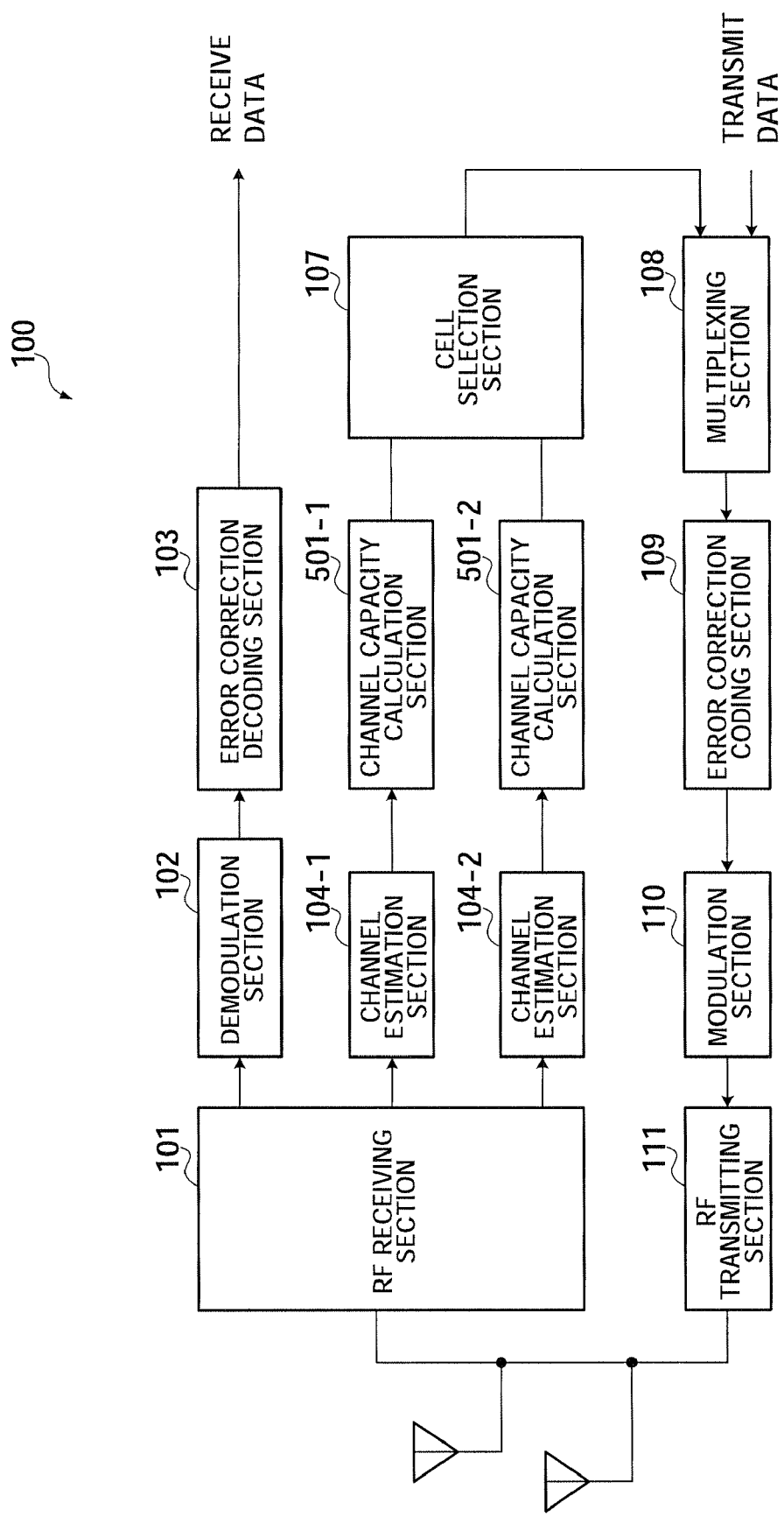
FIG. 5 is a block diagram showing the principal-part configuration of a mobile station apparatus according to Embodiment 2 of the present invention.

FIG. 5 is a block diagram showing the principal-part configuration of a mobile station apparatus 100 according to this embodiment. Parts in FIG. 5 identical to those in FIG. 3 are assigned the same codes as in FIG. 3, and descriptions thereof are omitted. Mobile station apparatus 100 shown in FIG. 5 has a configuration in which singular value decomposition processing sections 105-1 and 105-2 are eliminated from mobile station apparatus 100 shown in FIG. 3, and channel capacity calculation sections 106-1 and 106-2 are replaced by channel capacity calculation sections 501-1 and 501-2.

Channel capacity calculation section 501-2 calculate channel capacities for base station apparatus 200 and base station apparatus 300 by means of Equation (3) below using channel matrixes A corresponding to the respective cells.

[3]

$$C = \log_2 \det\left(I_{M_R} + \frac{Y}{M_T} AA^H\right) \quad (3)$$

where, $Y = CNR$ (Carrier to Noise Ratio)

In Equation (3) above, det( ) indicates a determinant, and $I_{M_R}$ indicates a unit matrix of size $M_R \times M_R$. Channel capacity C found by means of Equation (3) is a scalar quantity, and is a numeric value that is higher the larger the number of independent paths with high reception quality in MIMO communication. Therefore, the larger the value of channel capacity C, the higher is the throughput. Channel capacity calculation sections 501-1 and 501-2 report calculated channel capacity C to cell selection section 107.

Then, as in Embodiment 1, cell selection section 107 performs a size comparison of the channel capacities, and takes the base station apparatus with the larger channel capacity as the selected base station apparatus.

In this embodiment, since singular value decomposition processing and so forth is not performed, and scalar-quantity channel capacities are calculated from channel matrixes A, the amount of computation is decreased compared with Embodiment 1, and a reduction in mobile station apparatus power consumption can be achieved.

Thus, according to this embodiment, scalar-quantity channel capacities are calculated using common pilot signals transmitted from a plurality of base station apparatuses in a short time cycle, and the base station apparatus with the largest channel capacity is made the selected base station apparatus. Consequently, a mobile station apparatus can make a base station apparatus with a higher throughput its communicating party, while reducing the amount of computation and power consumption.

By performing Embodiment 2 channel capacity comparison when a mobile station apparatus is waiting to communicate (in idle mode), the selected base station apparatus with which communication will be performed when communication starts can be determined in advance without increasing the processing load. Also, after communication starts, the accuracy of selected base station apparatus determination may be improved by switching to Embodiment 1 channel capacity comparison.

Embodiment 3

A characteristic of Embodiment 3 is that singular value decomposition processing is not performed, a number of paths is used as channel capacity, and a base station apparatus is selected according to a comparison of numbers of paths.

The configuration of a mobile communication system according to this embodiment is the same as that of the mobile communication system shown in FIG. 2, and therefore a description thereof is omitted.

Figure 6:
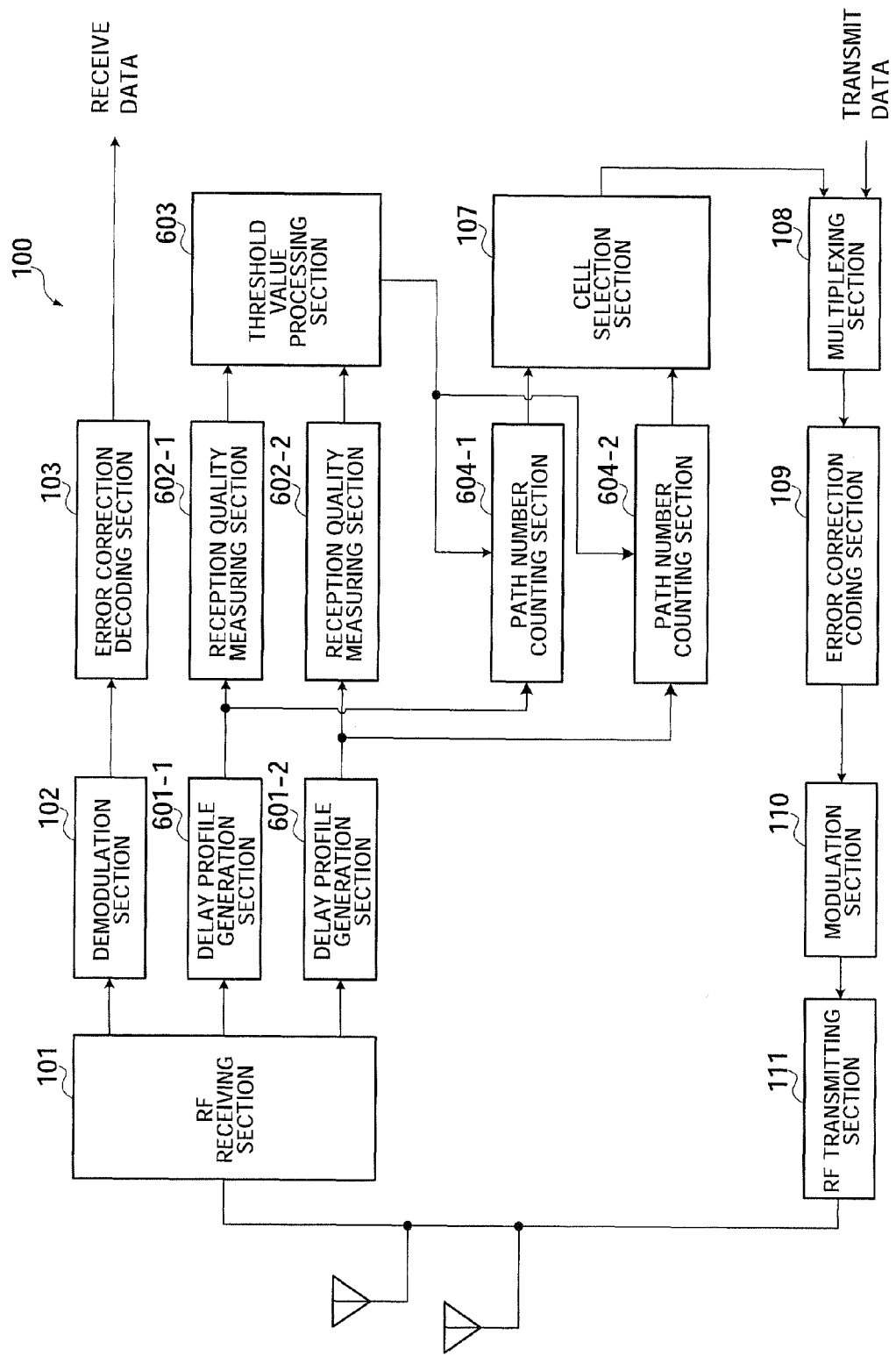
FIG. 6 is a block diagram showing the principal-part configuration of a mobile station apparatus according to Embodiment 3 of the present invention.

FIG. 6 is a block diagram showing the principal-part configuration of a mobile station apparatus 100 according to this embodiment. Parts in FIG. 6 identical to those in FIG. 3 are assigned the same codes as in FIG. 3, and descriptions thereof are omitted. Mobile station apparatus 100 shown in FIG. 6 has an RF receiving section 101, a demodulation section 102, an error correction decoding section 103, delay profile generation sections 601-1 and 601-2, reception quality measuring sections 602-1 and 602-2, a threshold value processing section 603, path number counting sections 604-1 and 604-2, a cell selection section 107, a multiplexing section 108, an error correction coding section 109, a modulation section 110, and an RF transmitting section 111.

Using common pilot signals transmitted from base station apparatus 200 and base station apparatus 300, delay profile generation sections 601-1 and 601-2 generate a delay profile for each base station apparatus. Specifically, when communication is performed by means of CDMA (Code Division Multiple Access), for example, delay profile generation sections 601-1 and 601-2 measure the arrival timing of a direct wave and a delayed wave at the mobile station apparatus by despreading received signals by means of the unique spreading codes of base station apparatus 200 and base station apparatus 300 respectively, and generating a delay profile showing the timing of paths corresponding to the direct wave and delayed wave.

Reception quality measuring sections 602-1 and 602-2 measure the reception quality (SIR or the like, for example) of common pilot signals transmitted from base station apparatus 200 and base station apparatus 300 respectively.

Threshold value processing section 603 compares the reception qualities measured by reception quality measuring sections 602-1 and 602-2 with a predetermined threshold value, and reports a base station apparatus corresponding to a reception quality greater than or equal to the predetermined threshold value to path number counting sections 604-1 and 604-2. For example, if only the reception quality of a common pilot signal transmitted from base station apparatus 200 is greater than or equal to the predetermined threshold value, that fact is reported to path number counting sections 604-1 and 604-2.

Path number counting sections 604-1 and 604-2 refer to the delay profiles, and count the number of paths corresponding to a base station apparatus whose reception quality is greater than or equal to the predetermined threshold value. That is to say, if, for example, only the reception quality of a common pilot signal transmitted from base station apparatus 200 is greater than or equal to the predetermined threshold value, path number counting section 604-1 alone counts the number of paths corresponding to base station apparatus 200, and path number counting section 604-2 does not count the number of paths corresponding to base station apparatus 300.

In this embodiment, the numbers of paths counted by path number counting sections 604-1 and 604-2 are taken as channel capacities. That is to say, in MIMO communication, the larger the number of independent paths, the greater is the possibility of being able to separate signals transmitted simultaneously from a plurality of antennas, and therefore the number of paths per cell can be used as a value indicating MIMO communication channel capacity.

Also, even if the number of paths is large, it becomes impossible to separate signals accurately if the reception quality of each path is poor, and therefore in this embodiment only the number of paths corresponding to a base station apparatus whose reception quality is greater than or equal to a predetermined threshold value is counted.

Then, as in Embodiment 1, cell selection section 107 performs a size comparison of the channel capacities (that is, the numbers of paths), and takes the base station apparatus with the larger channel capacity as the selected base station apparatus.

A base station apparatus selection operation by mobile station apparatus 100 configured as described above will now be explained, referring to the sequence diagram shown in FIG. 7. Parts in FIG. 7 identical to those in FIG. 4 are assigned the same codes as in FIG. 4, and detailed descriptions thereof are omitted.

Figure 7:
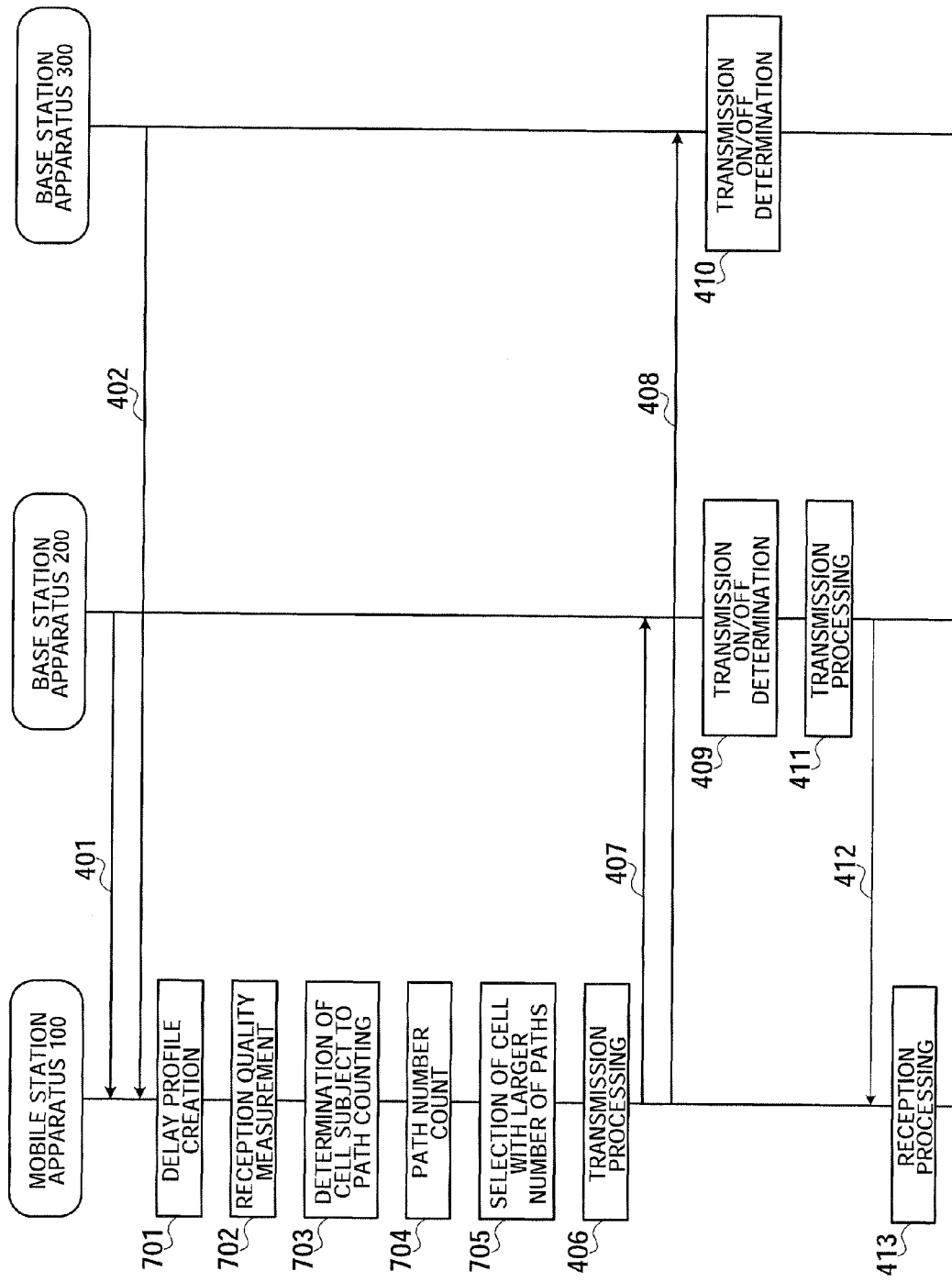
FIG. 7 is a sequence diagram showing a base station apparatus selection operation by a mobile station apparatus according to Embodiment 3.

First, as shown in FIG. 7, common pilot signals 401 and 402 are transmitted from base station apparatus 200 and base station apparatus 300 respectively. These common pilot signals 401 and 402 are received by RF receiving section 101 via the antennas of mobile station apparatus 100. Received common pilot signals 401 and 402 undergo predetermined radio reception processing (such as down-conversion and A/D conversion) by RF receiving section 101, after which common pilot signal 401 is output to delay profile generation section 601-1, and common pilot signal 402 is output to delay profile generation section 601-2.

Then delay profiles of cell 200a and cell 300a corresponding to base station apparatus 200 and base station apparatus 300 respectively are generated by delay profile generation sections 601-1 and 601-2 (701). The generated delay profiles are output to path number counting sections 604-1 and 604-2 respectively.

Meanwhile, after delay profile generation, the common pilot signals are output to reception quality measuring sections 602-1 and 602-2, and reception qualities corresponding to base station apparatus 200 and base station apparatus 300 respectively are measured (702). The measured channel qualities are output to threshold value processing section 603, and are compared with a predetermined threshold value. As a result, the cell of a base station apparatus corresponding to a reception quality greater than or equal to the predetermined threshold value is determined to be a cell whose number of paths is to be counted (703). Then the base station apparatus whose reception quality is greater than or equal to the predetermined threshold value is reported to path number counting sections 604-1 and 604-2.

On receiving this report, only a path number counting section corresponding to the base station apparatus whose reception quality is greater than or equal to the predetermined threshold value operates, the delay profiles are referred to by path number counting sections 604-1 and 604-2, and the number of paths of a cell corresponding to a base station apparatus whose reception quality is greater than or equal to the predetermined threshold value is counted. For example, if only the reception quality of a common pilot signal transmitted from base station apparatus 200 is greater than or equal to the predetermined threshold value, only path number counting section 604-1 operates, the delay profile generated by delay profile generation section 601-1 is referred to, and the number of paths in cell 200a is counted.

The numbers of paths counted by path number counting sections 604-1 and 604-2 are output to cell selection section 107 as the channel capacities of each cell, and the cell corresponding to the larger channel capacity is selected (705). By this means, the selected base station apparatus that is to be the mobile station apparatus 100 communicating party is determined. Selection information relating to the selected base station apparatus is then output to multiplexing section 108.

Determination of the selected base station apparatus by means of delay profile generation and path number counting as described above is performed in a short time cycle such as a slot, for example. Therefore, even in MIMO communication, it is possible to respond to propagation environment fluctuations, and always make a base station apparatus with a higher throughput the selected base station apparatus. Also, in this embodiment, since singular value decomposition processing and so forth is not performed, and a number of paths counted from a delay profile is used as channel capacity, the amount of processing is decreased compared with Embodiment 1, and a reduction in mobile station apparatus power consumption can be achieved.

Thereafter, as in Embodiment 1, selection information is transmitted to base station apparatus 200 and base station apparatus 300, and dedicated data signal 412 is transmitted only from the base station apparatus with the larger channel capacity (that is, number of paths) (in FIG. 7, base station apparatus 200).

Thus, according to this embodiment, delay profiles are generated for each cell using common pilot signals transmitted from a plurality of base station apparatuses in a short time cycle, the number of paths in each cell is counted and taken as the cell channel capacity, and the base station apparatus with the largest channel capacity is made the selected base station apparatus. Consequently, a mobile station apparatus can always make a base station apparatus with a higher throughput its communicating party, while reducing power consumption by means of simple processing.

Embodiment 4

A characteristic of Embodiment 4 is that channel capacity or reception quality is selected according to information as to whether or not a base station apparatus performs MIMO communication, and a base station apparatus is selected using either the selected channel capacity or reception quality.

The configuration of a mobile communication system according to this embodiment is the same as that of the mobile communication system shown in FIG. 2, and therefore a description thereof is omitted. However, in this embodiment, base station apparatus 200 and base station apparatus 300 transmit MIMO application/non-application information indicating whether they perform MIMO communication. Base station apparatus 200 and base station apparatus 300 have a plurality of antennas, but depending on the propagation environment, may perform not MIMO communication in which a different signal is transmitted simultaneously from each antenna, but diversity communication in which the same signal is transmitted simultaneously from each antenna. Thus, base station apparatus 200 and base station apparatus 300 of this embodiment transmit MIMO application/non-application information using a broadcast channel or the like.

Figure 8:
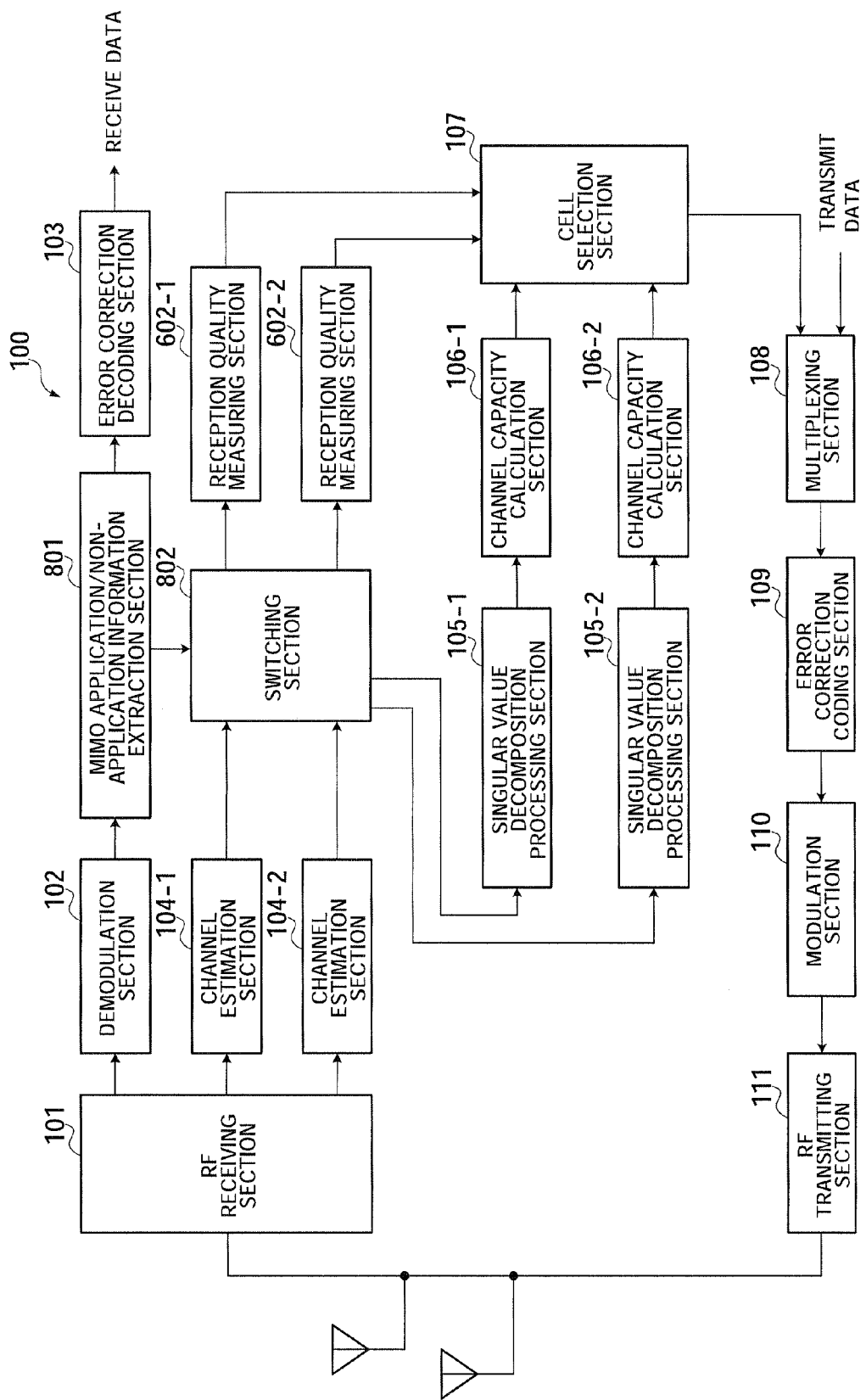
FIG. 8 is a block diagram showing the principal-part configuration of a mobile station apparatus according to Embodiment 4 of the present invention.

FIG. 8 is a block diagram showing the principal-part configuration of a mobile station apparatus 100 according to this embodiment. Parts in FIG. 8 identical to those in FIG. 3 and FIG. 6 are assigned the same codes as in FIG. 3 and FIG. 6, and descriptions thereof are omitted. Mobile station apparatus 100 shown in FIG. 8 has an RF receiving section 101, a demodulation section 102, a MIMO application/non-application information extraction section 801, an error correction decoding section 103, channel estimation sections 104-1 and 104-2, a switching section 802, reception quality measuring sections 602-1 and 602-2, a threshold value processing section 603, singular value decomposition processing sections 105-1 and 105-2, channel capacity calculation sections 106-1 and 106-2, a cell selection section 107, a multiplexing section 108, an error correction coding section 109, a modulation section 110, and an RF transmitting section 111.

MIMO application/non-application information extraction section 801 extracts MIMO application/non-application information transmitted from base station apparatus 200 and base station apparatus 300, indicating whether or not each base station apparatus performs MIMO communication, from a received signal. Then MIMO application/non-application information extraction section 801 informs switching section 802 as to whether or not base station apparatus 200 and base station apparatus 300 perform MIMO communication.

Switching section 802 switches the output destination of signals from channel estimation sections 104-1 and 104-2 according to whether or not base station apparatus 200 and base station apparatus 300 apply MIMO communication. Specifically, if base station apparatus 200 and base station apparatus 300 both perform MIMO communication, switching section 802 outputs channel matrixes corresponding to the respective cells to singular value decomposition processing sections 105-1 and 105-2, whereas if at least one or other of base station apparatus 200 and base station apparatus 300 does not perform MIMO communication, switching section 802 outputs received signals after channel estimation corresponding to the respective cells to reception quality measuring sections 602-1 and 602-2.

Then cell selection section 107 performs a size comparison of the channel capacities in the same way as in Embodiment 1 if base station apparatus 200 and base station apparatus 300 both perform MIMO communication, or performs a size comparison of the reception qualities if at least one or other of base station apparatus 200 and base station apparatus 300 does not perform MIMO communication, and takes the base station apparatus with the higher channel capacity or reception quality as the selected base station apparatus.

A base station apparatus selection operation by mobile station apparatus 100 configured as described above will now be explained, referring to the sequence diagram shown in FIG. 9. Parts in FIG. 9 identical to those in FIG. 4 are assigned the same codes as in FIG. 4, and detailed descriptions thereof are omitted.

Figure 9:
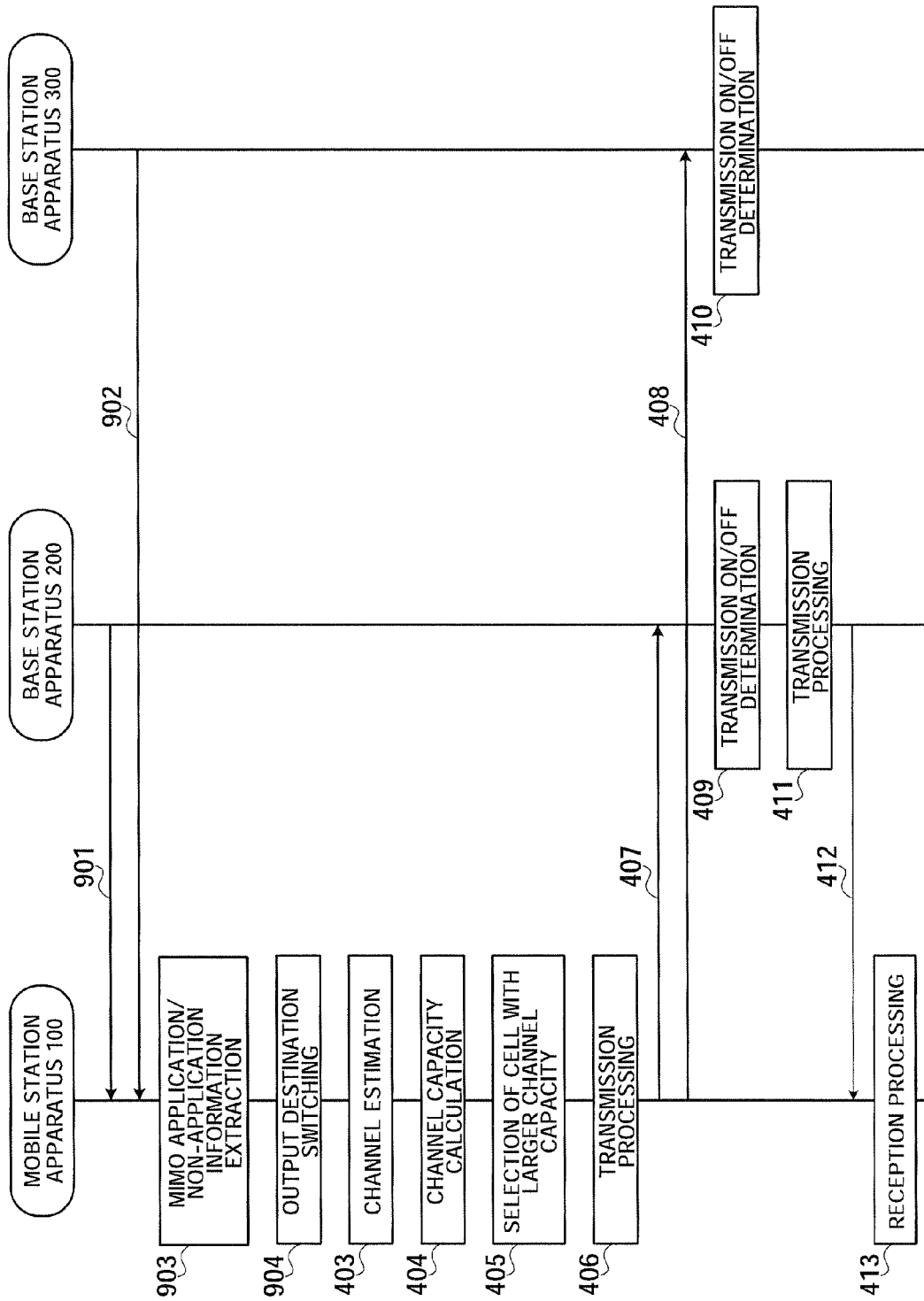
FIG. 9 is a sequence diagram showing a base station apparatus selection operation by a mobile station apparatus according to Embodiment 4.

First, as shown in FIG. 9, notification signals 901 and 902 containing MIMO application/non-application information are transmitted from base station apparatus 200 and base station apparatus 300. These notification signals 901 and 902 are received by RF receiving section 101 via the antennas of mobile station apparatus 100. Received notification signals 901 and 902 undergo predetermined radio reception processing (such as down-conversion and A/D conversion) by RF receiving section 101 and are output to demodulation section 102, and at the same time notification signal 901 is output to channel estimation section 104-1, and notification signal 902 is output to channel estimation section 104-2.

Then notification signals 901 and 902 are demodulated by demodulation section 102, and MIMO application/non-application information for base station apparatus 200 and base station apparatus 300 respectively is extracted by MIMO application/non-application information extraction section 801 (903). Based on the extracted MIMO application/non-application information, MIMO application/non-application information extraction section 801 informs switching section 802 as to whether or not base station apparatus 200 and base station apparatus 300 respectively perform MIMO communication.

The output destinations of signals input to switching section 802 are then switched by switching section 802 (904). That is to say, if base station apparatus 200 and base station apparatus 300 both perform MIMO communication, the output destinations become singular value decomposition processing sections 105-1 and 105-2, whereas if at least one or other of base station apparatus 200 and base station apparatus 300 does not perform MIMO communication but performs diversity communication or the like, the output destinations become reception quality measuring sections 602-1 and 602-2.

By this means, if there is even one base station apparatus that does not perform MIMO communication, reception quality corresponding to each base station apparatus is measured, and cell selection can be executed at high speed when singular value calculation is not necessary.

Meanwhile, in the same way as in Embodiment 1, channel estimation is performed by channel estimation sections 104-1 and 104-2 (403), and channel matrixes A of cell 200a and cell 300a are found. The obtained channel matrixes A of cell 200a and cell 300a, and received signals after channel estimation, are input to switching section 802. At this time, the switching section 802 output destinations are either singular value decomposition processing sections 105-1 and 105-2 or reception quality measuring sections 602-1 and 602-2, and either channel matrixes A are output from switching section 802 to singular value decomposition processing sections 105-1 and 105-2, or else received signals after channel estimation are output from switching section 802 to reception quality measuring sections 602-1 and 602-2. It will be assumed here that the output destinations have been switched to singular value decomposition processing sections 105-1 and 105-2 by switching section 802.

Equation (2) above is applied to channel matrixes A of cell 200a and cell 300a output from switching section 802 to singular value decomposition processing sections 105-1 and 105-2, and the pluralities of singular values in the respective cells are calculated. Then the numbers of singular values greater than or equal to a predetermined threshold value are calculated by channel capacity calculation sections 106-1 and 106-2 as the channel capacities of cell 200a and cell 300a respectively (404). Thereafter, as in Embodiment 1, the cell with the largest channel capacity is selected by cell selection section 107, and transmission processing is performed by the selected base station apparatus.

If the output destinations are switched to reception quality measuring sections 602-1 and 602-2 by switching section 802, reception qualities corresponding to cell 200a and cell 300a respectively are measured by channel capacity calculation sections 106-1 and 106-2, and the cell with the highest reception quality is selected by cell selection section 107.

Thus, according to this embodiment, either channel capacity or reception quality is selected according to information as to whether or not a base station apparatus performs MIMO communication, and the base station apparatus with the highest selected channel capacity or reception quality is made the selected base station apparatus. Consequently, a mobile station apparatus can perform cell selection dependably and at high speed even when there is a base station apparatus that does not perform MIMO communication.

In above Embodiments 1 through 4, an operation to select a base station apparatus that becomes a communicating party has been described, but the present invention can also be applied to a case in which one base station apparatus covers a plurality of sectors. That is to say, when a mobile station apparatus is located near a sector boundary, an antenna corresponding to the sector with the largest channel capacity should be selected.

Also, in above Embodiments 1 through 4, selection of a base station apparatus that becomes a communicating party in a short time cycle such as a slot has been described, but it is evident that the present invention can also be applied to normal handover.

A mobile station apparatus according to a first aspect of Embodiments 1 through 4 selects a communicating party in a mobile communication system to which MIMO communication is applied, and employs a configuration that includes: a receiving section that receives signals transmitted from a plurality of communicating party candidates; an acquisition section that acquires channel capacity per communicating party candidate indicating the reception quality or number of paths whereby the signals are propagated using a received signal; and a selection section that selects the communicating party candidate whose acquired channel capacity is largest as a communicating party.

According to this configuration, since a base station apparatus or antenna corresponding to a cell or sector for which channel capacity indicating the path reception quality or number of paths is largest is selected as a communicating party using a received signal, communication is performed with a base station apparatus or antenna for which quality or quantity per independent path is high, and it is possible for spatially multiplexed signals to be accurately separated in a mobile station apparatus. Therefore, throughput in a handover area can be dependably improved, and cell coverage can be enlarged, in MIMO communication.

A mobile station apparatus according to a second aspect of Embodiments 1 through 4 employs a configuration wherein, in the above-described first aspect, the acquisition section has: a channel estimation section that performs channel estimation per communicating party candidate using a received signal; a singular value decomposition processing section that calculates a singular value indicating reception quality per path from channel estimation results; and a channel capacity calculation section that calculates the number of singular values greater than or equal to a predetermined threshold value among the calculated singular values per path as channel capacity per communicating party candidate.

According to this configuration, since singular values per path are calculated from channel estimation results per communicating party candidate, and the number of singular values greater than or equal to a predetermined threshold value is taken as channel capacity per communicating party candidate, the channel quality of each path is found individually, and a base station apparatus or antenna for which the number of paths with high reception quality is large is made the communicating party, and a base station apparatus or antenna that enables throughput to be improved can be selected accurately.

A mobile station apparatus according to a third aspect of Embodiments 1 through 4 employs a configuration wherein, in the above-described first aspect, the acquisition section has: a channel estimation section that performs channel estimation per communicating party candidate using a received signal; and a channel capacity calculation section that calculates a determinant of a matrix based on a channel matrix obtained by means of channel estimation as channel capacity per communicating party candidate.

According to this configuration, since a determinant is calculated using a channel matrix per communicating party candidate, and the calculated determinant is taken as the channel capacity of each base station apparatus or antenna, it is not necessary to perform singular value decomposition processing, the amount of computation is decreased, and a reduction in mobile station apparatus power consumption can be achieved.

A mobile station apparatus according to a fourth aspect of Embodiments 1 through 4 employs a configuration wherein, in the above-described third aspect, the acquisition section, during a wait to communicate, calculates a determinant of a matrix based on the channel matrix as channel capacity per communicating party candidate, and after communication starts, calculates singular values per path from channel estimation results and takes the number of singular values greater than or equal to a predetermined threshold value as channel capacity per communicating party candidate.

According to this configuration, since a determinant is taken as channel capacity while waiting to communicate, and channel capacity is calculated by means of singular value decomposition processing after communication starts, a selected base station apparatus or communicating party antenna can be determined in advance without increasing the processing load while waiting to communicate, and the accuracy of selected base station apparatus or communicating party antenna determination can be improved after communication starts.

A mobile station apparatus according to a fifth aspect of Embodiments 1 through 4 employs a configuration wherein, in the above-described first aspect, the acquisition section has: a delay profile generation section that generates a delay profile per communicating party candidate using a received signal; and a path number counting section that refers to a generated delay profile and counts the number of paths corresponding to each communicating party candidate as channel capacity per communicating party candidate.

According to this configuration, since a delay profile per communicating party candidate is referred to and the number of paths corresponding to each communicating party candidate is taken as channel capacity per communicating party candidate, it is not necessary to perform singular value decomposition processing, a selected base station apparatus or communicating party antenna can be determined by means of simple processing, and a reduction in mobile station apparatus power consumption can be achieved.

A mobile station apparatus according to a sixth aspect of Embodiments 1 through 4 employs a configuration wherein, in the above-described fifth aspect, the acquisition section further has a reception quality measuring section that measures reception quality per communicating party candidate using a received signal; and the path number counting section counts the number of paths corresponding to only a communicating party candidate whose measured reception quality is greater than or equal to a predetermined threshold value.

According to this configuration, since only the number of paths corresponding to a communicating party candidate whose measured reception quality is greater than or equal to a predetermined threshold value is counted, a base station apparatus or antenna whose reception quality is poor can be excluded from the possibility of becoming a selected base station apparatus or communicating party antenna, and a communicating party can be selected that enables throughput to be improved more dependably.

A mobile station apparatus according to a seventh aspect of Embodiments 1 through 4 employs a configuration wherein, in the above-described first aspect, the selection section selects a communicating party in a slot cycle.

According to this configuration, since a communicating party is selected in a slot cycle, throughput can always be maintained at a high level by performing FCS when a mobile station apparatus is located in a handover area.

A mobile station apparatus according to an eighth aspect of Embodiments 1 through 4 employs a configuration wherein, in the above-described first aspect, the receiving section receives MIMO application/non-application information indicating whether or not a plurality of communicating party candidates perform MIMO communication; and the selection section selects the communicating party candidate with the largest channel capacity as a communicating party when all of the plurality of communicating party candidates perform MIMO communication, but selects the communicating party candidate with the highest reception quality as a communicating party when one communicating party candidate does not perform MIMO communication.

According to this configuration, since a communicating party is selected based on either channel capacity or reception quality selected according to whether or not communicating party candidates perform MIMO communication, a mobile station apparatus can perform cell selection dependably and at high speed even when there is a base station apparatus that does not perform MIMO communication.

A communicating party selection method according to a ninth aspect of Embodiments 1 through 4 selects a communicating party in a mobile communication system to which MIMO communication is applied, and includes: a step of receiving signals transmitted from a plurality of communicating party candidates; a step of acquiring channel capacity per communicating party candidate indicating the reception quality or number of paths whereby the signals are propagated using a received signal; and a step of selecting the communicating party candidate whose acquired channel capacity is largest as a communicating party.

According to this method, since a base station apparatus or antenna corresponding to a cell or sector for which channel capacity indicating the path reception quality or number of paths is largest is selected as a communicating party using a received signal, communication is performed with a base station apparatus or antenna for which quality or quantity per independent path is high, and it is possible for spatially multiplexed signals to be accurately separated in a mobile station apparatus. Therefore, throughput in a handover area can be dependably improved, and cell coverage can be enlarged, in MIMO communication.

Embodiment 5

A characteristic of Embodiments 5 and 6 described below is that subcarriers with large received power are selected from all subcarriers composing a multicarrier signal, and a base station apparatus of a cell with a large number of mutually independent paths usable in MIMO communication is selected using only the selected subcarriers.

Figure 10:
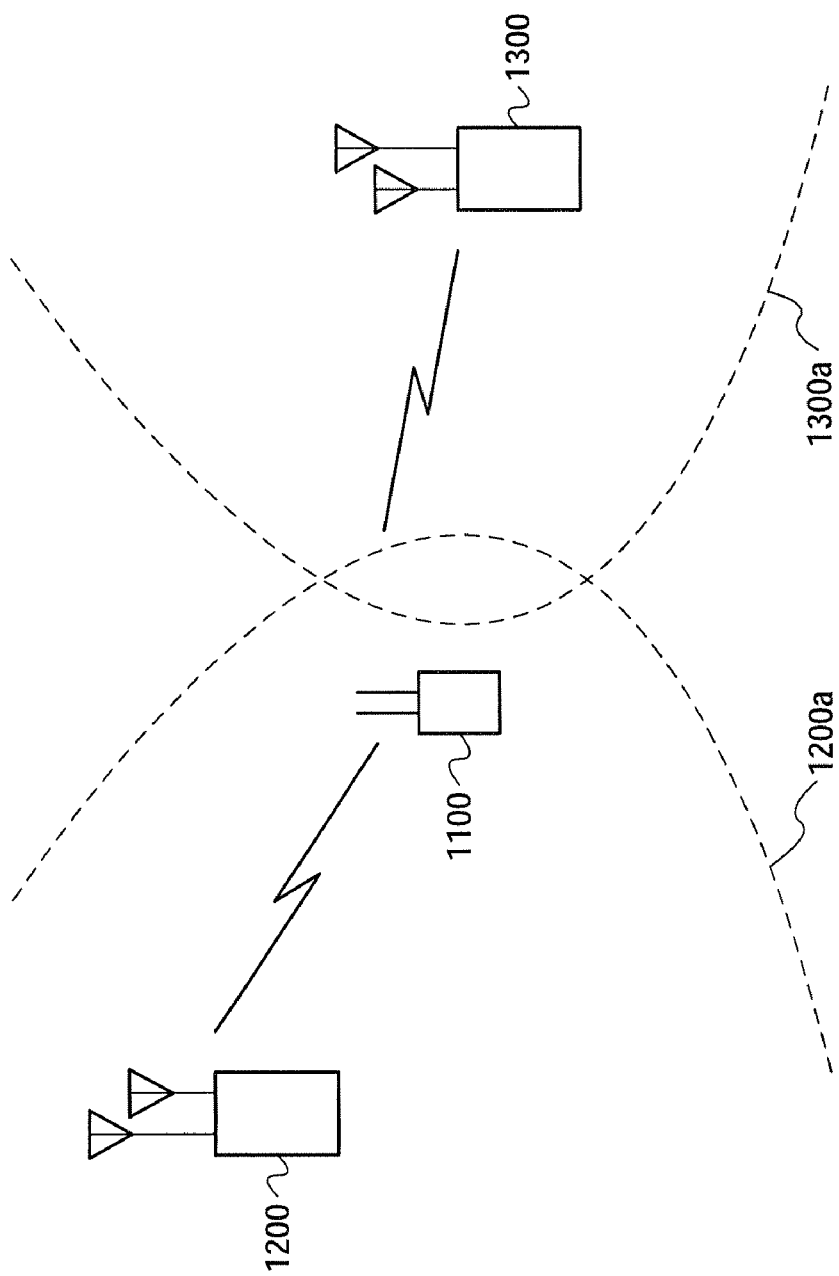
FIG. 10 is a drawing showing the configuration of a mobile communication system according to Embodiments 5 and 6 of the present invention.

FIG. 10 is a drawing showing an example of the configuration of a mobile communication system according to Embodiments 5 and 6 of the present invention. As shown in this figure, a multicarrier communication apparatus 1100 located in an area near the boundaries of a cell 1200a covered by a base station apparatus 1200 and a cell 1300a covered by a base station apparatus 1300 receives common pilot channel signals (common pilot signals) transmitted from both base station apparatus 1200 and base station apparatus 1300. Multicarrier communication apparatus 1100 switches to either base station apparatus 1200 or base station apparatus 1300 as the communicating party at short time-unit intervals, such as slot-by-slot, for example.

Figure 11:
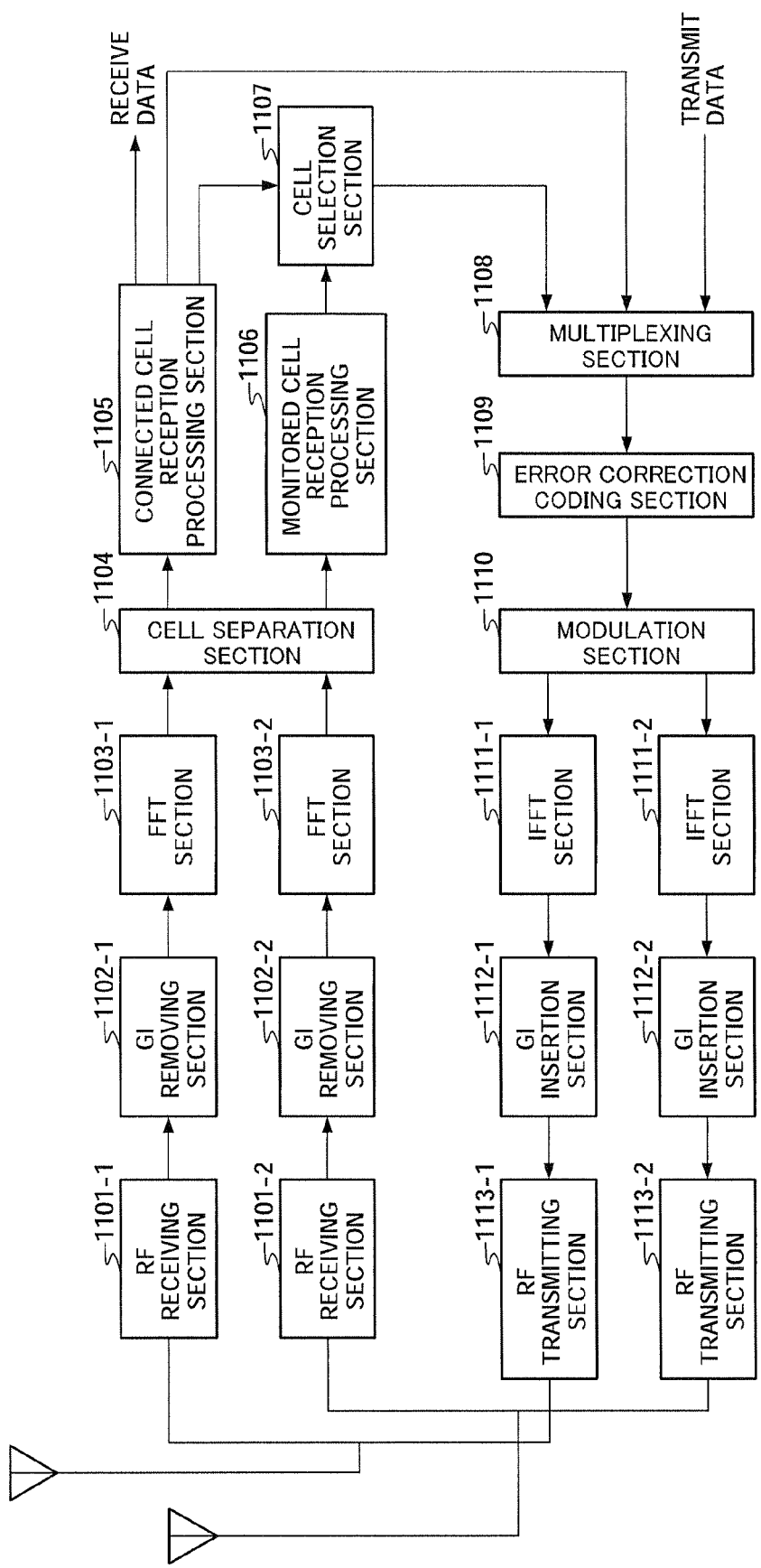
FIG. 11 is a block diagram showing the principal-part configuration of a multicarrier communication apparatus according to Embodiment 5.

FIG. 11 is a block diagram showing the principal-part configuration of multicarrier communication apparatus 1100 according to this embodiment. Multicarrier communication apparatus 1100 shown in FIG. 11 has RF (Radio Frequency) receiving sections 1101-1 and 1101-2, GI (Guard Interval) removing sections 1102-1 and 1102-2, FFT (Fast Fourier Transform) sections 1103-1 and 1103-2, a cell separation section 1104, a connected cell reception processing section 1105, a monitored cell reception processing section 1106, a cell selection section 1107, a multiplexing section 1108, an error correction coding section 1109, a modulation section 1110, IFFT (Inverse Fast Fourier Transform) sections 1111-1 and 1111-2, GI insertion sections 1112-1 and 1112-2, and RF transmitting sections 1113-1 and 1113-2. In this embodiment, multicarrier communication apparatus 1100 is assumed to have a configuration including two antennas, but in the case of three or more antennas, the processing sections from the RF receiving section through the FFT section, and the processing sections from the IFFT section through the RF transmitting section, are provided for each antenna.

RF receiving sections 1101-1 and 1101-2 receive signals from the corresponding antennas, and execute predetermined radio reception processing (such as down-conversion and A/D conversion) on the received signals. A received signal in this embodiment is a multicarrier signal in which signals are superimposed on a plurality of subcarriers of different frequencies.

GI removing sections 1102-1 and 1102-2 remove guard intervals inserted between symbols in a received signal to prevent inter-symbol interference.

FFT sections 1103-1 and 1103-2 perform fast Fourier transform processing on a received signal after guard interval removal, and extract signals superimposed on a plurality of subcarriers.

Cell separation section 1104 separates the signals of each subcarrier into per-cell signals. Specifically, cell separation section 1104 separates subcarrier signals into signals of the cell of a base station apparatus that is currently the communicating party of multicarrier communication apparatus 1100 (hereinafter referred to as "connected cell"), and signals of the cell that is adjacent to the connected cell and has a boundary with the connected cell near the location of multicarrier communication apparatus 1100 (hereinafter referred to as "monitored cell"). If there are a plurality of monitored cells, cell separation section 1104 separates subcarrier signals into signals of the respective monitored cells.

Connected cell reception processing section 1105 executes reception processing on a connected cell signal, and outputs receive data. Connected cell reception processing section 1105 also measures radio quality from a connected cell signal, and outputs radio quality information to multiplexing section 1108. Moreover, connected cell reception processing section 1105 performs singular value decomposition processing in the course of reception processing on a connected cell signal, and also calculates the connected cell channel capacity and outputs this to cell selection section 1107.

Here, a singular value is an indicator showing the reception quality per independent path on which spatially multiplexed signals are transmitted in MIMO communication, and singular value decomposition processing is processing whereby singular values per independent path are calculated using channel estimation results in the course of reception processing in MIMO communication. Also, channel capacity is an indicator showing whether or not each cell is suitable for performing MIMO communication. In MIMO communication, the larger the number of independent paths with no mutual correlation and of high reception quality, the greater is the possibility of a spatially multiplexed signal being able to be separated on the receiving side. Therefore, the more paths with a large singular value a cell has, the larger is its channel capacity, enabling it to be deemed suitable for MIMO communication. Singular values, channel capacity, and the detailed configuration of connected cell reception processing section 1105, will be described later herein.

Monitored cell reception processing section 1106 executes reception processing on a monitored cell signal, calculates the monitored cell channel capacity, and outputs this to cell selection section 1107. Here, since a monitored cell base station apparatus is not the multicarrier communication apparatus 1100 communicating party, monitored cell reception processing section 1106 executes reception processing on a common pilot signal in the monitored cell. In the case of a monitored cell, channel capacity is not found for all subcarriers, but is calculated only for subcarriers with large total received power. Thus, the processing load of channel capacity calculation by monitored cell reception processing section 1106 can be reduced. The detailed configuration of monitored cell reception processing section 1106 will be described later herein.

Cell selection section 1107 performs a size comparison of the connected cell channel capacity and the monitored cell channel capacity, and takes the base station apparatus of the cell with the larger channel capacity as the communicating-party base station apparatus (selected base station apparatus). That is to say, cell selection section 1107 makes the cell with the largest channel capacity the connected cell in the next time interval. Then cell selection section 1107 outputs cell selection information relating to the selected base station apparatus to multiplexing section 1108.

Multiplexing section 1108 multiplexes cell selection information, radio quality information, transmit data, and so forth, and outputs the obtained multiplexed data to error correction coding section 1109.

Error correction coding section 1109 performs error correction coding on the multiplexed data, and outputs the obtained coded data to modulation section 1110.

Modulation section 1110 modulates the coded data, and outputs the obtained modulated data to IFFT sections 1111-1 and 1111-2.

IFFT sections 1111-1 and 1111-2 perform inverse fast Fourier transform processing on the modulated data, superimpose the modulated data onto a plurality of subcarriers, and output the obtained multicarrier signals to GI insertion sections 1112-1 and 1112-2.

GI insertion sections 1112-1 and 1112-2 insert guard intervals between symbols in the multicarrier signals.

RF transmitting sections 1113-1 and 1113-2 execute predetermined radio transmission processing (such as D/A conversion and up-conversion) on the multicarrier signals after guard interval insertion, and transmit them from the corresponding antennas.

Figure 12:
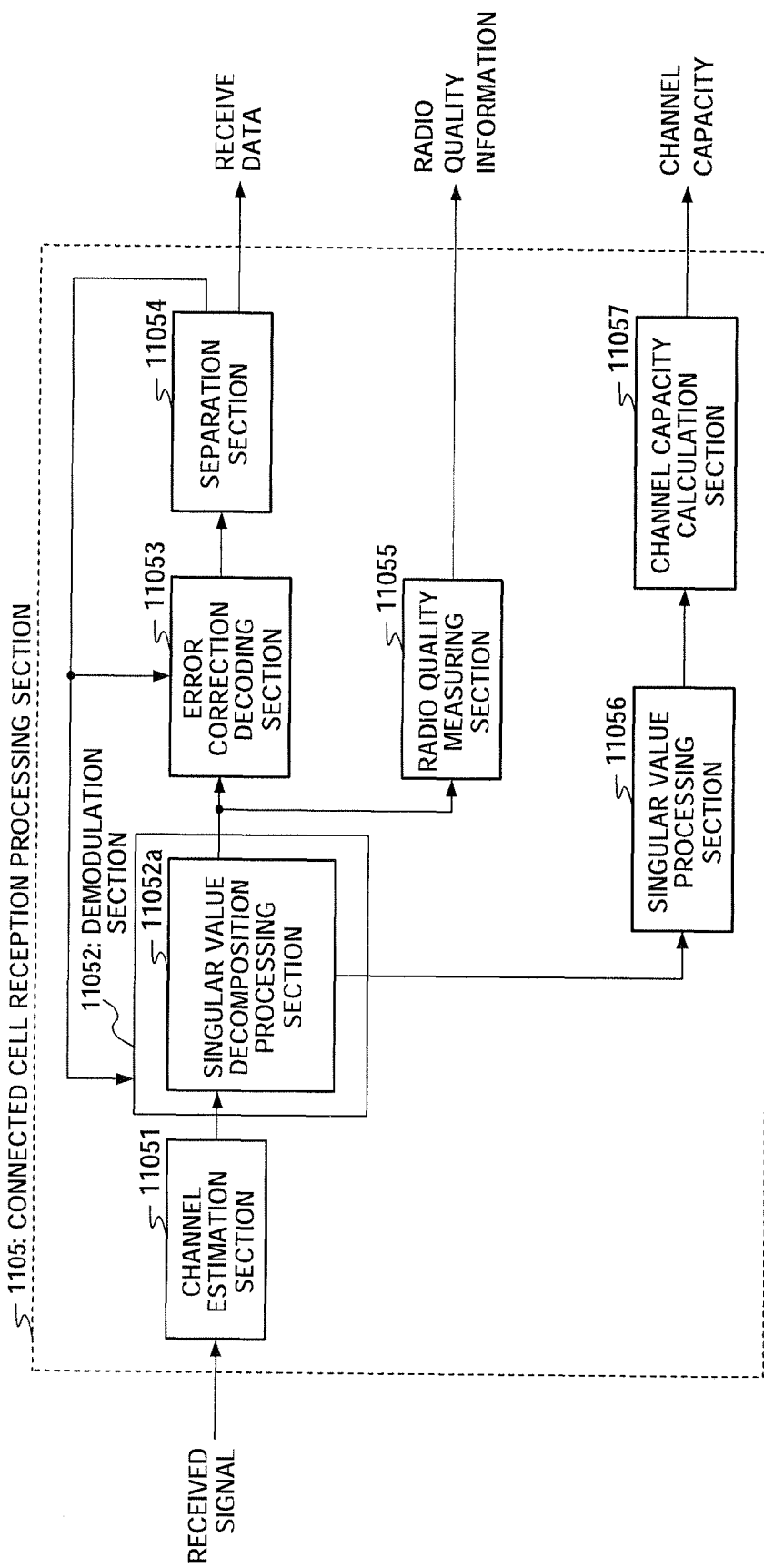
FIG. 12 is a block diagram showing the internal configuration of a connected cell reception processing section according to Embodiment 5.

FIG. 12 is a block diagram showing the internal configuration of connected cell reception processing section 1105 according to this embodiment.

A channel estimation section 11051 performs channel estimation for each path corresponding to a transmitting/receiving-side antenna pair using a common pilot signal of the connected cell. If the number of multicarrier communication apparatus 1100 (receiving-side) antennas is designated $M_R$, and the number of base station apparatus 1200 and base station apparatus 1300 (transmitting-side) antennas is designated $M_T (\geq M_R)$, a channel matrix of size $M_R \times M_T$ is obtained per subcarrier as the channel estimation result. That is to say, if, for a subcarrier i, a base station apparatus transmit signal vector is designated $x_i(t)$, and a propagation path noise signal vector is designated $n_i(t)$, multicarrier communication apparatus 1100 received signal vector $r_i(t)$ can be expressed as shown in Equation (4) below using channel matrix $A_i$.

[4]
$$r_i(t) = A_i x_i(t) + n_i(t) \qquad (4)$$

Channel estimation section 11051 finds per-subcarrier channel matrixes $A_i$ that satisfy Equation (4) for the connected cell. The number of base station apparatus 1200 antennas and the number of base station apparatus 1300 antennas may be different, but here, for the sake of explanation, it is assumed that both base station apparatuses have $M_T$ antennas.

A demodulation section 11052 has a singular value decomposition processing section 11052a, and demodulates a connected cell dedicated data signal. Demodulation section 11052 performs spatial separation and demodulation processing corresponding to the MIMO multiplexing method and modulation method on the transmitting side (in base station apparatus 1200 or base station apparatus 1300), and outputs a dedicated data signal after demodulation to an error correction decoding section 11053 and a radio quality measuring section 11055. Singular value decomposition processing section 11052a performs singular value decomposition processing using channel matrix $A_i$ in the course of demodulation, and calculates singular values per independent path in the connected cell for all subcarriers. Specifically, singular value decomposition processing section 11052a calculates singular values per independent path of the connected cell for subcarrier i by means of Equation (5) below.

[5]
$$A_i^H A_i = U_i \Lambda_i U_i^H \qquad (5)$$

where, $\Lambda_i = \mathrm{diag}(\lambda_{i,1}, \ldots, \lambda_{i,M_R})$

In Equation (5) above, $A_i^H$ indicates a transposed conjugate of channel matrix $A_i$, $U_i$ indicates a unitary matrix obtained by aligning eigenvectors, and $U_i^H$ indicates a transposed conjugate of unitary matrix $U_i$. Also, diag ( ) indicates a diagonal matrix, and in Equation (5), $M_R$ singular values $\lambda_{i,1}$ through $\lambda_{i,M_R}$ appear in the diagonal component of matrix $\Lambda_i$. As it is here assumed that $M_T \geq M_R$, $M_R$ singular values are found, whereas if $M_T < M_R$, $M_T$ singular values are found.

Error correction decoding section 11053 performs error correction decoding corresponding to the transmitting-side (base station apparatus 1200 or base station apparatus 1300) coding rate on a dedicated data signal after demodulation, and outputs a dedicated data signal after error correction decoding to a separation section 11054.

Separation section 11054 separates a dedicated data signal after error correction decoding into receive data and radio resource allocation information indicating the transmitting-side (base station apparatus 1200 or base station apparatus 1300) modulation method and coding rate, outputs the receive data, and also outputs the radio resource allocation information to demodulation section 11052 and error correction decoding section 11053.

Radio quality measuring section 11055 measures radio quality in the connected cell using the connected cell common pilot signal, and outputs radio quality information to multiplexing section 1108.

A singular value processing section 11056 processes singular values found for each subcarrier and for each independent path, and calculates singular values representing the respective independent paths. That is to say, for all singular values $\lambda_{1,1}$ through $\lambda_{1,M_R}, \lambda_{2,1}$ through $\lambda_{2,M_R}, \ldots, \lambda_{i,1}$ through $\lambda_{i,M_R}, \ldots, \lambda_{N,1}$ through $\lambda_{N,M_R}$ found for N subcarriers 1 through N, for example, singular value processing section 11056 calculates singular values $\lambda_1$ through $\lambda_{M_R}$ representing the respective independent paths by dividing the sum of singular values $\lambda_{1,j}$ through $\lambda_{N,j}$ per independent path j by total number of subcarriers N to obtain an average value. Thus, one singular value $\lambda_j$ corresponds to one independent path j.

A channel capacity calculation section 11057 compares singular values $\lambda_1$ through $\lambda_{M_R}$ per independent path obtained by singular value processing section 11056 with a predetermined threshold value, and calculates the number of singular values greater than or equal to the predetermined threshold value as the channel capacity of the connected cell. As stated above, singular values are indicators showing the reception quality of independent paths in MIMO communication. In MIMO communication, the larger the number of paths with high reception quality, the more accurately signals transmitted simultaneously from a plurality of antennas can be separated, and therefore the larger the number of singular values greater than or equal to the predetermined threshold value, the higher is the throughput. Channel capacity calculation section 11057 reports the calculated connected cell channel capacity (that is, the number of singular values greater than or equal to the predetermined threshold value) to cell selection section 1107.

Figure 13:
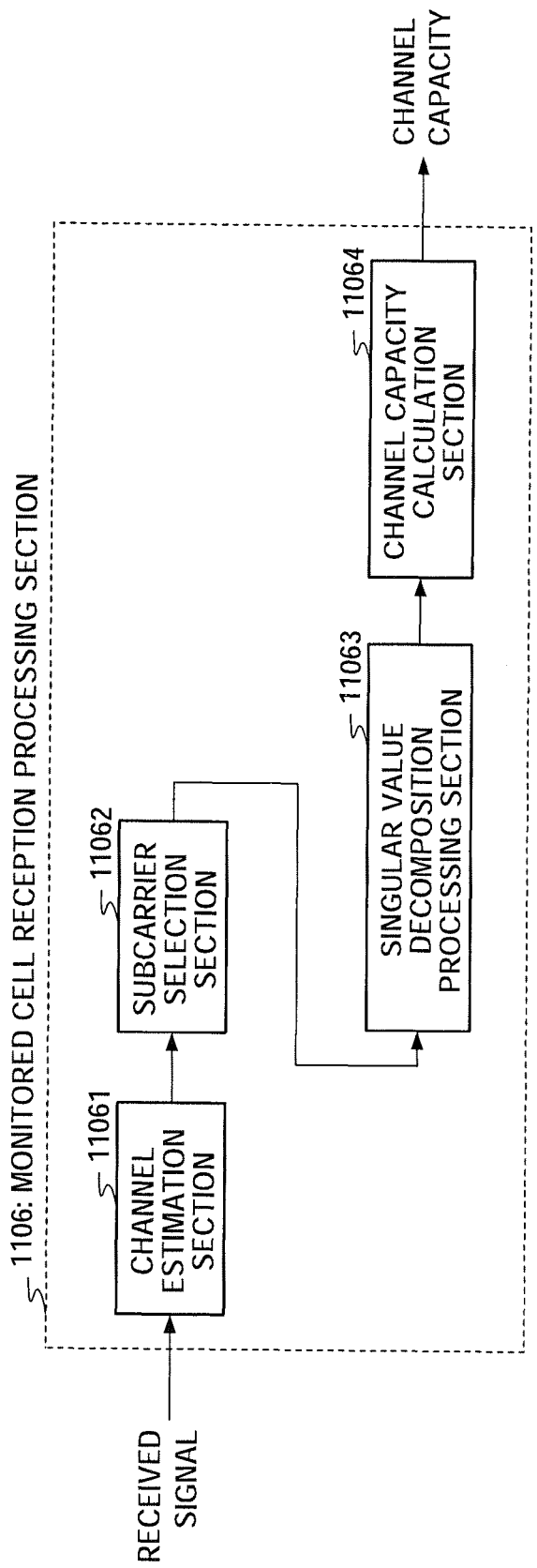
FIG. 13 is a block diagram showing the internal configuration of a monitored cell reception processing section according to Embodiment 5.

FIG. 13 is a block diagram showing the internal configuration of monitored cell reception processing section 1106 according to this embodiment.

A channel estimation section 11061 performs channel estimation for each path corresponding to a transmitting/receiving-side antenna pair using a common pilot signal of a monitored cell, and finds a monitored cell channel matrix.

A subcarrier selection section 11062 calculates received power per subcarrier for each antenna pair comprising a multicarrier communication apparatus 1100 (receiving-side) antenna and a monitored cell base station apparatus (transmitting-side) antenna from channel estimation results obtained by channel estimation section 11061, and selects a subcarrier for which the total received power of all antenna pairs is largest as a subcarrier for singular value decomposition processing. That is to say, for one subcarrier, subcarrier selection section 11062 calculates the total received power per subcarrier by summing the received power of signals from $M_T$ transmitting-side antennas received respectively by $M_R$ receiving-side antennas (that is, $M_R \times M_T$ received power for one subcarrier), and selects the subcarrier with the largest total received power.

Unlike a connected cell signal, only a common pilot signal is received as a monitored cell signal, and demodulation is not performed, so that singular value decomposition processing is not performed in the monitored cell signal reception processing stage. Therefore, for a monitored cell, it is only necessary to perform singular value decomposition processing for cell selection. At this time, the processing load of singular value decomposition processing can be reduced by selecting a subcarrier with the largest total received power as described above, and performing singular value decomposition processing only for this subcarrier.

Also, since a channel matrix is found most accurately for the subcarrier with the largest total received power, the singular value decomposition processing results can also be expected to be accurate. As a result, monitored cell channel capacity can be calculated accurately with a small amount of processing.

It is also possible for subcarrier selection section 11062 not to select only one subcarrier with the largest total received power, but to select a predetermined number of subcarriers from those with large total received power, or to select subcarriers whose total received power is greater than a predetermined threshold value. In these cases, although the number of subcarriers subject to singular value decomposition processing increases, and the processing load is greater than when only one subcarrier is subject to singular value decomposition processing, the amount of information used in singular value decomposition processing is larger, and abnormal singular values can be eliminated.

A singular value decomposition processing section 11063 performs singular value decomposition processing by means of Equation (5) in the same way as for the connected cell, using the monitored cell channel matrix, and calculates singular values per independent path in the monitored cell only for a subcarrier selected by subcarrier selection section 11062.

When only one subcarrier has been selected by subcarrier selection section 11062, singular value decomposition processing section 11063 outputs singular values per independent path obtained by singular value decomposition processing directly to a channel capacity calculation section 11064, but when a plurality of subcarriers have been selected, singular value decomposition processing section 11063 calculates a singular value representing an independent path in the same way as singular value processing section 11056 of connected cell reception processing section 1105, and outputs this to channel capacity calculation section 11064.

Channel capacity calculation section 11064 compares singular values per independent path output from singular value processing section 11063 with a predetermined threshold value, and calculates the number of singular values greater than or equal to the predetermined threshold value as the channel capacity of the monitored cell.

Figure 14:
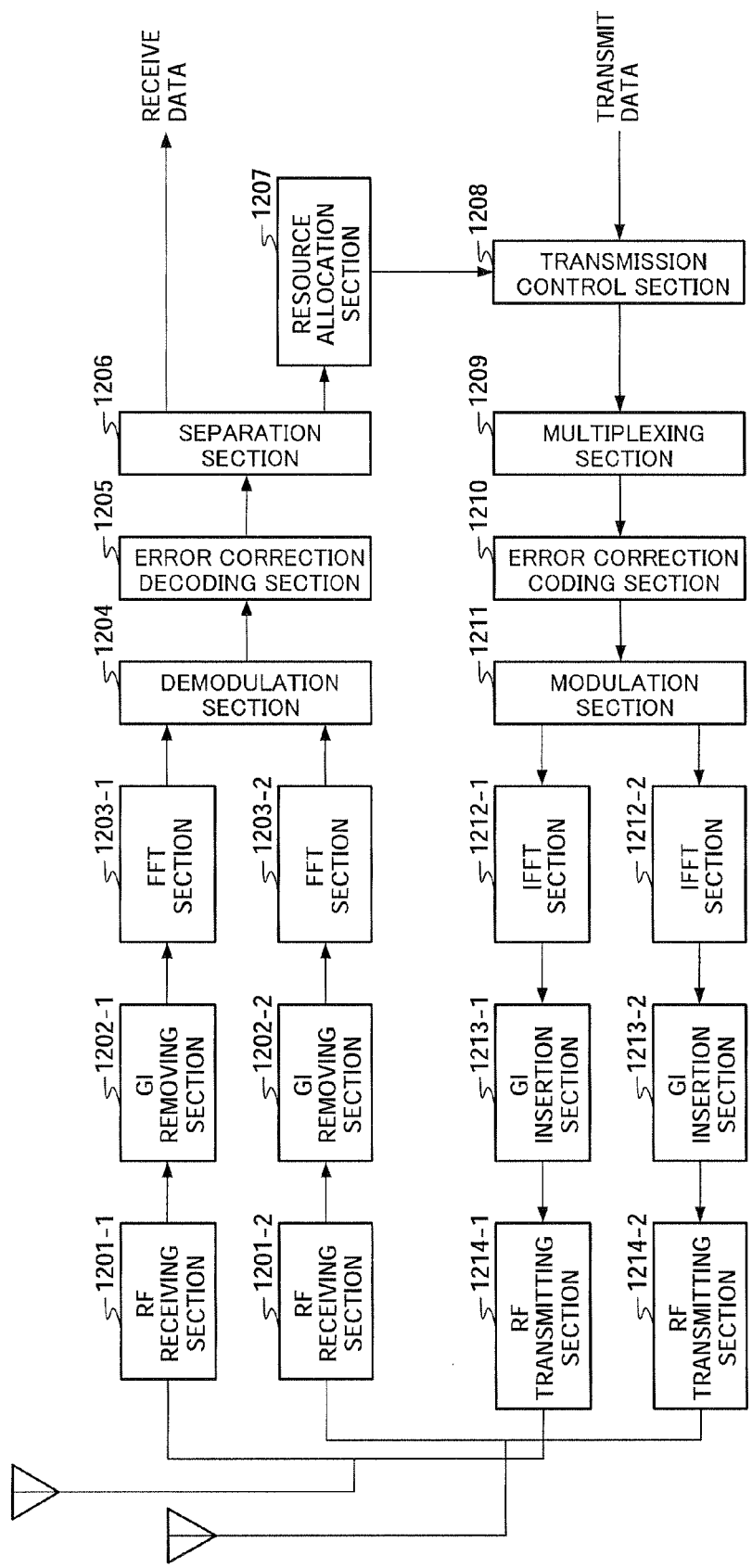
FIG. 14 is a block diagram showing the principal-part configuration of a base station apparatus according to Embodiment 5.

FIG. 14 is a block diagram showing the principal-part configuration of base station apparatus 1200 according to this embodiment. Base station apparatus 1200 shown in FIG. 14 has RF receiving sections 1201-1 and 1201-2, GI removing sections 1202-1 and 1202-2, FFT sections 1203-1 and 1203-2, a demodulation section 1204, an error correction decoding section 1205, a separation section 1206, a resource allocation section 1207, a transmission control section 1208, a multiplexing section 1209, an error correction coding section 1210, a modulation section 1211, IFFT sections 1212-1 and 1212-2, GI insertion sections 1213-1 and 1213-2, and RF transmitting sections 1214-1 and 1214-2. Base station apparatus 1300 also has the same kind of configuration as base station apparatus 1200.

RF receiving sections 1201-1 and 1201-2 receive signals from the corresponding antennas, and execute predetermined radio reception processing (such as down-conversion and A/D conversion) on the received signals.

GI removing sections 1202-1 and 1202-2 remove guard intervals inserted between symbols in a received signal.

FFT sections 1203-1 and 1203-2 perform fast Fourier transform processing on a received signal after guard interval removal, and extract signals superimposed on a plurality of subcarriers.

Demodulation section 1204 demodulates subcarrier signals and outputs the obtained demodulated signal to error correction decoding section 1205.

Error correction decoding section 1205 performs error correction decoding on the demodulated signal, and outputs the signal after error correction decoding to separation section 1206.

Separation section 1206 separates the signal after error correction decoding into receive data, and cell selection information and radio quality information, outputs the receive data, and also outputs the cell selection information and radio quality information to resource allocation section 1207.

Resource allocation section 1207 refers to the cell selection information and determines whether or not that apparatus (base station apparatus 1200) is the selected base station apparatus, and if it is the selected base station apparatus, refers to the radio quality information and determines the radio resources to be allocated to transmit data destined for multicarrier communication apparatus 1100.

Transmission control section 1208 controls the transmission order of transmit data for multicarrier communication apparatus 1100 and other multicarrier communication apparatuses, and so forth, and generates radio resource allocation information indicating the modulation method and coding rate for transmit data.

Multiplexing section 1209 multiplexes transmit data, radio resource allocation information, a common pilot signal (not shown), and so forth, and outputs the obtained multiplexed data to error correction coding section 1210.

Error correction coding section 1210 performs error correction coding on the multiplexed data using a coding rate corresponding to the relevant transmission destination, and outputs the obtained coded data to modulation section 1211.

Modulation section 1211 modulates the coded data using a modulation method corresponding to the relevant transmission destination, and outputs the obtained modulated data to IFFT sections 1212-1 and 1212-2.

IFFT sections 1212-1 and 1212-2 perform inverse fast Fourier transform processing on the modulated data, superimpose the modulated data onto a plurality of subcarriers, and output the obtained multicarrier signals to GI insertion sections 1213-1 and 1213-2.

GI insertion sections 1213-1 and 1213-2 insert guard intervals between symbols in the multicarrier signals.

RF transmitting sections 1214-1 and 1214-2 execute predetermined radio transmission processing (such as D/A conversion and up-conversion) on the multicarrier signals after guard interval insertion, and transmit them from the corresponding antennas.

Figure 15:
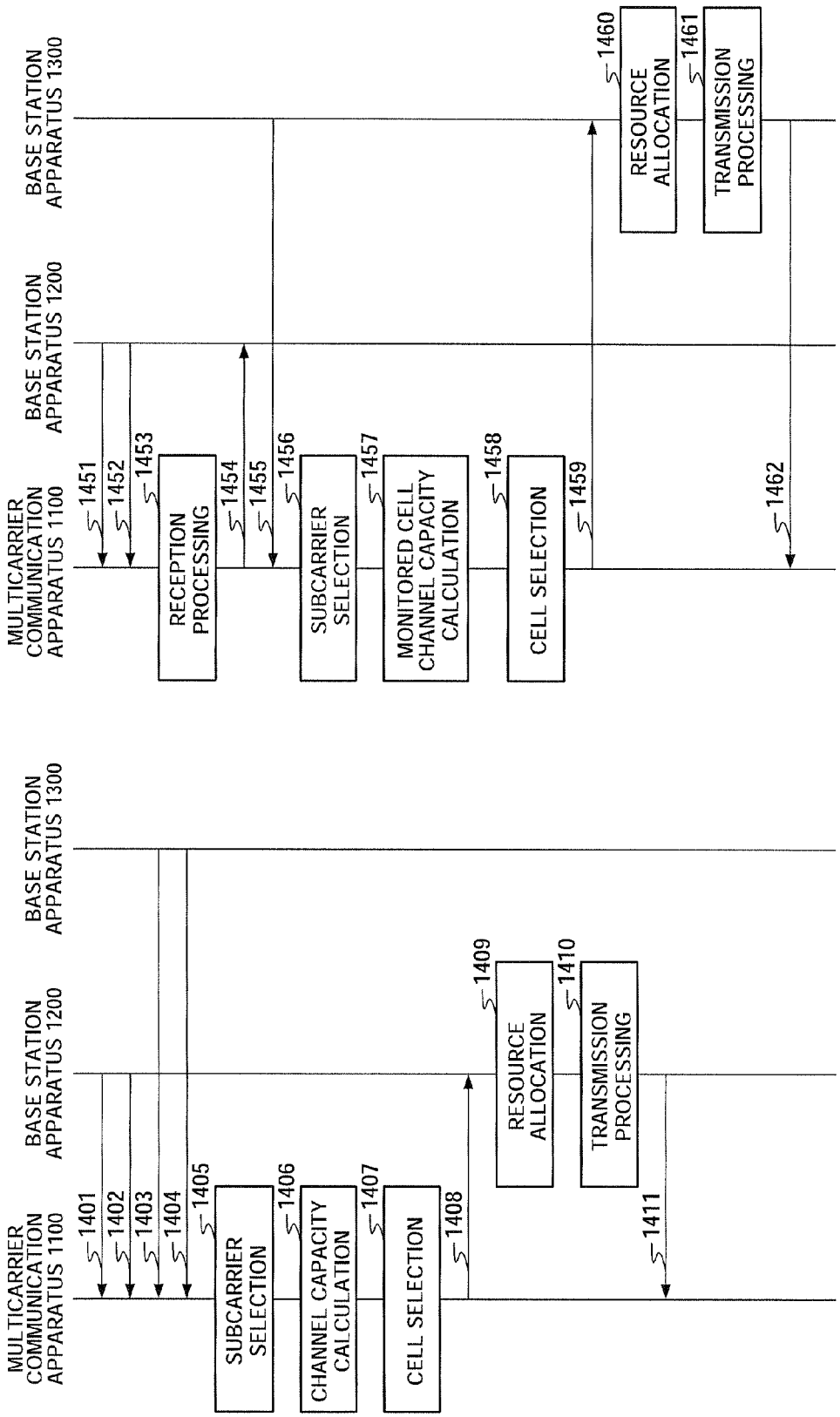
FIG. 15A is a sequence diagram showing a cell selection operation by a multicarrier communication apparatus at the start of communication.
FIG. 15B is a sequence diagram showing a cell selection operation by a multicarrier communication apparatus during communication.

Cell selection by multicarrier communication apparatus 1100 configured as described above will now be explained, divided into operations at the start of communication and during communication, with reference to the sequence diagrams shown in FIG. 15A and FIG. 15B.

First, operation at the start of communication, such as when multicarrier communication apparatus 1100 is powered on, will be described with reference to FIG. 15A. When multicarrier communication apparatus 1100 is located near the boundaries of base station apparatus 1200 cell 1200*a* and base station apparatus 1300 cell 1300*a*, a common pilot signal 1401 and dedicated data signal 1402 from base station apparatus 1200, and a common pilot signal 1403 and dedicated data signal 1404 from base station apparatus 1300, are received by RF receiving sections 1101-1 and 1101-2 of multicarrier communication apparatus 1100.

The received signals undergo predetermined radio reception processing by RF receiving sections 1101-1 and 1101-2, guard intervals are removed by GI removing sections 1102-1 and 1102-2, and signals superimposed on a plurality of subcarriers are extracted by means of fast Fourier transform processing by FFT sections 1103-1 and 1103-2.

Subcarrier signals are separated into connected cell and monitored cell signals by cell separation section 1104. However, since this description refers to the start of communication, there is no connected cell, and cell 1200*a* and cell 1300*a* are both monitored cells. Therefore, signals from both cell 1200*a* and cell 1300*a* are output to channel estimation section 11061 of monitored cell reception processing section 1106.

Then a cell 1200*a* channel matrix and a cell 1300*a* channel matrix are found by channel estimation section 11061, and subcarriers with the largest total received power in each cell are selected by subcarrier selection section 11062 (1405).

Figure 16:
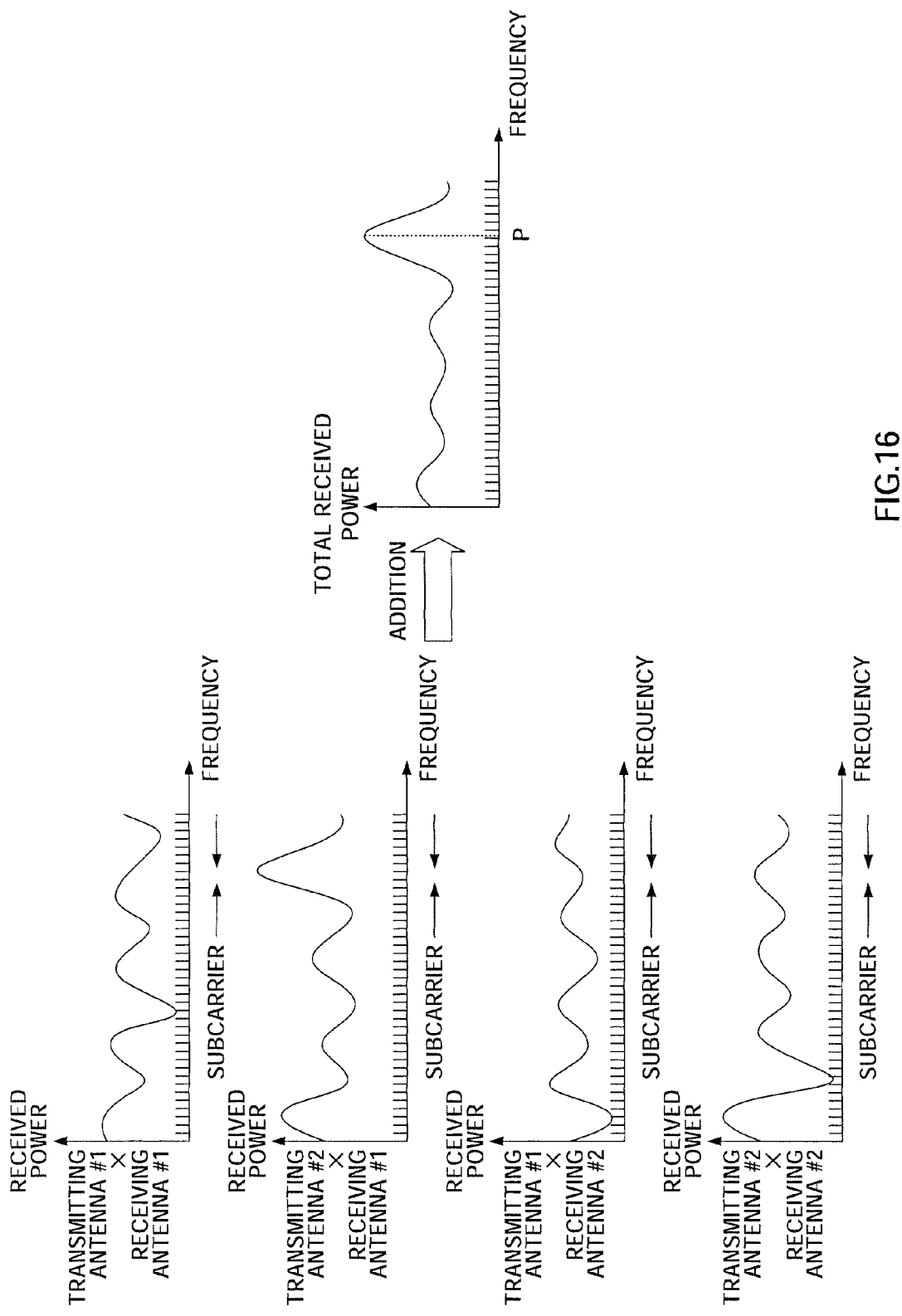
FIG. 16 is a drawing showing an example of subcarrier selection based on received power.

Specifically, if, for example, base station apparatus 1200 has two antennas, transmitting antenna #1 and transmitting antenna #2, and multicarrier communication apparatus 1100 has two antennas, receiving antenna #1 and receiving antenna #2, total received power is found by subcarrier selection section 11062 by summing the received power per subcarrier of each transmitting antenna/receiving antenna pair, as shown in FIG. 16. Then subcarrier P with the largest total received power is selected by subcarrier selection section 11062. The subcarrier with the largest total received power is also selected in the same way by subcarrier selection section 11062 for base station apparatus 1300 cell 1300*a*.

The subcarrier selected for each cell is reported to singular value decomposition processing section 11063, whereby singular value decomposition processing is performed by means of Equation (5) using the channel matrix corresponding to the selected subcarrier, and singular values per independent path are found for cell 1200*a* and cell 1300*a*.

By selecting and limiting subcarriers subject to singular value decomposition processing in this way, an increase in the processing load due to singular value decomposition processing can be minimized, and high-speed cell selection can be executed while preventing an increase in circuit scale. Also, by selecting the subcarrier with the largest total received power in subcarrier selection, singular value decomposition processing can be performed using an accurate channel matrix, and obtained singular values are also accurate.

Then the numbers of singular values greater than or equal to a predetermined threshold value are calculated by channel capacity calculation section 11064 as the channel capacities of cell 1200*a* and cell 1300*a* (1406). The calculated channel capacities are output to cell selection section 1107, whichever of cell 1200*a* and cell 1300*a* has the larger channel capacity is selected as the connected cell for the next time unit (1407), and the base station apparatus corresponding to the connected cell becomes the selected base station apparatus. Cell selection information relating to the cell selected as the connected cell is then output by cell selection section 1107 to multiplexing section 1108. It will be assumed here that cell 1200*a* has been selected as the connected cell, and base station apparatus 1200 has become the selected base station apparatus.

Since, in this embodiment, singular value decomposition processing is performed on the subcarrier with the largest total received power as described above, obtained singular values are accurate, and as a result, channel capacity reliability is also high. Therefore, cell 1200*a* selected as the connected cell is certainly more suitable for MIMO communication than cell 1300*a*, and enables cell coverage to be enlarged by improving throughput.

When cell selection information is input to multiplexing section 1108, transmit data and cell selection information are multiplexed by multiplexing section 1108, and multiplexed data is generated. The multiplexed data then undergoes error correction coding by error correction coding section 1109 and is modulated by modulation section 1110, and modulated data is obtained.

The modulated data is then superimposed onto a plurality of subcarriers by means of inverse fast Fourier transform processing by IFFT sections 1111-1 and 1111-2, has guard intervals inserted by GI insertion sections 1112-1 and 1112-2, and undergoes predetermined radio transmission processing by RF transmitting sections 1113-1 and 1113-2, and a multicarrier signal 1408 containing transmit data and cell selection information is transmitted via the antennas. In FIG. 15A transmission to non-selected base station apparatus 1300 is omitted, but cell selection information may also be transmitted to base station apparatus 1300.

Multicarrier signal 1408 transmitted from multicarrier communication apparatus 1100 is received by RF receiving sections 1201-1 and 1201-2 of base station apparatus 1200 via the antennas. Then the received signals undergo predetermined radio reception processing by RF receiving sections 1201-1 and 1201-2, guard intervals are removed by GI removing sections 1202-1 and 1202-2, and signals superimposed on a plurality of subcarriers are extracted by means of fast Fourier transform processing by FFT sections 1203-1 and 1203-2.

Subcarrier signals are demodulated by demodulation section 1204, undergo error correction decoding by error correction decoding section 1205, and are separated into transmit data and cell selection information by separation section 1206. Then, when the cell selection information is output to resource allocation section 1207, it is determined by resource allocation section 1207 that that apparatus (base station apparatus 1200) has become the selected base station apparatus of multicarrier communication apparatus 1100, and radio resources such as modulation method and coding rate to be allocated to transmit data destined for multicarrier communication apparatus 1100 are determined (1409). Information on the determined radio resources is output to transmission control section 1208, and transmission processing of a signal destined for multicarrier communication apparatus 1100 is started (1410).

That is to say, transmit data destined for multicarrier communication apparatus 1100, and radio resource information indicating the coding rate and modulation method to be allocated to multicarrier communication apparatus 1100, are output by transmission control section 1208 to multiplexing section 1209.

Then transmit data destined for multicarrier communication apparatus 1100 and radio resource information are multiplexed by multiplexing section 1209, and multiplexed data is generated. The multiplexed data then undergoes error correction coding by error correction coding section 1210 and is modulated by modulation section 1211, and modulated data is obtained.

The modulated data is superimposed onto a plurality of subcarriers by means of inverse fast Fourier transform processing by IFFT sections 1212-1 and 1212-2, has guard intervals inserted by GI insertion sections 1213-1 and 1213-2, and undergoes predetermined radio transmission processing by RF transmitting sections 1214-1 and 1214-2, and a dedicated data signal 1411 containing transmit data and radio resource information is transmitted via the antennas.

A signal transmitted from base station apparatus 1200, the selected base station apparatus, in this way is received by multicarrier communication apparatus 1100, and receive data is obtained by means of reception processing by connected cell reception processing section 1105.

Next, operation when multicarrier communication apparatus 1100 is communicating with base station apparatus 1200 as the selected base station apparatus (that is, when cell 1200*a* is the connected cell and cell 1300*a* is a monitored cell) will be described with reference to FIG. 15B. When multicarrier communication apparatus 1100 has made cell 1200*a* the connected cell, a common pilot signal 1451 and dedicated data signal 1452 from base station apparatus 1200 are received by RF receiving sections 1101-1 and 1101-2 of multicarrier communication apparatus 1100.

The received signals undergo predetermined radio reception processing by RF receiving sections 1101-1 and 1101-2, guard intervals are removed by GI removing sections 1102-1 and 1102-2, and signals superimposed on a plurality of subcarriers are extracted by means of fast Fourier transform processing by FFT sections 1103-1 and 1103-2.

Subcarrier signals are separated into connected cell and monitored cell signals by cell separation section 1104. Here, the signal from cell 1200*a*, the connected cell, is output to connected cell reception processing section 1105, where connected cell signal reception processing is performed (1453).

That is to say, channel matrixes per cell 1200*a* subcarrier are found by channel estimation section 11051, the received signal is demodulated by demodulation section 11052 using the MIMO multiplexing method and modulation method allocated to multicarrier communication apparatus 1100 in base station apparatus 1200, and singular value decomposition processing is performed by singular value decomposition processing section 11052*a* in the course of this demodulation. Singular values per independent path in the connected cell obtained by means of singular value decomposition processing are output to singular value processing section 11056, a demodulated dedicated data signal is output to error correction decoding section 11053, and a common pilot signal is output to radio quality measuring section 11055.

The dedicated data signal output to error correction decoding section 11053 undergoes error correction decoding using the coding rate allocated to multicarrier communication apparatus 1100 in base station apparatus 1200, and is separated into receive data and radio resource information by separation section 11054, and the radio resource information is output to demodulation section 11052 and error correction decoding section 11053.

Singular values per independent path are output to singular value processing section 11056 for all subcarriers, and singular values representing the respective independent paths are calculated by singular value processing section 11056 by finding an average value per independent path, for example.

The number of singular values greater than or equal to a predetermined threshold value is calculated by channel capacity calculation section 11057 as the channel capacity of cell 1200*a*, and is output to cell selection section 1107. This concludes the connected cell signal reception processing.

The common pilot signal output to radio quality measuring section 11055 is used for measurement of the radio quality of cell 1200*a*, the connected cell, and radio quality information is generated by radio quality measuring section 11055. The generated radio quality information may be multiplexed with a reception confirmation response or the like, and transmitted to base station apparatus 1200 as a reception confirmation response signal 1454.

Meanwhile, a common pilot signal 1455 transmitted from base station apparatus 1300 of cell 1300*a*, the monitored cell, is received on a non-periodical basis by RF receiving sections 1101-1 and 1101-2 and undergoes predetermined radio reception processing, guard intervals are removed by GI removing sections 1102-1 and 1102-2, and signals superimposed on a plurality of subcarriers are extracted by means of fast Fourier transform processing by FFT sections 1103-1 and 1103-2.

Subcarrier signals are separated into connected cell and monitored cell signals by cell separation section 1104. Here, the signal from cell 1300*a*, the monitored cell, is output to channel estimation section 11061 of monitored cell reception processing section 1106.

Cell 1300*a* channel matrixes are found by channel estimation section 11061, and the subcarrier with the largest total received power in cell 1300*a* is selected by subcarrier selection section 11062, as shown in FIG. 16 (1456).

The selected subcarrier is reported to singular value decomposition processing section 11063, singular value decomposition processing is performed by singular value decomposition processing section 11063 by means of Equation (5) using the channel matrix corresponding to the selected subcarrier, and singular values per independent path are found for cell 1300*a*.

The number of singular values greater than or equal to a predetermined threshold value is calculated by channel capacity calculation section 11064 as the channel capacity of cell 1300*a*, the monitored cell (1457). The calculated cell 1300*a* channel capacity is output to cell selection section 1107, whichever of cell 1200*a* and cell 1300*a* has the larger channel capacity is selected as the connected cell for the next time unit (1458), and the base station apparatus corresponding to the connected cell becomes the selected base station apparatus. Cell selection information relating to the cell selected as the connected cell is then output by cell selection section 1107 to multiplexing section 1108. It will be assumed here that cell 1300a has been selected as the connected cell, and base station apparatus 1300 has become the selected base station apparatus.

When cell selection information is input to multiplexing section 1108, transmit data and cell selection information are multiplexed by multiplexing section 1108, and multiplexed data is generated. The multiplexed data then undergoes error correction coding by error correction coding section 1109 and is modulated by modulation section 1110, and modulated data is obtained.

The modulated data is then superimposed onto a plurality of subcarriers by means of inverse fast Fourier transform processing by IFFT sections 1111-1 and 1111-2, has guard intervals inserted by GI insertion sections 1112-1 and 1112-2, and undergoes predetermined radio transmission processing by RF transmitting sections 1113-1 and 1113-2, and a multicarrier signal 1459 containing transmit data and cell selection information is transmitted via the antennas. In FIG. 15B no signal is transmitted to non-selected base station apparatus 1200, but cell selection information may also be transmitted to base station apparatus 1200.

Multicarrier signal 1459 transmitted from multicarrier communication apparatus 1100 is received by RF receiving sections 1201-1 and 1201-2 of base station apparatus 1300 via the antennas. Then the received signals undergo predetermined radio reception processing by RF receiving sections 1201-1 and 1201-2, guard intervals are removed by GI removing sections 1202-1 and 1202-2, and signals superimposed on a plurality of subcarriers are extracted by means of fast Fourier transform processing by FFT sections 1203-1 and 1203-2.

Subcarrier signals are demodulated by demodulation section 1204, undergo error correction decoding by error correction decoding section 1205, and are separated into transmit data and cell selection information by separation section 1206. Then, when the cell selection information is output to resource allocation section 1207, it is determined by resource allocation section 1207 that that apparatus (base station apparatus 1300) has become the selected base station apparatus of multicarrier communication apparatus 1100, and radio resources such as modulation method and coding rate to be allocated to transmit data destined for multicarrier communication apparatus 1100 are determined (1460). Information on the determined radio resources is output to transmission control section 1208, and transmission processing of a signal destined for multicarrier communication apparatus 1100 is started (1461)

That is to say, transmit data destined for multicarrier communication apparatus 1100, and radio resource information indicating the coding rate and modulation method to be allocated to multicarrier communication apparatus 1100, are output by transmission control section 1208 to multiplexing section 1209.

Then transmit data destined for multicarrier communication apparatus 1100 and radio resource information are multiplexed by multiplexing section 1209, and multiplexed data is generated. The multiplexed data then undergoes error correction coding by error correction coding section 1210 and is modulated by modulation section 1211, and modulated data is obtained.

The modulated data is superimposed onto a plurality of subcarriers by means of inverse fast Fourier transform processing by IFFT sections 1212-1 and 1212-2, has guard intervals inserted by GI insertion sections 1213-1 and 1213-2, and undergoes predetermined radio transmission processing by RF transmitting sections 1214-1 and 1214-2, and a dedicated data signal 1462 containing transmit data and radio resource information is transmitted via the antennas.

A signal transmitted from base station apparatus 1300, the selected base station apparatus, in this way is received by multicarrier communication apparatus 1100, and receive data is obtained by means of reception processing by connected cell reception processing section 1105.

Thus, according to this embodiment, singular value decomposition processing is performed for the subcarrier with the largest total received power among subcarriers contained in a common pilot signal transmitted from a base station apparatus that is not the communicating party, the number of singular values greater than or equal to a predetermined threshold value is taken as the channel capacity, and the base station apparatus with the largest channel capacity is made the selected base station apparatus. Consequently, an increase in the processing load due to singular value decomposition processing for high-speed cell selection can be minimized, and when MIMO communication and multicarrier communication are combined, high-speed cell selection can be executed while preventing an increase in circuit scale, throughput can be dependably improved, and cell coverage can be enlarged.

In this embodiment, it has been assumed that a multicarrier signal containing cell selection information (for example, multicarrier signal 1408 in FIG. 15A) is transmitted from multicarrier communication apparatus 1100 to the selected base station apparatus, but the uplink signal is not limited to a multicarrier signal, and may also be a CDMA signal or the like, for example.

Embodiment 6

A characteristic of this embodiment is that a determinant is used as channel capacity used in channel selection, and a base station apparatus that becomes the communicating party is selected according to the size of a determinant.

The configuration of a mobile communication system according to this embodiment is the same as that of the mobile communication system shown in FIG. 10, and therefore a description thereof is omitted. Also, the principal-part configurations of a multicarrier communication apparatus 1100 and base station apparatus 1200 according to this embodiment are the same as those of multicarrier communication apparatus 1100 and base station apparatus 1200 shown in FIG. 11 and FIG. 14, and therefore descriptions thereof are omitted.

In this embodiment, only the internal configurations of connected cell reception processing section 1105 and monitored cell reception processing section 1106 in multicarrier communication apparatus 1100 differ from those in Embodiment 5. Therefore, the internal configurations of connected cell reception processing section 1105 and monitored cell reception processing section 1106 will be described.

Figure 17:
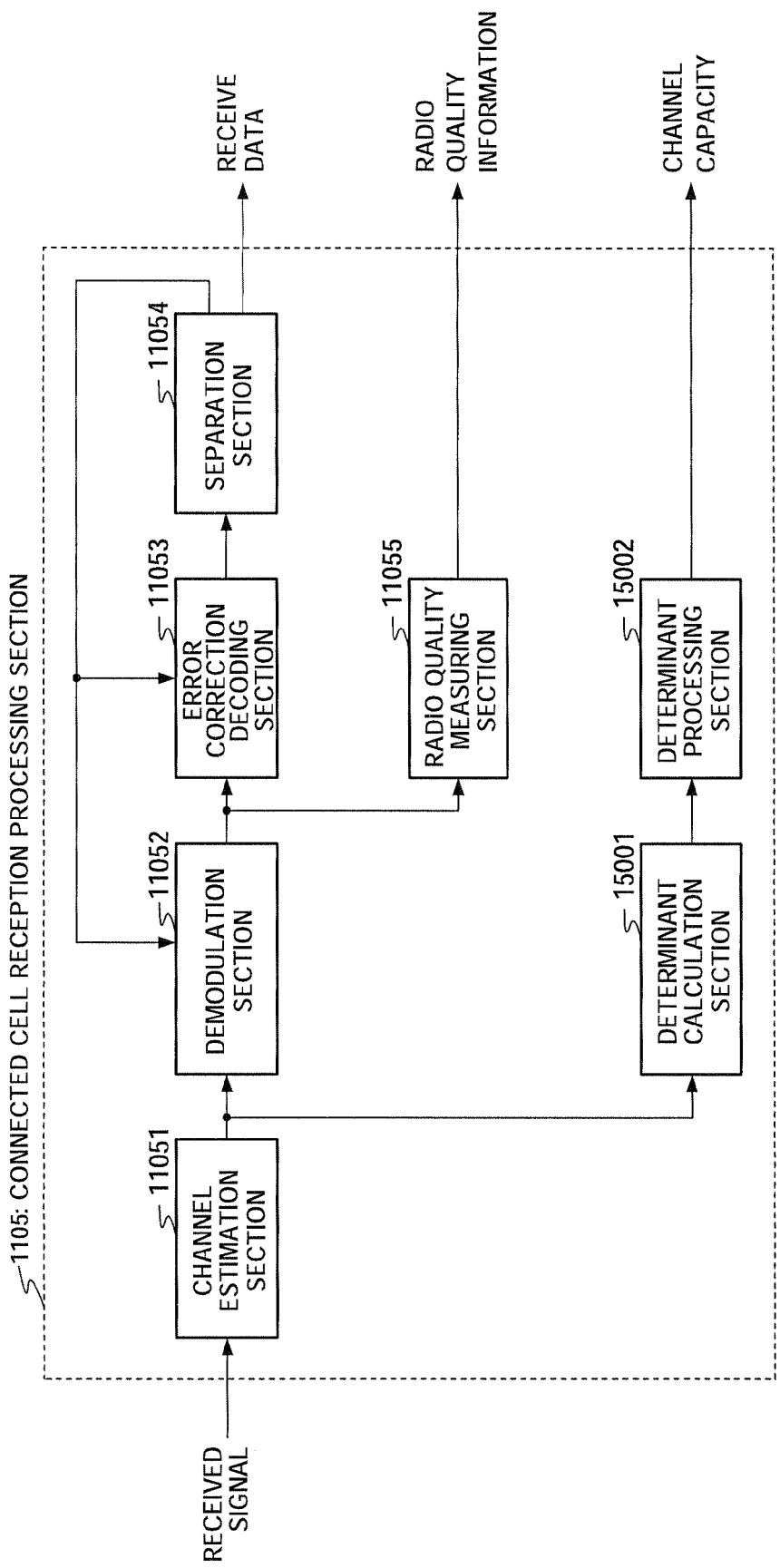
FIG. 17 is a block diagram showing the internal configuration of a connected cell reception processing section according to Embodiment 6 of the present invention.

FIG. 17 is a block diagram showing the internal configuration of connected cell reception processing section 1105 according to this embodiment. Parts in FIG. 17 identical to those in FIG. 12 are assigned the same codes as in FIG. 12, and descriptions thereof are omitted. Connected cell reception processing section 1105 shown in FIG. 17 employs a configuration that has a determinant calculation section 15001 and a determinant processing section 15002 instead of singular value processing section 11056 and channel capacity calculation section 11057 in FIG. 12.

Determinant calculation section 15001 calculates determinants per independent path in a connected cell for all subcarriers, using channel matrix $A_i$ relating to connected cell subcarrier i. Specifically, determinant calculation section 15001 calculates a determinant $C_i$, which is an indicator of the sum of reception qualities per independent path of the connected cell, by means of Equation (6) below.

[6]

$$C_i = \log_2 \det\left(I_{M_R} + \frac{Y}{M_T} A_i A_i^H\right) \quad (6)$$

where, $Y = CNR$ (Carrier to Noise Ratio)

In Equation (6) above, det( ) indicates a determinant, and $I_{M_R}$ indicates a unit matrix of size $M_R \times M_R$. Determinant $C_i$ found by means of Equation (6) is a scalar quantity found on a subcarrier-by-subcarrier basis, and is a numeric value that indicates the sum of reception qualities of independent paths in MIMO communication. Therefore, the larger the number of independent paths with high reception quality in a cell, the larger is the value of determinant $C_i$, and a cell with a larger determinant $C_i$ has proportionally higher throughput.

Determinant processing section 15002 processes determinants $C_i$ found for each subcarrier, calculates a determinant representing the connected cell, and takes this as the channel capacity of the connected cell. That is to say, determinant processing section 15002 calculates a determinant C representing the connected cell by, for example, dividing the sum of all determinants $C_i$ through $C_N$ found for N subcarriers 1 through N by the number of subcarriers N to obtain an average value. Since, as explained above, if calculated determinant C is large, the reception quality of connected cell independent paths is high, and the cell is suitable for MIMO communication, determinant processing section 15002 outputs determinant C to cell selection section 1107 as the channel capacity of the connected cell.

Figure 18:
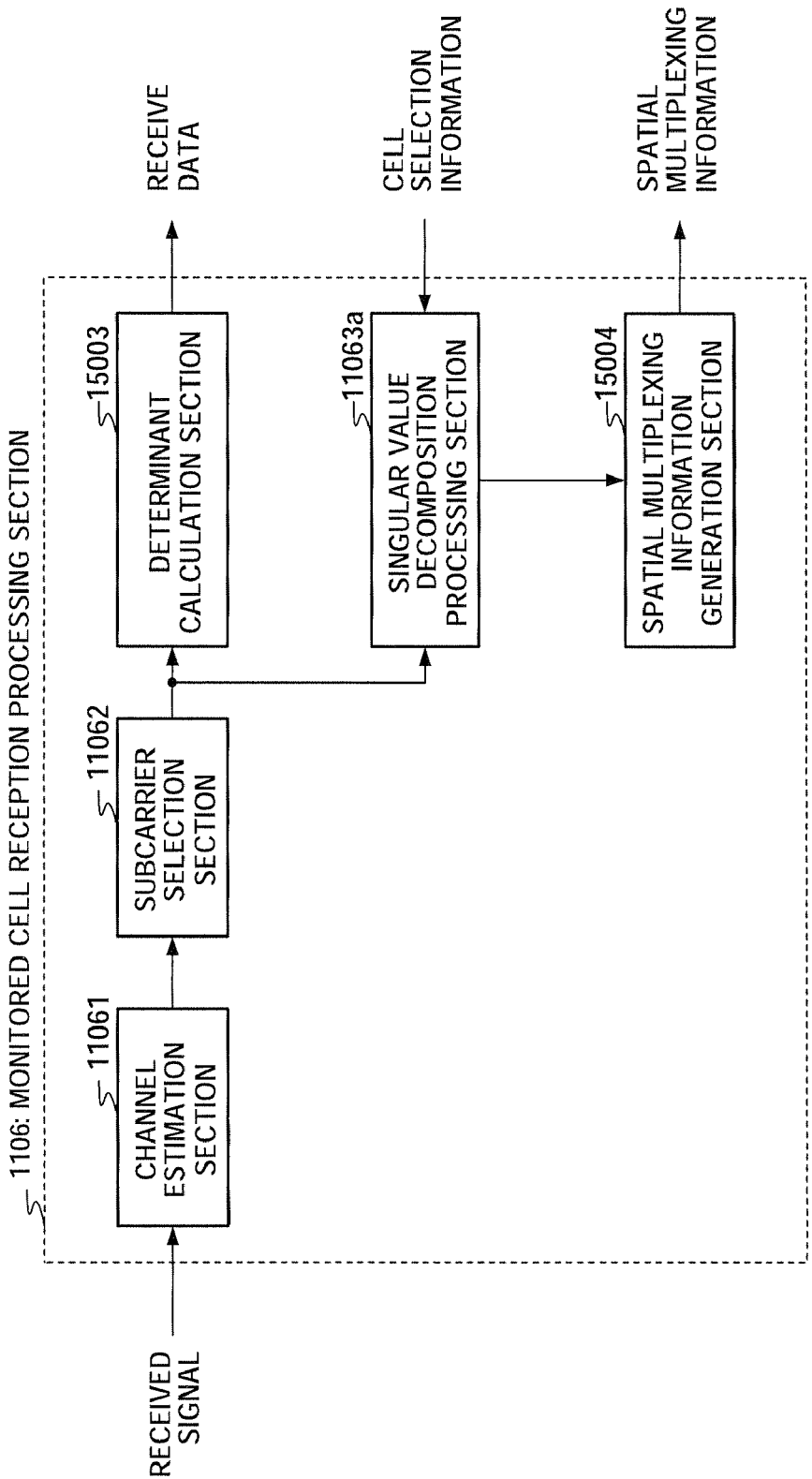
FIG. 18 is a block diagram showing the internal configuration of a monitored cell reception processing section according to Embodiment 6.

FIG. 18 is a block diagram showing the internal configuration of monitored cell reception processing section 1106 according to this embodiment. Parts in FIG. 18 identical to those in FIG. 13 are assigned the same codes as in FIG. 13, and descriptions thereof are omitted. Monitored cell reception processing section 1106 shown in FIG. 18 employs a configuration that has a singular value decomposition processing section 11063a and a determinant calculation section 15003 instead of singular value decomposition processing section 11063 and channel capacity calculation section 11064 in FIG. 13, and additionally includes a spatial multiplexing information generation section 15004.

Determinant calculation section 15003 performs Equation (6) computation in the same way as for the connected cell, using a monitored cell channel matrix, and calculates a determinant relating only to a subcarrier selected by subcarrier selection section 11062 as monitored cell channel capacity.

When only one subcarrier has been selected by subcarrier selection section 11062, determinant calculation section 15003 outputs a calculated determinant directly to cell selection section 1107 as channel capacity, but when a plurality of subcarriers have been selected, determinant calculation section 15003 calculates a determinant representing the connected cell in the same way as determinant processing section 15002 of connected cell reception processing section 1105, and outputs this to cell selection section 1107.

Only when the monitored cell has been selected as the connected cell for the next time unit as a result of a comparison of connected cell and monitored cell channel capacities by cell selection section 1107, singular value decomposition processing section 11063a performs singular value decomposition processing by means of Equation (5), and calculates singular values per independent path only for a subcarrier selected by subcarrier selection section 11062. That is to say, singular value decomposition processing section 11063a refers to the cell selection information output from cell selection section 1107, and performs singular value decomposition processing to determine reception quality per independent path only when the monitored cell becomes the connected cell.

When singular value decomposition processing is performed by singular value decomposition processing section 11063a, spatial multiplexing information generation section 15004 generates spatial multiplexing information indicating whether MIMO communication or STC (Space Time Coding) communication is to be performed according to the result of singular value decomposition processing.

In MIMO communication, different data sequences are transmitted simultaneously from a plurality of antennas, whereas in STC communication, the same data sequence is transmitted simultaneously from a plurality of antennas. Therefore, even if reception quality per independent path of a connected cell selected by means of determinant comparison is comparatively low, and it is considered that MIMO communication cannot be performed, degradation of reception quality can be prevented, and diversity gain obtained, by switching to STC communication.

In this embodiment, determinant computation—which involves a much smaller processing load than singular value decomposition processing—is performed in the monitored cell channel capacity calculation used in cell selection. Also, since singular value decomposition processing is performed only when the monitored cell is selected as the connected cell in the next time unit, the processing load can be reduced even more than in the case of Embodiment 5, in which singular value decomposition processing is always necessary for monitored cell channel capacity calculation.

Figure 19:
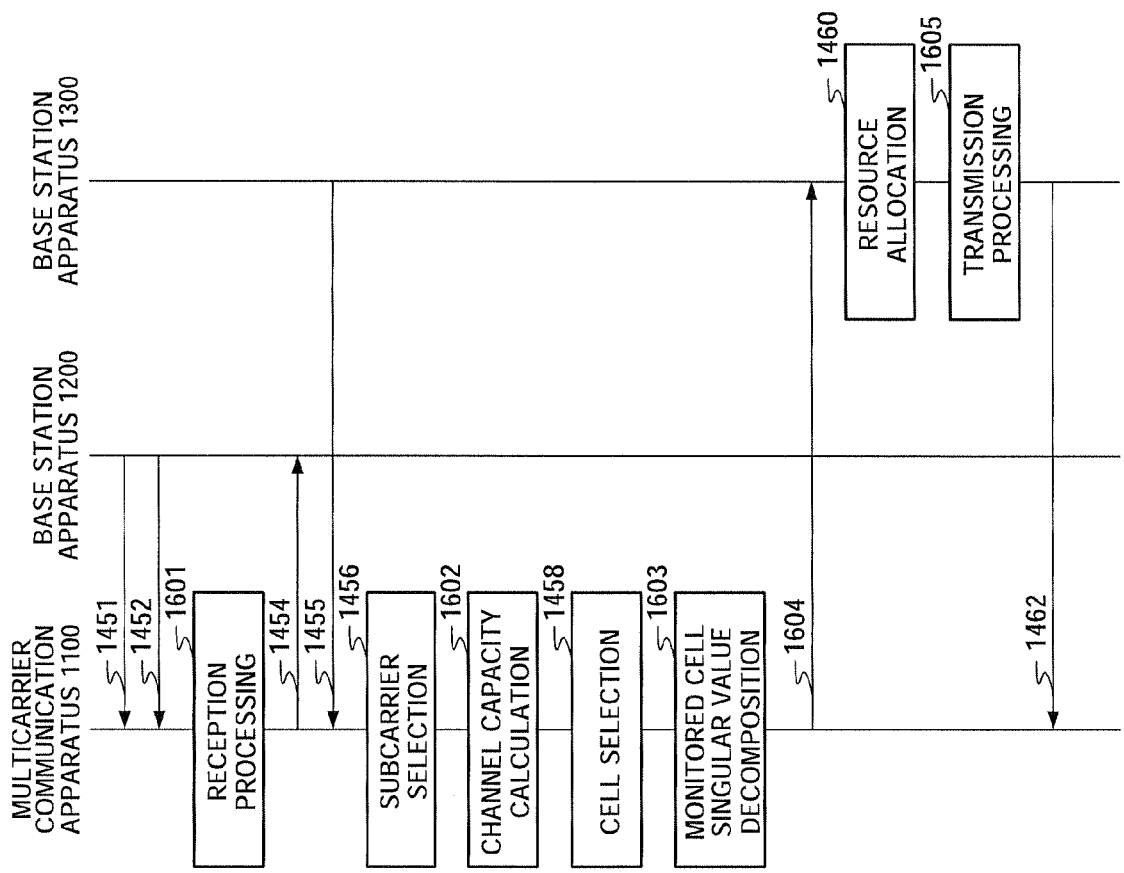
FIG. 19 is a sequence diagram showing a cell selection operation by a multicarrier communication apparatus during communication.

Cell selection by multicarrier communication apparatus 1100 configured as described above will now be explained with reference to the sequence diagram shown in FIG. 19. In this embodiment, operation when multicarrier communication apparatus 1100 is communicating with base station apparatus 1200 as the selected base station apparatus (that is, when cell 1200a is the connected cell and cell 1300a is a monitored cell) will be described. Parts in FIG. 19 identical to those in FIG. 15B are assigned the same codes as in FIG. 15B, and detailed descriptions thereof are omitted. When multicarrier communication apparatus 1100 has made cell 1200a the connected cell, common pilot signal 1451 and dedicated data signal 1452 from base station apparatus 1200 are received by RF receiving sections 1101-1 and 1101-2 of multicarrier communication apparatus 1100.

The received signals pass through GI removing sections 1102-1 and 1102-2 and FFT sections 1103-1 and 1103-2, where signals superimposed on a plurality of subcarriers are extracted.

Subcarrier signals are separated into connected cell and monitored cell signals by cell separation section 1104. Here, the signal from cell 1200a, the connected cell, is output to connected cell reception processing section 1105, where connected cell signal reception processing is performed (1601).

That is to say, channel matrixes per cell 1200a subcarrier are found by channel estimation section 11051, and the received signal is demodulated by demodulation section 11052 using the modulation method allocated to multicarrier communication apparatus 1100 in base station apparatus 1200. A demodulated dedicated data signal undergoes error correction decoding by error correction decoding section 11053 using the coding rate allocated to multicarrier communication apparatus 1100 in base station apparatus 1200, and is separated into receive data and radio resource information by separation section 11054.

In parallel with these processing steps, the channel matrixes found by channel estimation section 11051 are output to determinant calculation section 15001, per-subcarrier determinants are calculated by determinant calculation section 15001, per-subcarrier determinants are processed by determinant processing section 15002, and a determinant representing the connected cell, such as the average of per-subcarrier determinants, for example, is calculated. The calculated determinant is output to cell selection section 1107 as the channel capacity of the connected cell. This concludes the connected cell signal reception processing.

The common pilot signal output from demodulation section 11052 to radio quality measuring section 11055 is used for measurement of the radio quality of cell 1200a, the connected cell, and radio quality information is generated by radio quality measuring section 11055. The generated radio quality information may be multiplexed with a reception confirmation response or the like, and transmitted to base station apparatus 1200 as reception confirmation response signal 1454.

Meanwhile, common pilot signal 1455 transmitted from base station apparatus 1300 of cell 1300a, the monitored cell, is received on a non-periodical basis by RF receiving sections 1101-1 and 1101-2, and passes through GI removing sections 1102-1 and 1102-2 and FFT sections 1103-1 and 1103-2, where signals superimposed on a plurality of subcarriers are extracted.

Subcarrier signals are separated into connected cell and monitored cell signals by cell separation section 1104. Here, the signal from cell 1300a, the monitored cell, is output to channel estimation section 11061 of monitored cell reception processing section 1106.

Then the subcarrier with the largest total received power in cell 1300a is selected by subcarrier selection section 11062 (1456) in the same way as in Embodiment 5.

The selected subcarrier is reported to determinant calculation section 15003, Equation (6) computation is performed by determinant calculation section 15003 using the channel matrix corresponding to the selected subcarrier, and a cell 1300a determinant is found (1602). The obtained determinant is output to cell selection section 1107 as the monitored cell channel capacity, whichever of cell 1200a and cell 1300a has the larger channel capacity is selected as the connected cell for the next time unit (1458), and the base station apparatus corresponding to the connected cell becomes the selected base station apparatus. Cell selection information relating to the cell selected as the connected cell is then output by cell selection section 1107 to singular value decomposition processing section 11063a and multiplexing section 1108. It will be assumed here that cell 1300a has been selected as the connected cell, and base station apparatus 1300 has become the selected base station apparatus.

When cell selection information indicating that cell 1300a, which was previously the monitored cell, has been selected as the connected cell is output to singular value decomposition processing section 11063a, singular value decomposition processing is performed by singular value decomposition processing section 11063a by means of Equation (5) using the channel matrix corresponding to the subcarrier selected by subcarrier selection section 11062 (1603). If cell 1200a had again been selected as the connected cell, singular value decomposition processing would not be performed.

If the result of singular value decomposition processing shows that the number of singular values greater than a predetermined threshold value exceeds a predetermined number, it is determined by spatial multiplexing information generation section 15004 that MIMO communication is possible in cell 1300a, and spatial multiplexing information indicating that MIMO communication is to be performed is generated. On the other hand, if the number of singular values greater than the predetermined threshold value is less than the predetermined number, it is determined by spatial multiplexing information generation section 15004 that it is better to perform STC communication in cell 1300a, and spatial multiplexing information indicating that STC communication is to be performed is generated. The generated spatial multiplexing information is output to multiplexing section 1108 via cell selection section 1107.

When cell selection information is input to multiplexing section 1108, transmit data, cell selection information, and spatial multiplexing information are multiplexed by multiplexing section 1108, and multiplexed data is generated. The multiplexed data then passes via error correction coding section 1109 through RF transmitting sections 1113-1 and 1113-2, and a multicarrier signal 1604 containing transmit data, cell selection information, and spatial multiplexing information is transmitted via the antennas. In FIG. 19 no signal is transmitted to non-selected base station apparatus 1200, but cell selection information may also be transmitted to base station apparatus 1200.

Multicarrier signal 1604 transmitted from multicarrier communication apparatus 1100 is received by RF receiving sections 1201-1 and 1201-2 of base station apparatus 1300 via the antennas. Then the received signals pass through guard intervals are removed by GI removing sections 1202-1 and 1202-2 and FFT sections 1203-1 and 1203-2, where signals superimposed on a plurality of subcarriers are extracted.

Subcarrier signals are demodulated by demodulation section 1204, undergo error correction decoding by error correction decoding section 1205, and are separated into transmit data, cell selection information, and spatial multiplexing information by separation section 1206. Then, when the cell selection information and the spatial multiplexing information are output to resource allocation section 1207, it is determined by resource allocation section 1207 that that apparatus (base station apparatus 1300) has become the selected base station apparatus of multicarrier communication apparatus 1100, and radio resources such as modulation method and coding rate to be allocated to transmit data destined for multicarrier communication apparatus 1100 are determined (1460). In this embodiment, the spatial multiplexing information is referred to when determining radio resources, and whether MIMO communication or STC communication is to be performed is considered. Information on the determined radio resources is output to transmission control section 1208, and transmission processing of a signal destined for multicarrier communication apparatus 1100 is started (1605).

That is to say, transmit data destined for multicarrier communication apparatus 1100, and radio resource information indicating the coding rate and modulation method to be allocated to multicarrier communication apparatus 1100, are output by transmission control section 1208 to multiplexing section 1209. Also, whether MIMO communication or STC communication spatial multiplexing is to be performed is determined by transmission control section 1208 in accordance with the spatial multiplexing information.

Then transmit data destined for multicarrier communication apparatus 1100 and radio resource information are multiplexed by multiplexing section 1209, and multiplexed data is generated. The multiplexed data then undergoes error correction coding by error correction coding section 1210 and is modulated by modulation section 1211, and modulated data is obtained.

The modulated data is transmitted from the antennas as a dedicated data signal 1462 after passing via IFFT sections 1212-1 and 1212-2 through RF transmitting sections 1214-1 and 1214-2. At this time, dedicated data signal 1462 is transmitted by means of MIMO communication or STC communication according to the spatial multiplexing information.

A signal transmitted from base station apparatus 1300, the selected base station apparatus, in this way is received by multicarrier communication apparatus 1100, and receive data is obtained by means of reception processing by connected cell reception processing section 1105.

Thus, according to this embodiment, a determinant is found for the subcarrier with the largest total received power among subcarriers contained in a common pilot signal transmitted from a base station apparatus that is not the communicating party, this determinant is taken as the channel capacity, and the base station apparatus with the largest channel capacity is made the selected base station apparatus. Consequently, an increase in the processing load due to singular value decomposition processing for high-speed cell selection can be minimized, and when MIMO communication and multicarrier communication are combined, high-speed cell selection can be executed while preventing an increase in circuit scale, throughput can be dependably improved, and cell coverage can be enlarged. Also, in cell selection, the processing load can be reduced to a greater extent than when singular value decomposition processing is always performed.

In this embodiment, it has been assumed that a multicarrier signal containing cell selection information (that is, multicarrier signal 1604 in FIG. 19) is transmitted from multicarrier communication apparatus 1100 to the selected base station apparatus, but the uplink signal is not limited to a multicarrier signal, and may also be a CDMA signal or the like, for example.

In above Embodiments 5 and 6, it has been assumed that a subcarrier used for channel capacity calculation is selected using the total received power at all antennas on the transmitting and receiving sides, but total received power limited to the transmitting-side or receiving-side antennas may also be used. That is to say, for example, one transmitting-side antenna may be decided upon, and a subcarrier selected using only the received power from that antenna. This enables the processing load necessary for cell selection to be further reduced.

A multicarrier communication apparatus according to a first aspect of Embodiments 5 and 6 employs a configuration that includes: a receiving section that receives a signal of a connected cell covered by the communicating party in the present time unit and a signal of a monitored cell adjacent to the connected cell from a plurality of antennas; a first calculation section that calculates the channel capacity of the connected cell using a signal of the connected cell; a subcarrier selection section that selects one or more subcarriers from a plurality of subcarriers composing a signal of the monitored cell; a second calculation section that calculates the channel capacity of the monitored cell using a selected subcarrier; and a cell selection section that compares the channel capacity of the connected cell with the channel capacity of the monitored cell, and selects the cell with the larger channel capacity as the connected cell in the next time unit.

According to this configuration, since the channel capacity of the connected cell is calculated, one or more subcarriers are selected from the subcarriers composing a monitored cell signal and the channel capacity of the monitored cell is calculated, and the cell with the larger channel capacity is made the connected cell, the amount of processing necessary for monitored cell channel capacity calculation can be reduced, and when MIMO communication and multicarrier communication are combined, high-speed cell selection can be executed while preventing an increase in circuit scale, throughput can be dependably improved, and cell coverage can be enlarged.

A multicarrier communication apparatus according to a second aspect of Embodiments 5 and 6 employs a configuration wherein, in the above-described first aspect, the subcarrier selection section selects a subcarrier for which received power is largest among the plurality of subcarriers.

According to this configuration, since a subcarrier for which received power is largest is selected, a channel matrix used in channel capacity calculation is found accurately, and monitored cell channel capacity can be calculated accurately.

A multicarrier communication apparatus according to a third aspect of Embodiments 5 and 6 employs a configuration wherein, in the above-described first aspect, the subcarrier selection section selects a predetermined number of subcarriers from those with large received power among the plurality of subcarriers.

According to this configuration, since a predetermined number of subcarriers are selected from those with large received power, the number of subcarriers subject to channel capacity calculation increases, and therefore the amount of information is larger, and abnormal channel capacity values can be eliminated.

A multicarrier communication apparatus according to a fourth aspect of Embodiments 5 and 6 employs a configuration wherein, in the above-described first aspect, the subcarrier selection section selects a subcarrier whose received power is greater than or equal to a predetermined threshold value among the plurality of subcarriers.

According to this configuration, since a subcarrier whose received power is greater than or equal to a predetermined threshold value is selected, a subcarrier whose received power is absolutely large rather than relatively large can be selected, and monitored cell channel capacity can be calculated more accurately.

A multicarrier communication apparatus according to a fifth aspect of Embodiments 5 and 6 employs a configuration wherein, in the above-described first aspect, the subcarrier selection section selects a subcarrier according to received power at any one of the plurality of antennas.

According to this configuration, since a subcarrier is selected according to received power at one antenna, the amount of computation in received power calculation and so forth is reduced, and a subcarrier whose received power is absolutely large rather than relatively large can be selected, and the processing load necessary for cell selection can be further reduced.

A multicarrier communication apparatus according to a sixth aspect of Embodiments 5 and 6 employs a configuration wherein, in the above-described first aspect, the first calculation section has: a singular value decomposition processing section that performs singular value decomposition processing on a plurality of subcarriers composing a signal of the connected cell, and finds a singular value indicating channel quality per independent path in the connected cell every number of the plurality of subcarriers per independent path; a singular value processing section that executes predetermined processing on a found singular value, and obtains one singular value per independent path in the connected cell; and a channel capacity calculation section that calculates as the channel capacity of the connected cell the number of singular values greater than or equal to a predetermined threshold value among singular values per independent path in the connected cell obtained by the singular value processing section.

A multicarrier communication apparatus according to a seventh aspect of Embodiments 5 and 6 employs a configuration wherein, in the above-described first aspect, the second calculation section has: a singular value decomposition processing section that performs singular value decomposition processing on the selected subcarrier, and finds one singular value indicating channel quality per independent path in the monitored cell; and a channel capacity calculation section that calculates as the channel capacity of the monitored cell the number of singular values greater than or equal to a predetermined threshold value among singular values per independent path in the monitored cell.

According to these configurations, since singular values per independent path are found from singular value decomposition processing results, and the number of singular values greater than or equal to a predetermined threshold value is taken as the cell channel quality, the larger the number of independent paths with high reception quality in a cell, the larger is the channel capacity. Therefore, the larger the channel capacity of a cell, the more suitable it is for MIMO communication, enabling a cell that allows throughput to be dependably improved to be selected.

A multicarrier communication apparatus according to an eighth aspect of Embodiments 5 and 6 employs a configuration wherein, in the above-described first aspect, the first calculation section has: a determinant calculation section that performs computation on a plurality of subcarriers composing a signal of the connected cell, and calculates a determinant indicating the sum of channel qualities per independent path in the connected cell every number of the plurality of subcarriers per independent path; and a determinant processing section that executes predetermined processing on a calculated determinant, and obtains one determinant per independent path in the connected cell as the channel capacity of the connected cell.

A multicarrier communication apparatus according to a ninth aspect of Embodiments 5 and 6 employs a configuration wherein, in the above-described first aspect, the second calculation section has a determinant calculation section that performs computation on the selected subcarrier, and calculates one determinant per independent path in the monitored cell as the channel capacity of the monitored cell.

According to these configurations, since a determinant indicating the sum of channel qualities per independent path is taken as the cell channel quality, the larger the sum of channel qualities per independent path of a cell, the larger is the channel capacity. Therefore, a cell suitable for MIMO communication can be selected without performing singular value decomposition processing, and the processing load necessary for cell selection can be reduced.

A multicarrier communication apparatus according to a tenth aspect of Embodiments 5 and 6 employs a configuration wherein, in the above-described ninth aspect, there are further provided: a singular value decomposition processing section that, when a monitored cell in the present time unit is selected as a connected cell in the next time unit by the cell selection section, performs singular value decomposition processing on a subcarrier selected by the subcarrier selection section, and finds one singular value per independent path in the monitored cell; and a generation section that generates spatial multiplexing information indicating that MIMO communication is to be performed if the number of singular values greater than or equal to a predetermined threshold value among singular values per independent path in the monitored cell is greater than or equal to a predetermined number, and generates spatial multiplexing information indicating that STC communication is to be performed if the number of singular values greater than or equal to a predetermined threshold value is less than a predetermined number.

According to this configuration, since singular value decomposition processing is performed only if a monitored cell becomes a connected cell as a result of determinant comparison, and spatial multiplexing information indicating whether MIMO communication or STC communication is to be performed is generated based on this result, the processing load can be reduced by performing singular value decomposition processing only when necessary, degradation of reception quality can be prevented even when MIMO communication is not possible, and diversity gain can be obtained.

A cell selection method according to an eleventh aspect of Embodiments 5 and 6 includes: a step of receiving a signal of a connected cell covered by the communicating party in the present time unit and a signal of a monitored cell adjacent to the connected cell from a plurality of antennas; a step of calculating the channel capacity of the connected cell using a signal of the connected cell; a step of selecting one or more subcarriers from a plurality of subcarriers composing a signal of the monitored cell; a step of calculating the channel capacity of the monitored cell using a selected subcarrier; and a step of comparing the channel capacity of the connected cell with the channel capacity of the monitored cell, and selecting the cell with the larger channel capacity as the connected cell in the next time unit.

According to this method, since the channel capacity of the connected cell is calculated, one or more subcarriers are selected from the subcarriers composing a monitored cell signal and the channel capacity of the monitored cell is calculated, and the cell with the larger channel capacity is made the connected cell, the amount of processing necessary for monitored cell channel capacity calculation can be reduced, and when MIMO communication and multicarrier communication are combined, high-speed cell selection can be executed while preventing an increase in circuit scale, throughput can be dependably improved, and cell coverage can be enlarged.

Embodiment 7

A characteristic of Embodiments 7 through 9 described below is that sampling timing at which received power is high is selected from a received signal sampling interval, and a base station apparatus of a cell with a large number of mutually independent paths usable in MIMO communication is selected using only a signal of the selected sampling timing.

Figure 20:
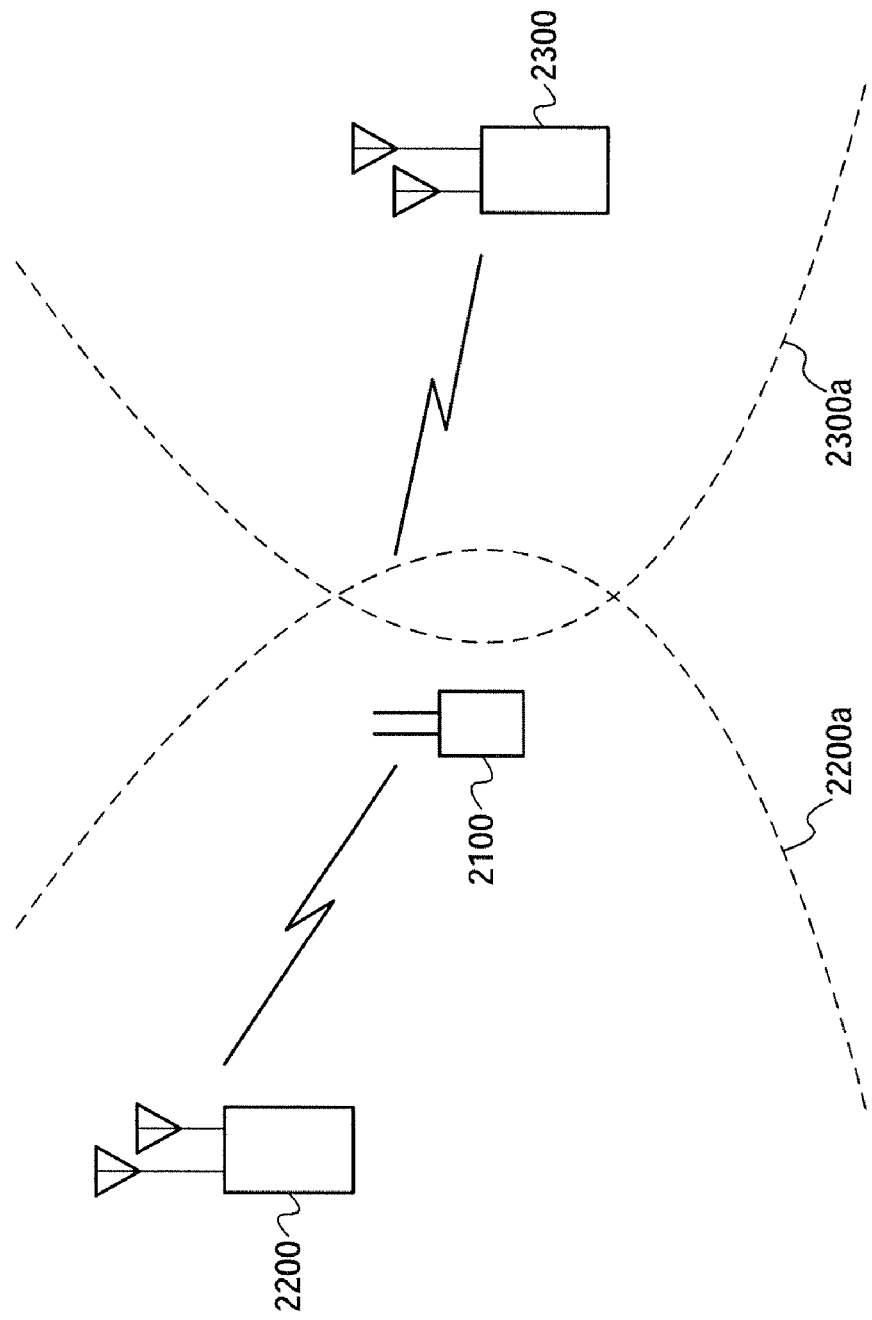
FIG. 20 is a drawing showing the configuration of a mobile communication system according to Embodiments 7 through 9 of the present invention.

FIG. 20 is a drawing showing an example of the configuration of a mobile communication system according to Embodiments 7 through 9 of the present invention. As shown in this figure, a multi-antenna communication apparatus 2100 located in an area near the boundaries of a cell 2200a covered by a base station apparatus 2200 and a cell 2300a covered by a base station apparatus 2300 receives common pilot channel signals (common pilot signals) transmitted from a plurality of antennas of both base station apparatus 2200 and base station apparatus 2300. Multi-antenna communication apparatus 2100 switches to either base station apparatus 2200 or base station apparatus 2300 as the communicating party at short time-unit intervals, such as slot-by-slot, for example.

Figure 21:
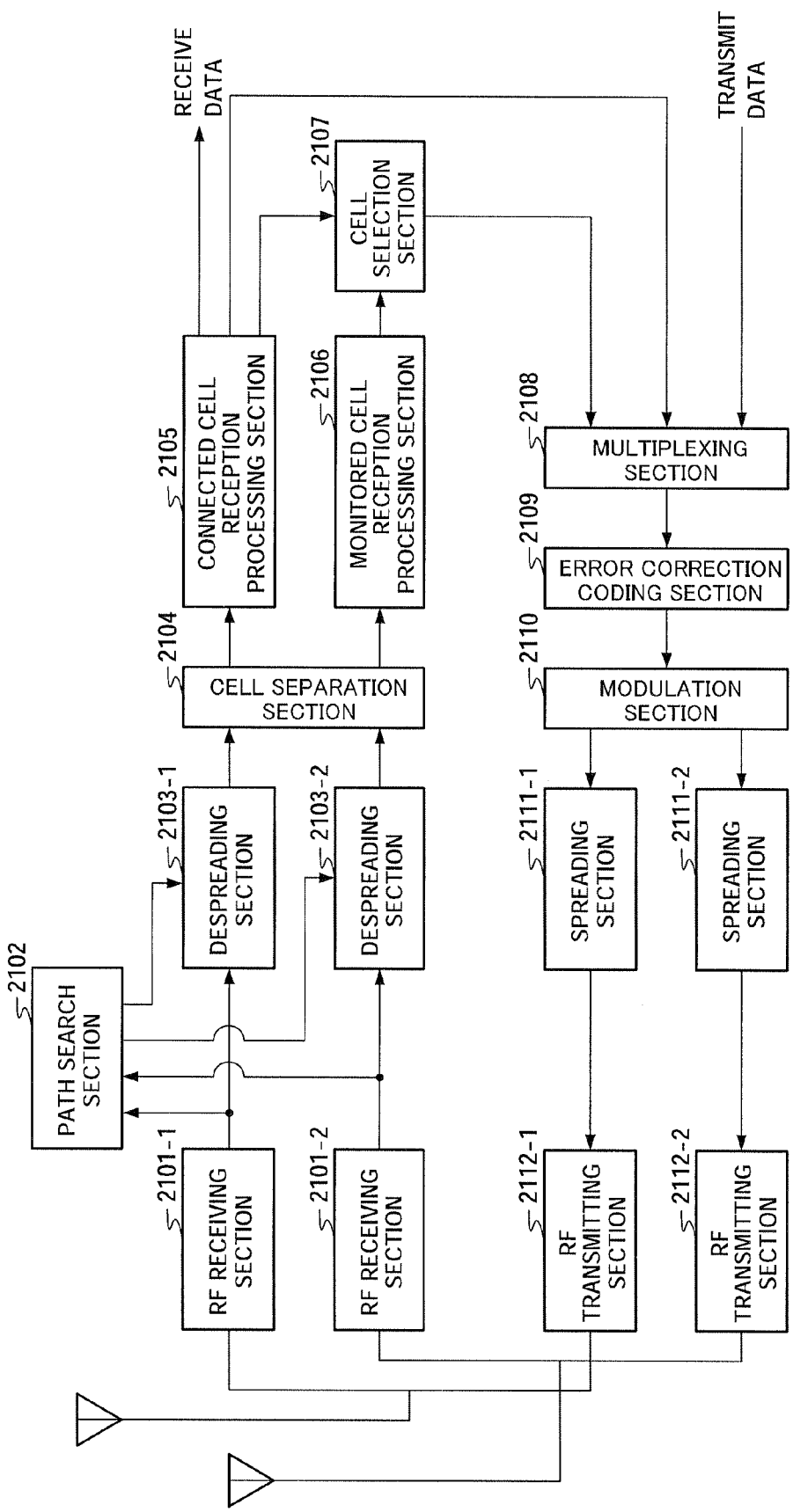
FIG. 21 is a block diagram showing the principal-part configuration of a multi-antenna communication apparatus according to Embodiment 7.

FIG. 21 is a block diagram showing the principal-part configuration of multi-antenna communication apparatus 2100 according to this embodiment. Multi-antenna communication apparatus 2100 shown in FIG. 21 has RF (Radio Frequency) receiving sections 2101-1 and 2101-2, a path search section 2102, despreading sections 2103-1 and 2103-2, a cell separation section 2104, a connected cell reception processing section 2105, a monitored cell reception processing section 2106, a cell selection section 2107, a multiplexing section 2108, an error correction coding section 2109, a modulation section 2110, spreading sections 2111-1 and 2111-2, and RF transmitting sections 2112-1 and 2112-2. In this embodiment, multi-antenna communication apparatus 2100 is assumed to have a configuration including two antennas, but in the case of three or more antennas, the processing sections comprising the RF receiving section, despreading section, spreading section, and RF transmitting section, are provided for each antenna.

RF receiving sections 2101-1 and 2101-2 sample received signals at sampling timing of a predetermined sampling rate, and execute predetermined radio reception processing (such as down-conversion and A/D conversion) on the received signals.

Path search section 2102 performs a path search whereby the directions of arrival of signals received by RF receiving sections 2101-1 and 211-2 from a plurality of paths are estimated and separated.

From the results of the path search, despreading sections 2103-1 and 2103-2 despread a signal of each path using a spreading code and scrambling code corresponding to each cell, and output the obtained despread signals to cell separation section 2104.

Cell separation section 2104 separates despread signals into per-cell signals. Specifically, cell separation section 2104 separates despread signals into signals of the cell of a base station apparatus that is currently the communicating party of multi-antenna communication apparatus 2100 (hereinafter referred to as "connected cell"), and signals of the cell that is adjacent to the connected cell and has a boundary with the connected cell near the location of multi-antenna communication apparatus 2100 (hereinafter referred to as "monitored cell"). If there are a plurality of monitored cells, cell separation section 2104 separates despread signals into signals of the respective monitored cells.

Connected cell reception processing section 2105 executes reception processing on a connected cell signal, and outputs receive data. Connected cell reception processing section 2105 also measures radio quality from a connected cell signal, and outputs radio quality information to multiplexing section 2108. Moreover, connected cell reception processing section 2105 performs singular value decomposition processing in the course of reception processing on a connected cell signal, and also calculates the connected cell channel capacity and outputs this to cell selection section 2107.

Here, a singular value is an indicator showing the reception quality per independent path on which spatially multiplexed signals are transmitted in MIMO communication, and singular value decomposition processing is processing whereby singular values per independent path are calculated using channel estimation results in the course of reception processing in MIMO communication. Also, channel capacity is an indicator showing whether or not each cell is suitable for performing MIMO communication. In MIMO communication, the larger the number of independent paths with no mutual correlation and of high reception quality, the greater is the possibility of a spatially multiplexed signal being able to be separated on the receiving side. Therefore, the more paths with a large singular value a cell has, the larger is its channel capacity, enabling it to be deemed suitable for MIMO communication. Singular values, channel capacity, and the detailed configuration of connected cell reception processing section 2105, will be described later herein.

Monitored cell reception processing section 2106 executes reception processing on a monitored cell signal, calculates the monitored cell channel capacity, and outputs this to cell selection section 2107. Here, since a monitored cell base station apparatus is not the multi-antenna communication apparatus 2100 communicating party, monitored cell reception processing section 1106 executes reception processing on a common pilot signal in the monitored cell. In the case of a monitored cell, channel capacity is not found for all intervals of a sampled common pilot signal, but is calculated only for sampling timings with high total received power. Thus, the processing load of channel capacity calculation by monitored cell reception processing section 2106 can be reduced. The detailed configuration of monitored cell reception processing section 2106 will be described later herein.

Cell selection section 2107 performs a size comparison of the connected cell channel capacity and the monitored cell channel capacity, and takes the base station apparatus of the cell with the larger channel capacity as the communicating-party base station apparatus (selected base station apparatus). That is to say, cell selection section 2107 makes the cell with the largest channel capacity the connected cell in the next time interval. Then cell selection section 2107 outputs cell selection information relating to the selected base station apparatus to multiplexing section 2108.

Multiplexing section 2108 multiplexes cell selection information, radio quality information, transmit data, and so forth, and outputs the obtained multiplexed data to error correction coding section 2109.

Error correction coding section 2109 performs error correction coding on the multiplexed data, and outputs the obtained coded data to modulation section 2110.

Modulation section 2110 modulates the coded data, and outputs the obtained modulated data to spreading sections 2111-1 and 2111-2.

Spreading sections 2111-1 and 2111-2 spread the modulated data, and output the obtained spread signals to RF transmitting sections 2112-1 and 2112-2.

RF transmitting sections 2112-1 and 2112-2 execute predetermined radio transmission processing (such as D/A conversion and up-conversion) on the spread signals, and transmit them from the corresponding antennas.

Figure 22:
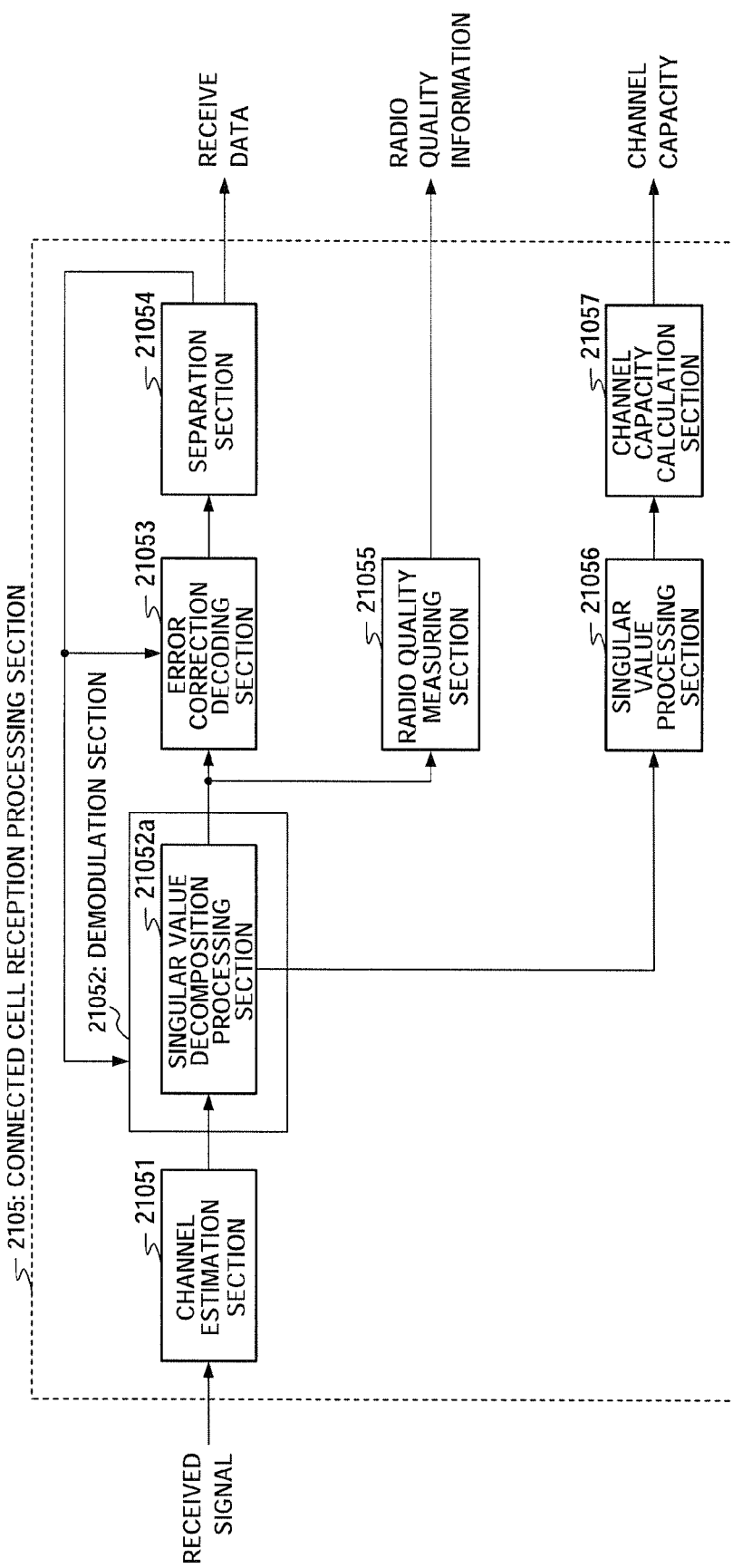
FIG. 22 is a block diagram showing the internal configuration of a connected cell reception processing section according to Embodiment 7.

FIG. 22 is a block diagram showing the internal configuration of connected cell reception processing section 2105 according to this embodiment.

A channel estimation section 21051 performs channel estimation for each path corresponding to a transmitting/receiving-side antenna pair using a common pilot signal of the connected cell. If the number of multi-antenna communication apparatus 2100 (receiving-side) antennas is designated $M_R$, and the number of base station apparatus 2200 and base station apparatus 2300 (transmitting-side) antennas is designated $M_T (\geqq M_R)$, a channel matrix of size $M_R \times M_T$ is obtained per sampling timing in RF receiving sections 2101-1 and 2101-2 as the channel estimation result. That is to say, if a base station apparatus transmit signal vector from a base station apparatus corresponding to a sampling timing i is designated $x_i(t)$, and a propagation path noise signal vector is designated $n_i(t)$, received signal vector $r_i(t)$ of sampling timing i in multi-antenna communication apparatus 2100 can be expressed as shown in Equation (7) below using channel matrix $A_i$.

[7]
$$r_i(t) = A_i x_i(t) + n_i(t) \tag{7}$$

Channel estimation section 21051 finds per-sampling-timing channel matrixes $A_i$ that satisfy Equation (7) for the connected cell. The number of base station apparatus 2200 antennas and the number of base station apparatus 2300 antennas may be different, but here, for the sake of explanation, it is assumed that both base station apparatuses have $M_T$ antennas.

A demodulation section 21052 has a singular value decomposition processing section 21052a, and demodulates a connected cell dedicated data signal. Demodulation section 21052 performs demodulation corresponding to the modulation method on the transmitting side (in base station apparatus 2200 or base station apparatus 2300), and outputs a dedicated data signal after demodulation to an error correction decoding section 21053 and a radio quality measuring section 21055. Singular value decomposition processing section 21052a performs singular value decomposition processing using channel matrix $A_i$ in the course of demodulation, and calculates singular values per independent path in the connected cell for signals at all sampling timings. Specifically, singular value decomposition processing section 21052a calculates singular values per independent path of the connected cell at sampling timing i by means of Equation (8) below.

[8]
$$A_i^H A_i = U_i \Lambda_i U_i^H \tag{8}$$

where, $\Lambda_i = \mathrm{diag}(\lambda_{i,1}, \ldots, \lambda_{i,M_R})$

In Equation (8) above, $A_i^H$ indicates a transposed conjugate of channel matrix $A_i$, $U_i$ indicates a unitary matrix obtained by aligning eigenvectors, and $U_i^H$ indicates a transposed conjugate of unitary matrix $U_i$. Also, diag( ) indicates a diagonal matrix, and in Equation (8), $M_R$ singular values $\lambda_{i,1}$ through $\lambda_{i,M_R}$ appear in the diagonal component of matrix $\Lambda_i$. As it is here assumed that $M_T \geq M_R$, $M_R$ singular values are found, whereas if $M_T < M_R$, $M_T$ singular values are found.

Error correction decoding section 21053 performs error correction decoding corresponding to the transmitting-side (base station apparatus 2200 or base station apparatus 2300) coding rate on a dedicated data signal after demodulation, and outputs a dedicated data signal after error correction decoding to a separation section 21054.

Separation section 21054 separates a dedicated data signal after error correction decoding into receive data and radio resource allocation information indicating the transmitting-side (base station apparatus 2200 or base station apparatus 2300) modulation method and coding rate, outputs the receive data, and also outputs the radio resource allocation information to demodulation section 21052 and error correction decoding section 21053.

Radio quality measuring section 21055 measures radio quality in the connected cell using the connected cell common pilot signal, and outputs radio quality information to multiplexing section 2108.

A singular value processing section 21056 processes singular values found for each sampling timing and for each independent path, and calculates singular values representing the respective independent paths. That is to say, for all singular values $\lambda_{1,1}$ through $\lambda_{1,M_R}$, $\lambda_{2,1}$ through $\lambda_{2,M_R}$, ..., $\lambda_{i,1}$ through $\lambda_{i,M_R}$, ..., $\lambda_{N,1}$ through $\lambda_{N,M_R}$ found for N sampling timings 1 through N, for example, singular value processing section 21056 calculates singular values $\lambda_1$ through $\lambda_{M_R}$ representing the respective independent paths by dividing the sum of singular values $\lambda_{1,j}$ through $\lambda_{N,j}$ per independent path j by total number of sampling timings N to obtain an average value. Thus, one singular value $\lambda_j$ corresponds to one independent path j.

A channel capacity calculation section 21057 compares singular values $\lambda_1$ through $\lambda_{M_R}$ per independent path obtained by singular value processing section 21056 with a predetermined threshold value, and calculates the number of singular values greater than or equal to the predetermined threshold value as the channel capacity of the connected cell. As stated above, singular values are indicators showing the reception quality of independent paths in MIMO communication. In MIMO communication, the larger the number of paths with high reception quality, the more accurately signals transmitted simultaneously from a plurality of antennas can be separated, and therefore the larger the number of singular values greater than or equal to the predetermined threshold value, the higher is the throughput. Channel capacity calculation section 21057 reports the calculated connected cell channel capacity (that is, the number of singular values greater than or equal to the predetermined threshold value) to cell selection section 2107.

Figure 23:
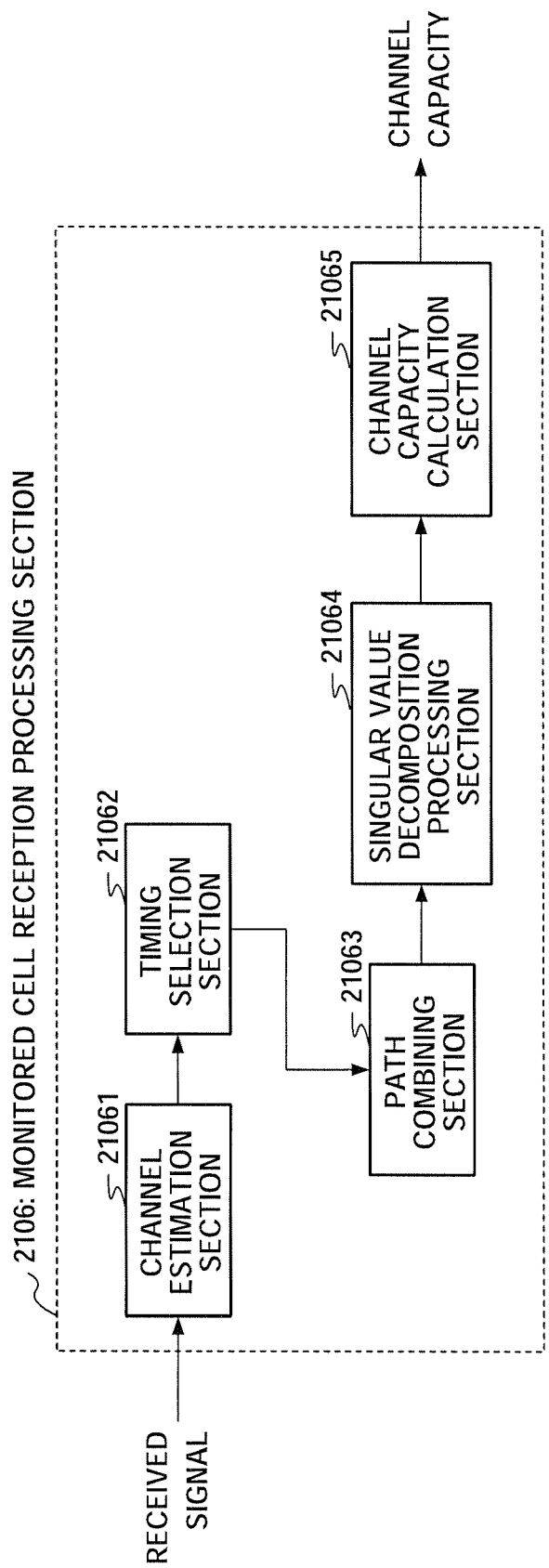
FIG. 23 is a block diagram showing the internal configuration of a monitored cell reception processing section according to Embodiment 7.

FIG. 23 is a block diagram showing the internal configuration of monitored cell reception processing section 2106 according to this embodiment.

A channel estimation section 21061 performs channel estimation for each path corresponding to a transmitting/receiving-side antenna pair using a common pilot signal of a monitored cell, and finds a monitored cell channel matrix.

A timing selection section 21062 calculates received power per sampling timing for each antenna pair comprising a multi-antenna communication apparatus 2100 (receiving-side) antenna and a monitored cell base station apparatus (transmitting-side) antenna from channel estimation results obtained by channel estimation section 21061, and selects a sampling timing at which the total received power of all antenna pairs is greater than or equal to a predetermined threshold value as a sampling timing for singular value decomposition processing. That is to say, for one sampling timing, timing selection section 21062 calculates the total received power per sampling timing by summing the received power of signals from $M_T$ transmitting-side antennas received respectively by $M_R$ receiving-side antennas (that is, $M_R \times M_T$ received power for one sampling timing), and selects a sampling timing at which the total received power is greater than or equal to a predetermined threshold value.

Unlike a connected cell signal, only a common pilot signal is received as a monitored cell signal, and demodulation is not performed, so that singular value decomposition processing is not performed in the monitored cell signal reception processing stage. Therefore, for a monitored cell, it is only necessary to perform singular value decomposition processing for cell selection. At this time, the processing load of singular value decomposition processing can be reduced by selecting a sampling timing at which the total received power is greater than or equal to a predetermined threshold value as described above, and performing singular value decomposition processing only for this sampling timing.

Also, since a channel matrix is found most accurately for a sampling timing at which the total received power is greater than or equal to a predetermined threshold value, the singular value decomposition processing results can also be expected to be accurate. As a result, monitored cell channel capacity can be calculated accurately with a small amount of processing.

It is also possible for timing selection section 21062 not to select a sampling timing at which the total received power is greater than or equal to a predetermined threshold value, but to select a predetermined number of sampling timings from those with high total received power. In this case, the number of sampling timings subject to singular value decomposition processing is always constant, and sampling timings subject to singular value decomposition processing are selected dependably even if received power is low overall.

A path combining section 21063 finds a channel matrix when signals of paths corresponding to a selected sampling timing are combined, and outputs this channel matrix to a singular value decomposition processing section 21064.

Singular value decomposition processing section 21064 performs singular value decomposition processing by means of Equation (8) in the same way as for the connected cell, using a channel matrix output from path combining section 21063, and calculates singular values per independent path in the monitored cell only for a sampling timing selected by timing selection section 21062.

A channel capacity calculation section 21065 compares singular values per independent path output from singular value decomposition processing section 21064 with a predetermined threshold value, and calculates the number of singular values greater than or equal to the predetermined threshold value as the channel capacity of the monitored cell.

Figure 24:
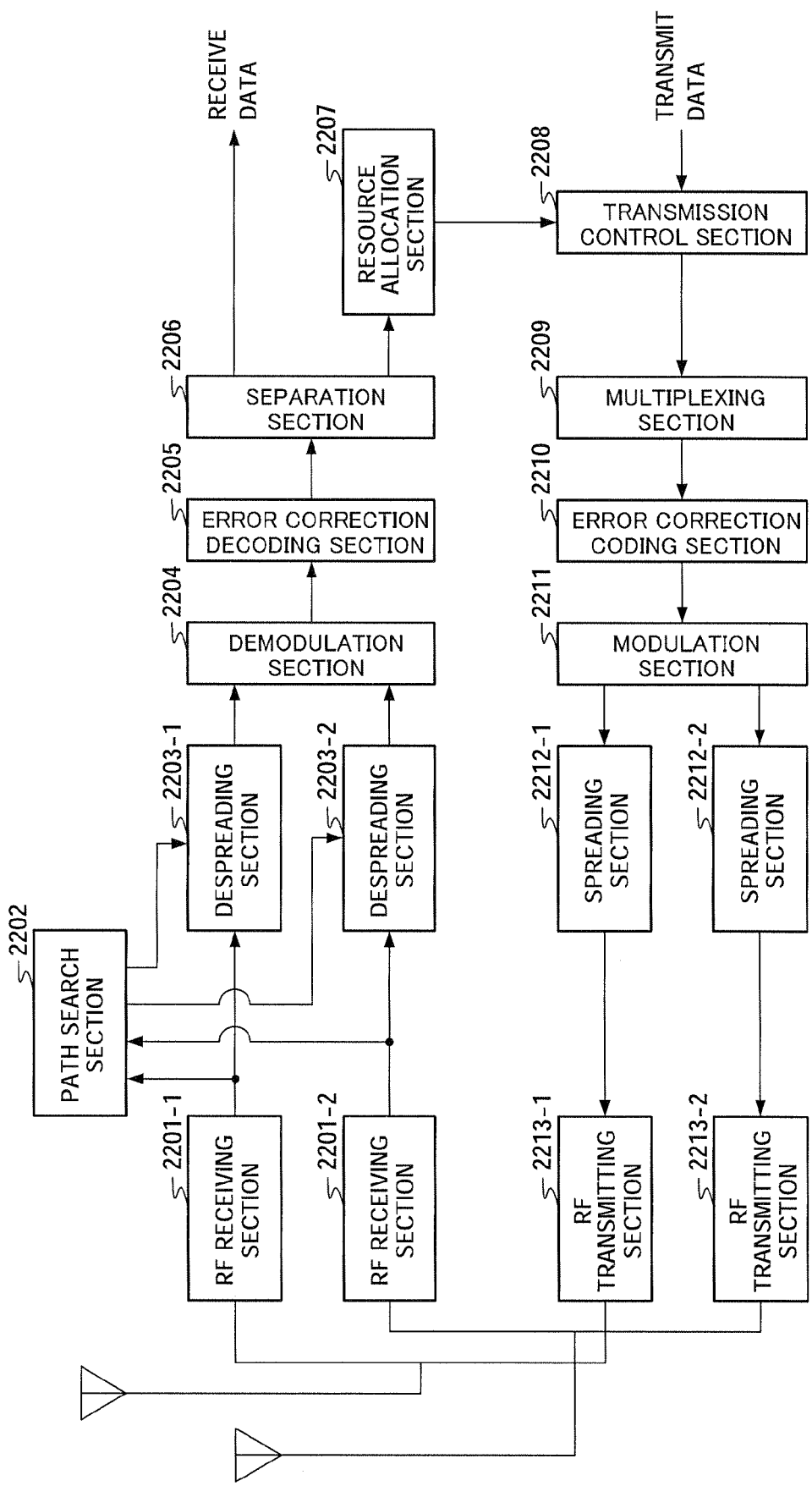
FIG. 24 is a block diagram showing the principal-part configuration of a base station apparatus according to Embodiment 7.

FIG. 24 is a block diagram showing the principal-part configuration of base station apparatus 2200 according to this embodiment. Base station apparatus 2200 shown in FIG. 24 has RF receiving sections 2201-1 and 2201-2, a path search section 2202, despreading sections 2203-1 and 2203-2, a demodulation section 2204, an error correction decoding section 2205, a separation section 2206, a resource allocation section 2207, a transmission control section 2208, a multiplexing section 2209, an error correction coding section 2210, a modulation section 2211, spreading sections 2212-1 and 2212-2, and RF transmitting sections 2113-1 and 2113-2. Base station apparatus 2300 also has the same kind of configuration as base station apparatus 2200.

RF receiving sections 2201-1 and 2201-2 receive signals from the corresponding antennas, and execute predetermined radio reception processing (such as down-conversion and A/D conversion) on the received signals.

Path search section 2202 performs a path search whereby the directions of arrival of signals received by RF receiving sections 2201-1 and 2201-2 from a plurality of paths are estimated and separated.

From the results of the path search, despreading sections 2203-1 and 2203-2 despread a signal of each path, and output the obtained despread signals to demodulation section 2204.

Demodulation section 2204 demodulates the despread signals and outputs the obtained demodulated signal to error correction decoding section 2205.

Error correction decoding section 2205 performs error correction decoding on the demodulated signal, and outputs the signal after error correction decoding to separation section 2206.

Separation section 2206 separates the signal after error correction decoding into receive data, and cell selection information and radio quality information, outputs the receive data, and also outputs the cell selection information and radio quality information to resource allocation section 2207.

Resource allocation section 2207 refers to the cell selection information and determines whether or not that apparatus (base station apparatus 2200) is the selected base station apparatus, and if it is the selected base station apparatus, refers to the radio quality information and determines the radio resources to be allocated to transmit data destined for multi-antenna communication apparatus 2100.

Transmission control section 2208 controls the transmission order of transmit data for multi-antenna communication apparatus 2100 and other communication apparatuses, and so forth, and generates radio resource allocation information indicating the modulation method and coding rate for transmit data.

Multiplexing section 2209 multiplexes transmit data, radio resource allocation information, a common pilot signal (not shown), and so forth, and outputs the obtained multiplexed data to error correction coding section 2210.

Error correction coding section 2210 performs error correction coding on the multiplexed data using a coding rate corresponding to the relevant transmission destination, and outputs the obtained coded data to modulation section 2211.

Modulation section 2211 modulates the coded data using a modulation method corresponding to the relevant transmission destination, and outputs the obtained modulated data to spreading sections 2212-1 and 2212-2.

Spreading sections 2211-1 and 2211-2 spread the modulated data, and output the obtained spread signals to RF transmitting sections 2113-1 and 2213-2.

RF transmitting sections 2113-1 and 2213-2 execute predetermined radio transmission processing (such as D/A conversion and up-conversion) on the spread signals, and transmit them from the corresponding antennas.

Figure 25:
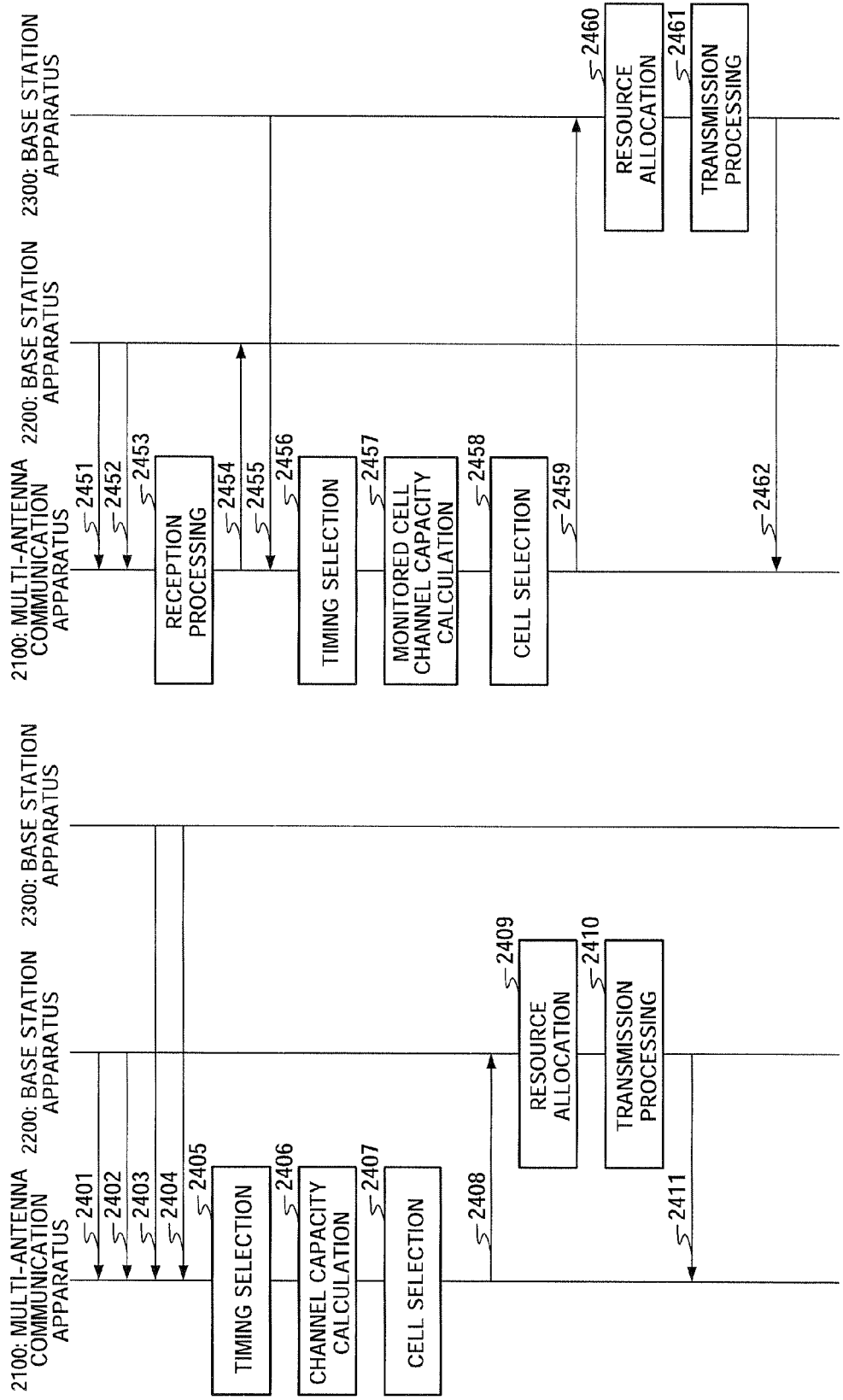
FIG. 25A is a sequence diagram showing a cell selection operation by a multi-antenna communication apparatus at the start of communication.
FIG. 25B is a sequence diagram showing a cell selection operation by a multi-antenna communication apparatus during communication.

Cell selection by multi-antenna communication apparatus 2100 configured as described above will now be explained, divided into operations at the start of communication and during communication, with reference to the sequence diagrams shown in FIG. 25A and FIG. 25B.

First, operation at the start of communication, such as when multi-antenna communication apparatus 2100 is powered on, will be described with reference to FIG. 25A. When multi-antenna communication apparatus 2100 is located near the boundaries of base station apparatus 2200 cell 2200a and base station apparatus 2300 cell 2300a, a common pilot signal 2401 and dedicated data signal 2402 from base station apparatus 2200, and a common pilot signal 2403 and dedicated data signal 2404 from base station apparatus 2300, are sampled by RF receiving sections 2101-1 and 2101-2 of multi-antenna communication apparatus 2100 at predetermined sampling timing.

The received signals obtained by sampling undergo predetermined radio reception processing by RF receiving sections 2101-1 and 2101-2, have a path search performed by path search section 2102, and are despread by despreading sections 2103-1 and 2103-2, whereby despread signals destined for that apparatus (multi-antenna communication apparatus 2100) are extracted.

The despread signals are separated into connected cell and monitored cell signals by cell separation section 2104. However, since this description refers to the start of communication, there is no connected cell, and cell 2200a and cell 2300a are both monitored cells. Therefore, signals from both cell 2200a and cell 2300a are output to channel estimation section 21061 of monitored cell reception processing section 2106.

Then a cell 2200a channel matrix and a cell 2300a channel matrix are found by channel estimation section 21061, and sampling timings at which the total received power is greater than or equal to a predetermined threshold value in each cell are selected by timing selection section 21062 (2405).

Figure 26:
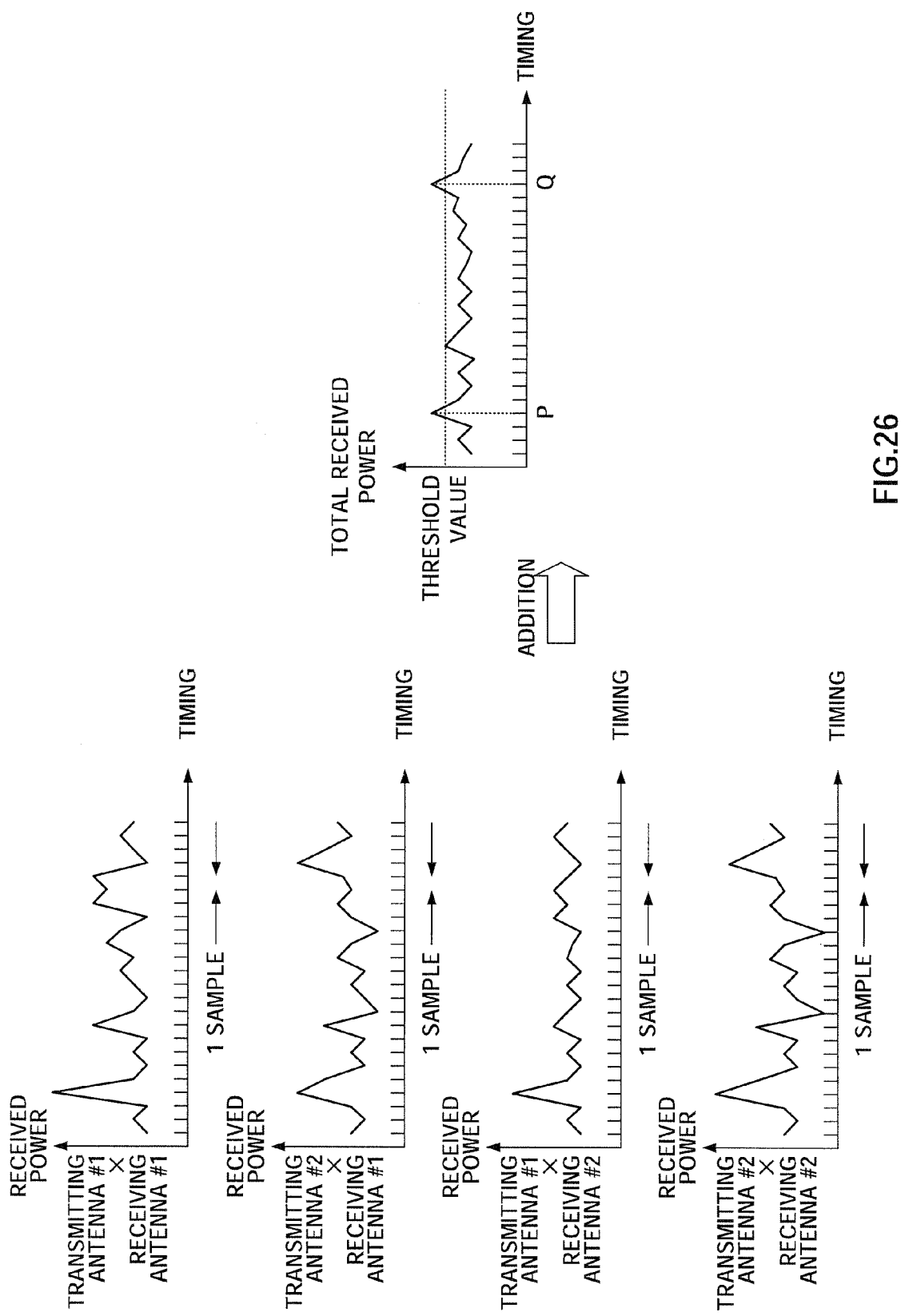
FIG. 26 is a drawing showing an example of sample timing selection according to Embodiment 7.

Specifically, if, for example, base station apparatus 2200 has two antennas, transmitting antenna #1 and transmitting antenna #2, and multi-antenna communication apparatus 2100 has two antennas, receiving antenna #1 and receiving antenna #2, total received power is found by timing selection section 21062 by summing the received power per sampling timing of each transmitting antenna/receiving antenna pair, as shown in FIG. 26. Then sampling timing P and sampling timing Q for which the total received power is greater than or equal to a predetermined threshold value are selected by timing selection section 21062. Sampling timings at which the total received power is greater than or equal to a predetermined threshold value are also selected in the same way by timing selection section 21062 for base station apparatus 2300 cell 2300a.

The sampling timings selected for each cell are reported to path combining section 21063, and a channel matrix when signals of paths corresponding to the selected sampling timings are combined is found by path combining section 21063. In other words, a channel matrix is found for a case in which there is assumed to be one signal of a sampling timing at which the total received power is large. The obtained channel matrix is output to singular value decomposition processing section 21064.

Singular value decomposition processing is performed by singular value decomposition processing section 21064 by means of Equation (8) using the channel matrix output from path combining section 21063, and singular values per independent path are found for cell 2200a and cell 2300a.

By selecting and limiting sampling timings subject to singular value decomposition processing in this way, an increase in the processing load due to singular value decomposition processing can be minimized, and high-speed cell selection can be executed while preventing an increase in circuit scale. Also, by selecting sampling timing at which the total received power is greater than or equal to a predetermined threshold value in sampling timing selection, singular value decomposition processing can be performed using an accurate channel matrix, and obtained singular values are also accurate.

Then the numbers of singular values greater than or equal to a predetermined threshold value are calculated by channel capacity calculation section 21065 as the channel capacities of cell 2200a and cell 2300a (2406). The calculated channel capacities are output to cell selection section 2107, whichever of cell 2200a and cell 2300a has the larger channel capacity is selected as the connected cell for the next time unit (2407), and the base station apparatus corresponding to the connected cell becomes the selected base station apparatus. Cell selection information relating to the cell selected as the connected cell is then output by cell selection section 2107 to multiplexing section 2108. It will be assumed here that cell 2200a has been selected as the connected cell, and base station apparatus 2200 has become the selected base station apparatus.

Since, in this embodiment, singular value decomposition processing is performed for sampling timing at which the total received power is greater than or equal to a predetermined threshold value as described above, obtained singular values are accurate, and as a result, channel capacity reliability is also high. Therefore, cell 2200a selected as the connected cell is certainly more suitable for MIMO communication than cell 2300a, and enables cell coverage to be enlarged by improving throughput.

When cell selection information is input to multiplexing section 2108, transmit data and cell selection information are multiplexed by multiplexing section 2108, and multiplexed data is generated. The multiplexed data then undergoes error correction coding by error correction coding section 2109 and is modulated by modulation section 2110, and modulated data is obtained.

The modulated data is then spread by spreading sections 2111-1 and 2111-2, and undergoes predetermined radio transmission processing by RF transmitting sections 2112-1 and 2112-2, and a spread signal 2408 containing transmit data and cell selection information is transmitted via the antennas. In FIG. 25A no signal is transmitted to non-selected base station apparatus 2300, but cell selection information may also be transmitted to base station apparatus 2300.

Spread signal 2408 transmitted from multi-antenna communication apparatus 2100 is received by RF receiving sections 2201-1 and 2201-2 of base station apparatus 2200 via the antennas. Then the received signals undergo predetermined radio reception processing by RF receiving sections 2201-1 and 2201-2, have a path search performed by path search section 2202, and are despread by despreading sections 2203-1 and 2203-2, whereby despread signals destined for that apparatus (base station apparatus 2200) are extracted.

The despread signals are demodulated by demodulation section 2204, undergo error correction decoding by error correction decoding section 2205, and are separated into transmit data and cell selection information by separation section 2206. Then, when the cell selection information is output to resource allocation section 2207, it is determined by resource allocation section 2207 that that apparatus (base station apparatus 2200) has become the selected base station apparatus of multi-antenna communication apparatus 2100, and radio resources such as modulation method and coding rate to be allocated to transmit data destined for multi-antenna communication apparatus 2100 are determined (2409). Information on the determined radio resources is output to transmission control section 2208, and transmission processing of a signal destined for multi-antenna communication apparatus 2100 is started (2410).

That is to say, transmit data destined for multi-antenna communication apparatus 2100, and radio resource information indicating the coding rate and modulation method to be allocated to multi-antenna communication apparatus 2100, are output by transmission control section 2208 to multiplexing section 2209.

Then transmit data destined for multi-antenna communication apparatus 2100 and radio resource information are multiplexed by multiplexing section 2209, and multiplexed data is generated. The multiplexed data then undergoes error correction coding by error correction coding section 2210 and is modulated by modulation section 2211, and modulated data is obtained.

The modulated data is spread by spreading sections 2212-1 and 2212-2, and undergoes predetermined radio transmission processing by RF transmitting sections 2113-1 and 2113-2, and a dedicated data signal 2411 containing transmit data and radio resource information is transmitted via the antennas.

A signal transmitted from base station apparatus 2200, the selected base station apparatus, in this way is received by multi-antenna communication apparatus 2100, and receive data is obtained by means of reception processing by connected cell reception processing section 2105.

Next, operation when multi-antenna communication apparatus 2200 is communicating with base station apparatus 1200 as the selected base station apparatus (that is, when cell 2200a is the connected cell and cell 2300a is a monitored cell) will be described with reference to FIG. 25B. When multi-antenna communication apparatus 2100 has made cell 2200a the connected cell, a common pilot signal 2451 and dedicated data signal 2452 from base station apparatus 2200 are sampled by RF receiving sections 2101-1 and 2101-2 of multi-antenna communication apparatus 2100 at predetermined sampling timing.

The received signals obtained by sampling undergo predetermined radio reception processing by RF receiving sections 2101-1 and 2101-2, have a path search performed by path search section 2102, and are despread by despreading sections 2103-1 and 2103-2, whereby despread signals destined for that apparatus (multi-antenna communication apparatus 2100) are extracted.

The despread signals are separated into connected cell and monitored cell signals by cell separation section 2104. Here, the signal from cell 2200a, the connected cell, is output to connected cell reception processing section 2105, where connected cell signal reception processing is performed (2453).

That is to say, channel matrixes per cell 2200a sampling timing are found by channel estimation section 21051, the received signal is demodulated by demodulation section 21052 using the modulation method allocated to multi-antenna communication apparatus 2100 in base station apparatus 2200, and singular value decomposition processing is performed by singular value decomposition processing section 21052a in the course of this demodulation. Singular values per independent path in the connected cell obtained by means of singular value decomposition processing are output to singular value processing section 21056, a demodulated dedicated data signal is output to error correction decoding section 21053, and a common pilot signal is output to radio quality measuring section 21055.

The dedicated data signal output to error correction decoding section 21053 undergoes error correction decoding using the coding rate allocated to multi-antenna communication apparatus 2100 in base station apparatus 2200, and is separated into receive data and radio resource information by separation section 21054, and the radio resource information is output to demodulation section 21052 and error correction decoding section 21053.

Singular values per independent path at all sampling timings are output to singular value processing section 21056, and singular values representing the respective independent paths are calculated by singular value processing section 21056 by finding an average value per independent path, for example.

The number of singular values greater than or equal to a predetermined threshold value is calculated by channel capacity calculation section 21057 as the channel capacity of cell 2200a, and is output to cell selection section 2107. This concludes the connected cell signal reception processing.

The common pilot signal output to radio quality measuring section 21055 is used for measurement of the radio quality of cell 2200a, the connected cell, and radio quality information is generated by radio quality measuring section 21055. The generated radio quality information may be multiplexed with a reception confirmation response or the like, and transmitted to base station apparatus 2200 as a reception confirmation response signal 2454.

Meanwhile, a common pilot signal 2455 transmitted from base station apparatus 2300 of cell 2300a, the monitored cell, is received on a non-periodical basis by RF receiving sections 2101-1 and 2101-2 and undergoes predetermined radio reception processing, have a path search performed by path search section 2102, and are despread by despreading sections 2103-1 and 2103-2, whereby despread signals destined for that apparatus (multi-antenna communication apparatus 2100) are extracted.

The despread signals are separated into connected cell and monitored cell signals by cell separation section 2104. Here, the signal from cell 2300a, the monitored cell, is output to channel estimation section 21061 of monitored cell reception processing section 2106.

Cell 2300a channel matrixes are found by channel estimation section 21061, and sampling timings at which the total received power is greater than or equal to a predetermined threshold value are selected by timing selection section 21062, as shown in FIG. 26 (2456).

The selected sampling timings are reported to path combining section 21063, and a channel matrix when signals of paths corresponding to the selected sampling timings are combined is found by path combining section 21063. The obtained channel matrix is output to singular value decomposition processing section 21064.

Singular value decomposition processing is performed by singular value decomposition processing section 21064 by means of Equation (8) using the channel matrix output from path combining section 21063, and singular values per independent path are found for cell 2300a.

The number of singular values greater than or equal to a predetermined threshold value is calculated by channel capacity calculation section 21065 as the channel capacity of cell 2300a, the monitored cell (2457). The calculated cell 2300a channel capacity is output to cell selection section 2107, whichever of cell 2200a and cell 2300a has the larger channel capacity is selected as the connected cell for the next time unit (2458), and the base station apparatus corresponding to the connected cell becomes the selected base station apparatus. Cell selection information relating to the cell selected as the connected cell is then output by cell selection section 2107 to multiplexing section 2108. It will be assumed here that cell 2300a has been selected as the connected cell, and base station apparatus 2300 has become the selected base station apparatus.

When cell selection information is input to multiplexing section 2108, transmit data and cell selection information are multiplexed by multiplexing section 2108, and multiplexed data is generated. The multiplexed data then undergoes error correction coding by error correction coding section 2109 and is modulated by modulation section 2110, and modulated data is obtained.

The modulated data is then spread by spreading sections 2111-1 and 2111-2, and undergoes predetermined radio transmission processing by RF transmitting sections 2112-1 and 2112-2, and a spread signal 2459 containing transmit data and cell selection information is transmitted via the antennas. In FIG. 25B no signal is transmitted to non-selected base station apparatus 2200, but cell selection information may also be transmitted to base station apparatus 2200.

Spread signal 2459 transmitted from multi-antenna communication apparatus 2100 is received by RF receiving sections 2201-1 and 2201-2 of base station apparatus 2300 via the antennas. Then the received signals undergo predetermined radio reception processing by RF receiving sections 2201-1 and 2201-2, have a path search performed by path search section 2202, and are despread by despreading sections 2203-1 and 2203-2, whereby despread signals destined for that apparatus (base station apparatus 2300) are extracted.

The despread signals are demodulated by demodulation section 2204, undergo error correction decoding by error correction decoding section 2205, and are separated into transmit data and cell selection information by separation section 2206. Then, when the cell selection information is output to resource allocation section 2207, it is determined by resource allocation section 2207 that that apparatus (base station apparatus 2300) has become the selected base station apparatus of multi-antenna communication apparatus 2100, and radio resources such as modulation method and coding rate to be allocated to transmit data destined for multi-antenna communication apparatus 2100 are determined (2460). Information on the determined radio resources is output to transmission control section 2208, and transmission processing of a signal destined for multi-antenna communication apparatus 2100 is started (2461).

That is to say, transmit data destined for multi-antenna communication apparatus 2100, and radio resource information indicating the coding rate and modulation method to be allocated to multi-antenna communication apparatus 2100, are output by transmission control section 2208 to multiplexing section 2209.

Then transmit data destined for multi-antenna communication apparatus 2100 and radio resource information are multiplexed by multiplexing section 2209, and multiplexed data is generated. The multiplexed data then undergoes error correction coding by error correction coding section 2210 and is modulated by modulation section 2211, and modulated data is obtained.

The modulated data is spread by spreading sections 2212-1 and 2212-2, and undergoes predetermined radio transmission processing by RF transmitting sections 2113-1 and 2113-2, and a dedicated data signal 2462 containing transmit data and radio resource information is transmitted via the antennas.

A signal transmitted from base station apparatus 2300, the selected base station apparatus, in this way is received by multi-antenna communication apparatus 2100, and receive data is obtained by means of reception processing by connected cell reception processing section 2105.

Thus, according to this embodiment, singular value decomposition processing is performed for a sampling timing at which the total received power is greater than or equal to a predetermined threshold value among sampling timings of a common pilot signal transmitted from a base station apparatus that is not the communicating party, the number of singular values greater than or equal to a predetermined threshold value is taken as the channel capacity, and the base station apparatus with the largest channel capacity is made the selected base station apparatus. Consequently, an increase in the processing load due to singular value decomposition processing for high-speed cell selection can be minimized, high-speed cell selection can be executed while preventing an increase in circuit scale, throughput can be dependably improved, and cell coverage can be enlarged.

Embodiment 8

A characteristic of this embodiment is that sampling timing at which received power is largest is selected from a received signal sampling interval, and singular value decomposition processing is performed only for selected sampling timing.

The configuration of a mobile communication system according to this embodiment is the same as that of the mobile communication system shown in FIG. 20, and therefore a description thereof is omitted. Also, the principal-part configurations of a multi-antenna communication apparatus 2100 and base station apparatus 2200 according to this embodiment are the same as those of multi-antenna communication apparatus 2100 and base station apparatus 2200 shown in FIG. 21 and FIG. 24, and therefore descriptions thereof are omitted.

In this embodiment, only the internal configuration of monitored cell reception processing section 2106 in multi-antenna communication apparatus 2100 differs from that in Embodiment 7. Therefore, the internal configuration of monitored cell reception processing section 2106 will be described.

Figure 27:
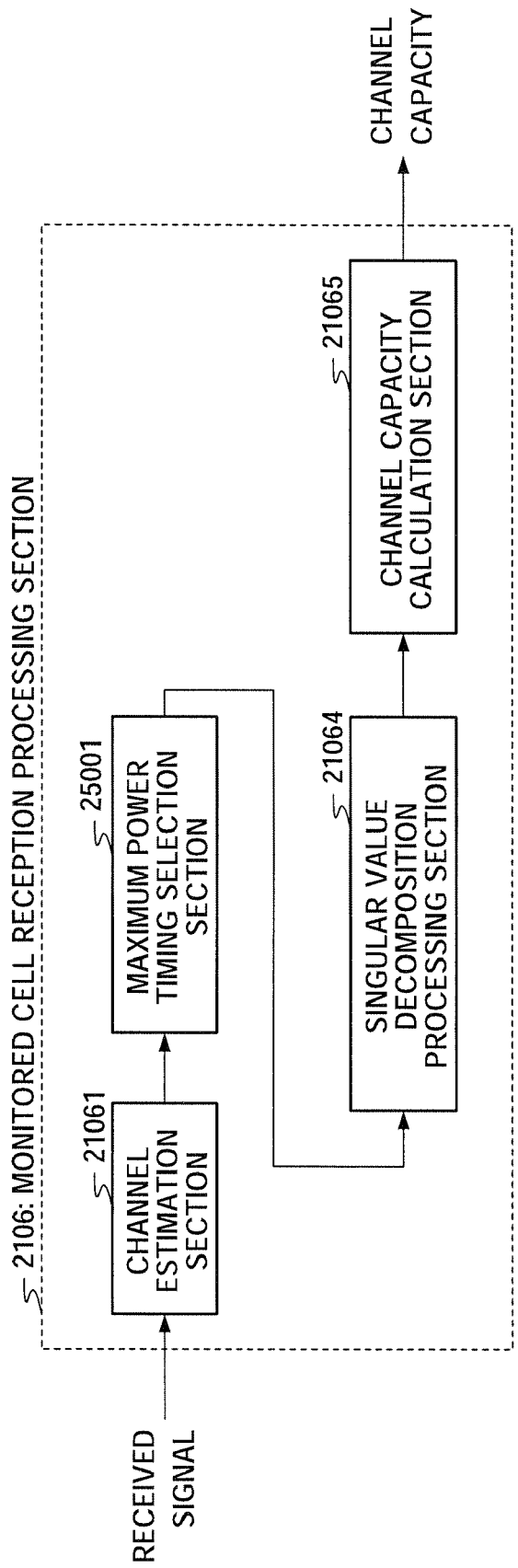
FIG. 27 is a block diagram showing the internal configuration of a monitored cell reception processing section according to Embodiment 8 of the present invention.

FIG. 27 is a block diagram showing the internal configuration of monitored cell reception processing section 2106 according to this embodiment. Parts in FIG. 27 identical to those in FIG. 23 are assigned the same codes as in FIG. 23, and descriptions thereof are omitted. Monitored cell reception processing section 2106 shown in FIG. 27 employs a configuration that has a maximum power timing selection section 25001 instead of timing selection section 21062 and path combining section 21063 in FIG. 23.

Maximum power timing selection section 25001 calculates received power per sampling timing for each antenna pair comprising a multi-antenna communication apparatus 2100 (receiving-side) antenna and a monitored cell base station apparatus (transmitting-side) antenna from channel estimation results obtained by channel estimation section 21061, and selects a sampling timing at which the total received power of all antenna pairs is largest as a sampling timing for singular value decomposition processing.

Figure 28:
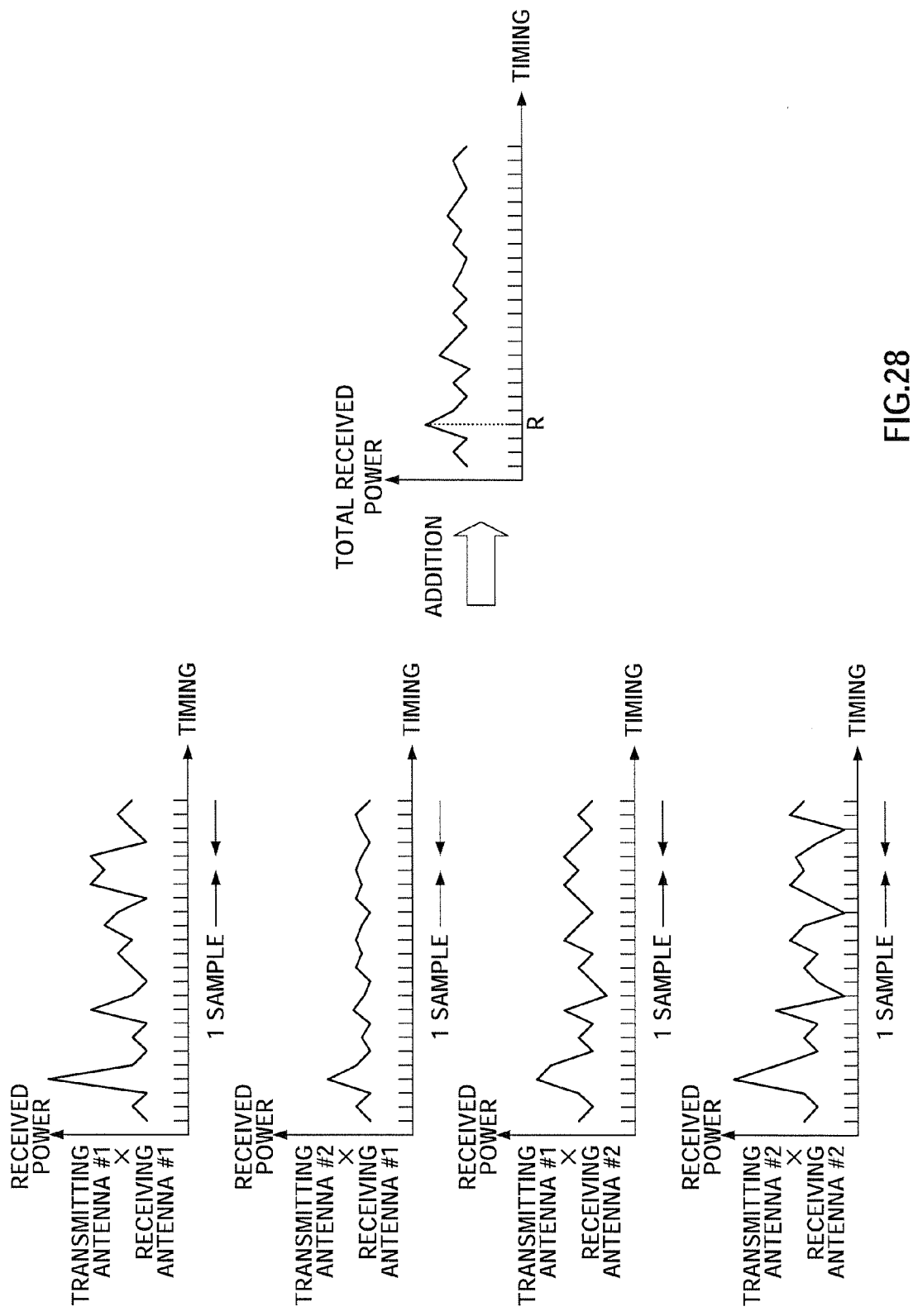
FIG. 28 is a drawing showing an example of sample timing selection according to Embodiment 8.

Specifically, if, for example, the base station apparatus of the monitored cell has two antennas, transmitting antenna #1 and transmitting antenna #2, and multi-antenna communication apparatus 2100 has two antennas, receiving antenna #1 and receiving antenna #2, maximum power timing selection section 25001 finds the total received power by summing the received power per sampling timing of each transmitting antenna/receiving antenna pair, as shown in FIG. 28. Then maximum power timing selection section 25001 selects sampling timing R at which the total received power is largest.

In this embodiment, since maximum power timing selection section 25001 selects only the sampling timing at which the total received power is largest as a sampling timing for singular value decomposition processing, only one sampling timing is always selected, and it is not necessary to combine the signals of paths corresponding to a plurality of sampling timings as in Embodiment 7. Therefore, the processing load when performing singular value decomposition processing for a monitored cell can be further reduced.

Thus, according to this embodiment, singular value decomposition processing is performed for a sampling timing at which the total received power is highest among sampling timings of a common pilot signal transmitted from a base station apparatus that is not the communicating party, the number of singular values greater than or equal to a predetermined threshold value is taken as the channel capacity, and the base station apparatus with the largest channel capacity is made the selected base station apparatus. Consequently, an increase in the processing load due to singular value decomposition processing for high-speed cell selection can be minimized, high-speed cell selection can be executed while preventing an increase in circuit scale, throughput can be dependably improved, and cell coverage can be enlarged. Also, since there is always only one selected sampling timing, the processing load when performing singular value decomposition processing can be further reduced.

Embodiment 9

A characteristic of this embodiment is that a determinant is used as channel capacity used in cell selection, and a base station apparatus that becomes the communicating party is selected according to determinant size.

The configuration of a mobile communication system according to this embodiment is the same as that of the mobile communication system shown in FIG. 20, and therefore a description thereof is omitted. Also, the principal-part configurations of a multi-antenna communication apparatus 2100 and base station apparatus 2200 according to this embodiment are the same as those of multi-antenna communication communication apparatus 2100 and base station apparatus 2200 shown in FIG. 21 and FIG. 24, and therefore descriptions thereof are omitted.

In this embodiment, only the internal configurations of connected cell reception processing section 2105 and monitored cell reception processing section 2106 in multi-antenna communication apparatus 2100 differ from those in Embodiment 7. Therefore, the internal configurations of connected cell reception processing section 2105 and monitored cell reception processing section 2106 will be described.

Figure 29:
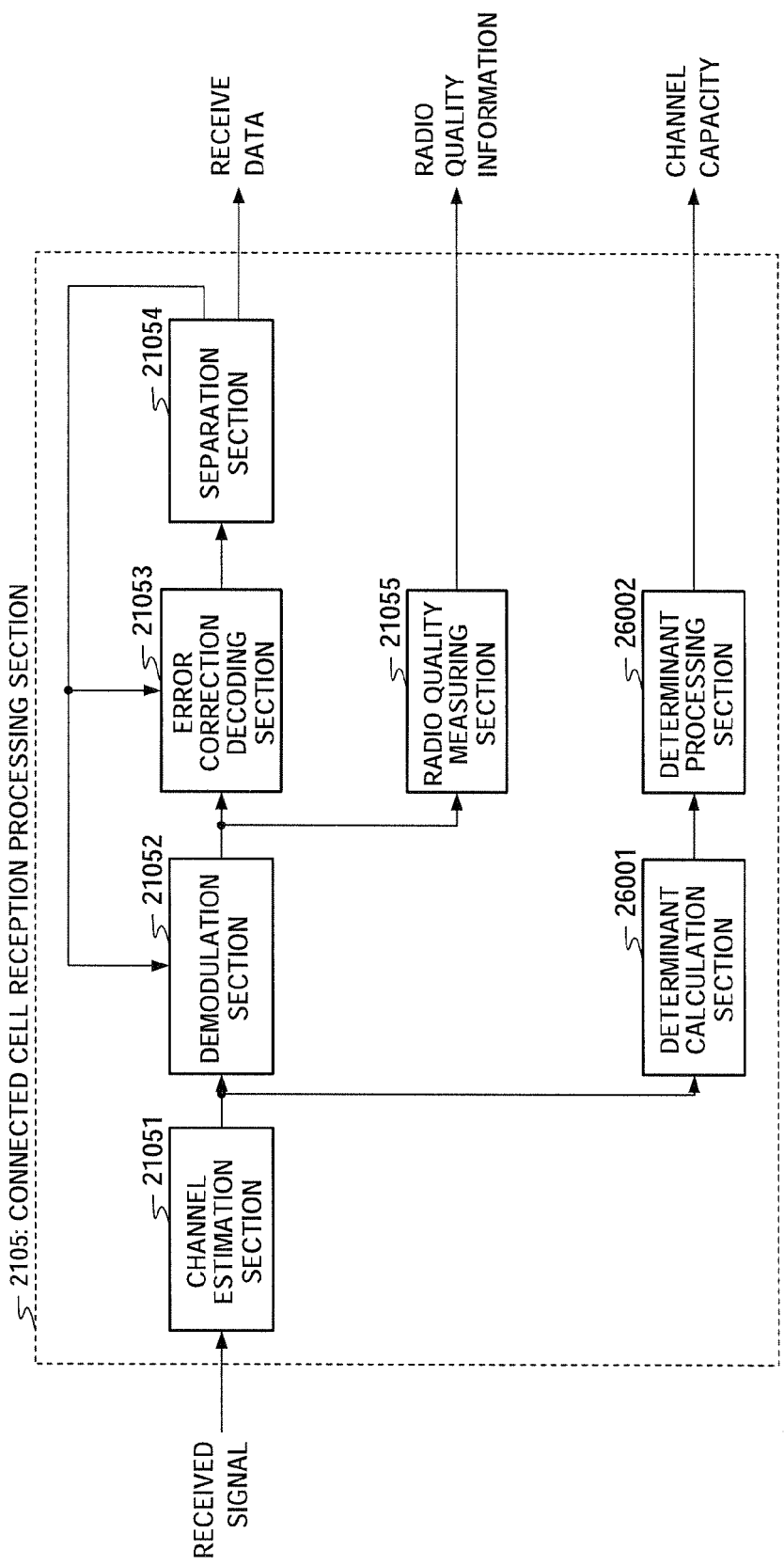
FIG. 29 is a block diagram showing the internal configuration of a connected cell reception processing section according to Embodiment 9 of the present invention.

FIG. 29 is a block diagram showing the internal configuration of connected cell reception processing section 2105 according to this embodiment. Parts in FIG. 29 identical to those in FIG. 22 are assigned the same codes as in FIG. 22, and descriptions thereof are omitted. Connected cell reception processing section 2105 shown in FIG. 29 employs a configuration that has a determinant calculation section 26001 and a determinant processing section 26002 instead of singular value processing section 21056 and channel capacity calculation section 21057 in FIG. 22.

Determinant calculation section 26001 calculates determinants per independent path in a connected cell for all sampling timings, using channel matrix $A_i$ for connected cell sampling timing i. Specifically, determinant calculation section 26001 calculates a determinant $C_i$, which is an indicator of reception quality per independent path of the connected cell, by means of Equation (9) below.

[9]

$$C_i = \log_2 \det\left(I_{M_R} + \frac{Y}{M_T} A_i A_i^H\right) \qquad (9)$$

where, $Y = CNR$ (Carrier to Noise Ratio)

In Equation (9) above, det( ) indicates a determinant, and $I_{M_R}$ indicates a unit matrix of size $M_R \times M_R$. Determinant $C_i$ found by means of Equation (9) is a scalar quantity found for each sampling timing, and is a numeric value that indicates the sum of reception qualities of independent paths in MIMO communication. Therefore, the larger the number of independent paths with high reception quality in a cell, the larger is the value of determinant $C_i$, and a cell with a larger determinant $C_i$ has proportionally higher throughput.

Determinant processing section 26002 processes determinants $C_i$ found for each sampling timing, calculates a determinant representing the connected cell, and takes this as the channel capacity of the connected cell. That is to say, determinant processing section 26002 calculates a determinant C representing the connected cell by, for example, dividing the sum of all determinants $C_i$ through $C_N$ found for N sampling timings 1 through N by the number of sampling timings N to obtain an average value. Since, as explained above, if calculated determinant C is large, the reception quality of connected cell independent paths is high, and the cell is suitable for MIMO communication, determinant processing section 26002 outputs determinant C to cell selection section 2107 as the channel capacity of the connected cell.

Figure 30:
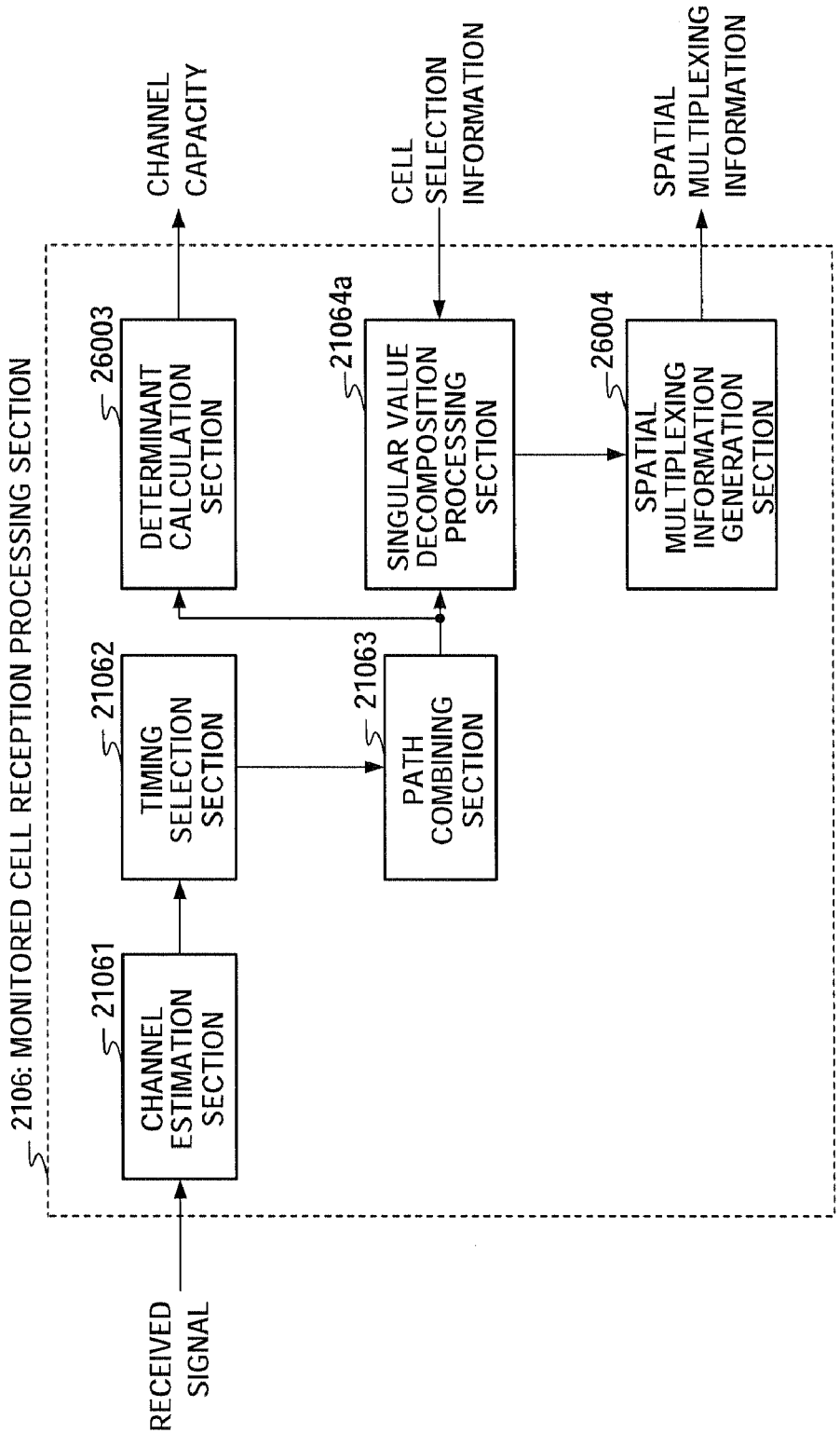
FIG. 30 is a block diagram showing the internal configuration of a monitored cell reception processing section according to Embodiment 9.

FIG. 30 is a block diagram showing the internal configuration of monitored cell reception processing section 2106 according to this embodiment. Parts in FIG. 30 identical to those in FIG. 23 are assigned the same codes as in FIG. 23, and descriptions thereof are omitted. Monitored cell reception processing section 2106 shown in FIG. 30 employs a configuration that has a singular value decomposition processing section 21064a and a determinant calculation section 26003 instead of singular value decomposition processing section 21064 and channel capacity calculation section 21065 in FIG. 23, and additionally includes a spatial multiplexing information generation section 26004.

Determinant calculation section 26003 performs Equation (9) computation in the same way as for the connected cell, using a channel matrix output from path combining section 21063, and calculates a determinant relating only to a sampling timing selected by timing selection section 21062 as monitored cell channel capacity.

Only when the monitored cell has been selected as the connected cell for the next time unit as a result of a comparison of connected cell and monitored cell channel capacities by cell selection section 2107, singular value decomposition processing section 21064a performs singular value decomposition processing by means of Equation (8), and calculates singular values per independent path only for a sampling timing selected by timing selection section 21062. That is to say, singular value decomposition processing section 21064a refers to the cell selection information output from cell selection section 2107, and performs singular value decomposition processing to determine reception quality per independent path only when the monitored cell becomes the connected cell.

When singular value decomposition processing is performed by singular value decomposition processing section 21064a, spatial multiplexing information generation section 26004 generates spatial multiplexing information indicating whether MIMO communication or STC (Space Time Coding) communication is to be performed according to the result of singular value decomposition processing.

In MIMO communication, different data sequences are transmitted simultaneously from a plurality of antennas, whereas in STC communication, the same data sequence is transmitted simultaneously from a plurality of antennas. Therefore, even if reception quality per independent path of a connected cell selected by means of determinant comparison is comparatively low, and it is considered that MIMO communication cannot be performed, degradation of reception quality can be prevented, and diversity gain obtained, by switching to STC communication.

In this embodiment, determinant computation—which involves a much smaller processing load than singular value decomposition processing—is performed in the monitored cell channel capacity calculation used in cell selection. Also, since singular value decomposition processing is performed only when the monitored cell is selected as the connected cell in the next time unit, the processing load can be reduced even more than in the case of Embodiment 7, in which singular value decomposition processing is always necessary for monitored cell channel capacity calculation.

Figure 31:
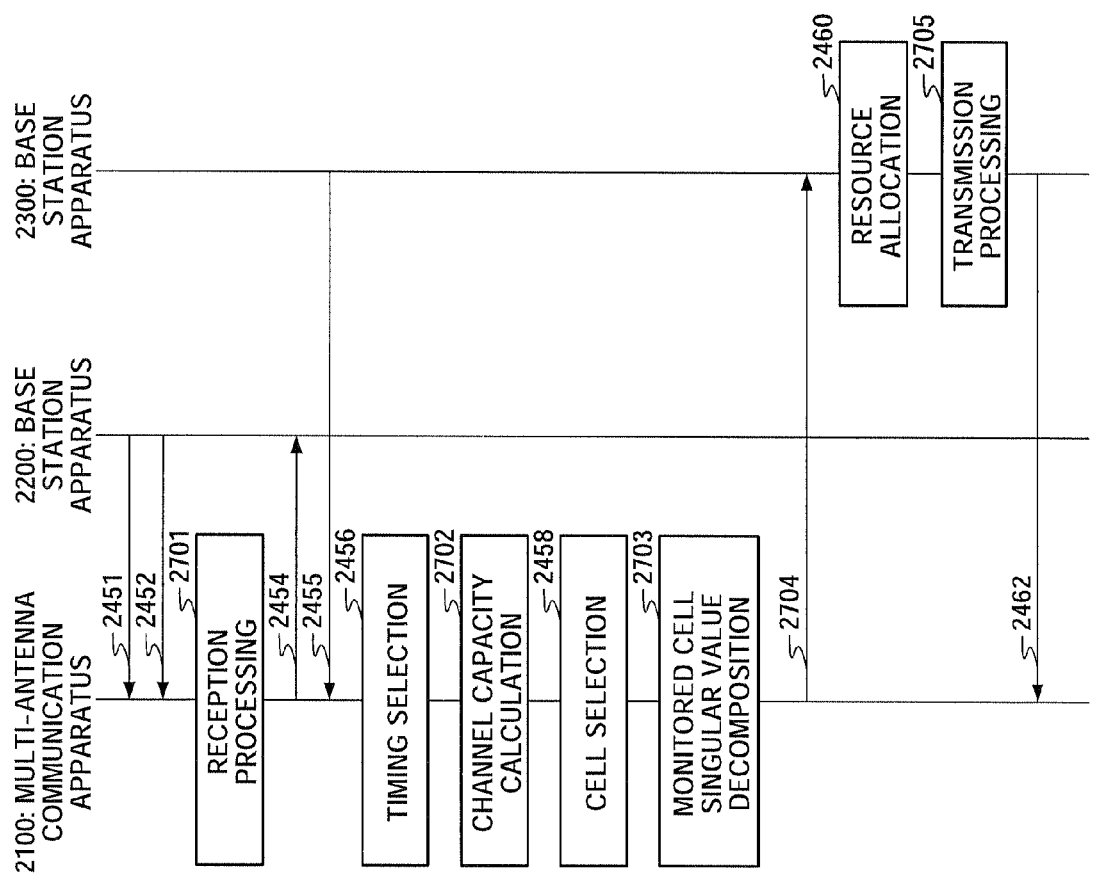
FIG. 31 is a sequence diagram showing a cell selection operation by a multi-antenna communication apparatus during communication.

Cell selection by multi-antenna communication apparatus 2100 configured as described above will now be explained with reference to the sequence diagram shown in FIG. 31. In this embodiment, operation when multi-antenna communication apparatus 2100 is communicating with base station apparatus 2200 as the selected base station apparatus (that is, when cell 2200a is the connected cell and cell 2300a is a monitored cell) will be described. Parts in FIG. 31 identical to those in FIG. 25B are assigned the same codes as in FIG. 25B, and detailed descriptions thereof are omitted. When multi-antenna communication apparatus 2100 has made cell 2200a the connected cell, common pilot signal 2451 and dedicated data signal 2452 from base station apparatus 2200 are sampled at predetermined sampling timing by RF receiving sections 2101-1 and 2101-2 of multi-antenna communication apparatus 2100.

The received signals obtained by sampling pass through despreading sections 2103-1 and 2103-2, whereby despread signals destined for that apparatus (multi-antenna communication apparatus 2100) are extracted.

The despread signals are separated into connected cell and monitored cell signals by cell separation section 2104. Here, the signal from cell 2200a, the connected cell, is output to connected cell reception processing section 2105, where connected cell signal reception processing is performed (2701).

That is to say, channel matrixes per sampling timing are found by channel estimation section 21051, and the received signal is demodulated by demodulation section 21052 using the modulation method allocated to multi-antenna communication apparatus 2100 in base station apparatus 2200. A demodulated dedicated data signal undergoes error correction decoding by error correction decoding section 21053 using the coding rate allocated to multi-antenna communication apparatus 2100 in base station apparatus 2200, and is separated into receive data and radio resource information by separation section 21054.

In parallel with these processing steps, the channel matrixes found by channel estimation section 21051 are output to determinant calculation section 26001, determinants per sampling timing are calculated by determinant calculation section 26001, determinants per sampling timing are processed by determinant processing section 26002, and a determinant representing the connected cell, such as the average of determinants per sampling timing, for example, is calculated. The calculated determinant is output to cell selection section 2107 as the channel capacity of the connected cell. This concludes the connected cell signal reception processing.

The common pilot signal output from demodulation section 21052 to radio quality measuring section 21055 is used for measurement of the radio quality of cell 2200a, the connected cell, and radio quality information is generated by radio quality measuring section 21055. The generated radio quality information may be multiplexed with a reception confirmation response or the like, and transmitted to base station apparatus 2200 as reception confirmation response signal 2454.

Meanwhile, common pilot signal 2455 transmitted from base station apparatus 2300 of cell 2300a, the monitored cell, is received on a non-periodical basis by RF receiving sections 2101-1 and 2101-2 and passes through despreading sections 2103-1 and 2103-2, whereby despread signals destined for that apparatus (multi-antenna communication apparatus 2100) are extracted.

The despread signals are separated into connected cell and monitored cell signals by cell separation section 2104. Here, the signal from cell 2300a, the monitored cell, is output to channel estimation section 21061 of monitored cell reception processing section 2106.

Then sampling timings at which the total received power is greater than or equal to a predetermined threshold value are selected by timing selection section 21062 (2456) in the same way as in Embodiment 7.

The selected sampling timings are reported to path combining section 21063, and a channel matrix when signals of paths corresponding to the selected sampling timings are combined is found by path combining section 21063. The obtained channel matrix is output to determinant calculation section 26003 and singular value decomposition processing section 21064a.

Equation (9) computation is performed by determinant calculation section 26003 using the channel matrix output from path combining section 21063, and a cell 1300a determinant is found (2702). The obtained determinant is output to cell selection section 2107 as the monitored cell channel capacity, whichever of cell 2200a and cell 2300a has the larger channel capacity is selected as the connected cell for the next time unit (2458), and the base station apparatus corresponding to the connected cell becomes the selected base station apparatus. Cell selection information relating to the cell selected as the connected cell is then output by cell selection section 2107 to singular value decomposition processing section 21064a and multiplexing section 2108. It will be assumed here that cell 2300a has been selected as the connected cell, and base station apparatus 2300 has become the selected base station apparatus.

When cell selection information indicating that cell 2300a, which was previously the monitored cell, has been selected as the connected cell is output to singular value decomposition processing section 21064a, singular value decomposition processing is performed by singular value decomposition processing section 21064a by means of Equation (8) using the channel matrix output from path combining section 21063. If cell 2200a had again been selected as the connected cell, singular value decomposition processing would not be performed.

If the result of singular value decomposition processing shows that the number of singular values greater than a predetermined threshold value exceeds a predetermined number, it is determined by spatial multiplexing information generation section 26004 that MIMO communication is possible in cell 2300a, and spatial multiplexing information indicating that MIMO communication is to be performed is generated. On the other hand, if the number of singular values greater than the predetermined threshold value is less than the predetermined number, it is determined by spatial multiplexing information generation section 26004 that it is better to perform STC communication in cell 2300a, and spatial multiplexing information indicating that STC communication is to be performed is generated. The generated spatial multiplexing information is output to multiplexing section 2108 via cell selection section 2107.

When cell selection information is input to multiplexing section 2108, transmit data, cell selection information, and spatial multiplexing information are multiplexed by multiplexing section 2108, and multiplexed data is generated. The multiplexed data then passes via error correction coding section 2109 through RF transmitting sections 2112-1 and 2112-2, and a spread signal 2704 containing transmit data, cell selection information, and spatial multiplexing information is transmitted via the antennas. In FIG. 31 no signal is transmitted to non-selected base station apparatus 2200, but cell selection information may also be transmitted to base station apparatus 2200.

Spread signal 2704 transmitted from multi-antenna communication apparatus 2100 is received by RF receiving sections 2201-1 and 2201-2 of base station apparatus 2300 via the antennas. Then the received signals pass through despreading sections 2203-1 and 2203-2, whereby despread signals destined for that apparatus (base station apparatus 2300) are extracted.

The despread signals are demodulated by demodulation section 2204, undergo error correction decoding by error correction decoding section 2205, and are separated into transmit data, cell selection information, and spatial multiplexing information by separation section 2206. Then, when the cell selection information and the spatial multiplexing information are output to resource allocation section 2207, it is determined by resource allocation section 2207 that that apparatus (base station apparatus 2300) has become the selected base station apparatus of multi-antenna communication apparatus 2100, and radio resources such as modulation method and coding rate to be allocated to transmit data destined for multi-antenna communication apparatus 2100 are determined (2460). In this embodiment, the spatial multiplexing information is referred to when determining radio resources, and whether MIMO communication or STC communication is to be performed is considered. Information on the determined radio resources is output to transmission control section 2208, and transmission processing of a signal destined for multi-antenna communication apparatus 2100 is started (2705).

That is to say, transmit data destined for multi-antenna communication apparatus 2100, and radio resource information indicating the coding rate and modulation method to be allocated to multi-antenna communication apparatus 2100, are output by transmission control section 2208 to multiplexing section 2209. Also, whether MIMO communication or STC communication spatial multiplexing is to be performed is determined by transmission control section 2208 in accordance with the spatial multiplexing information.

Then transmit data destined for multi-antenna communication apparatus 2100 and radio resource information are multiplexed by multiplexing section 2209, and multiplexed data is generated. The multiplexed data then undergoes error correction coding by error correction coding section 2210 and is modulated by modulation section 2211, and modulated data is obtained.

The modulated data is transmitted from the antennas as a dedicated data signal 2462 after passing via spreading sections 2212-1 and 2212-2 through RF transmitting sections 2113-1 and 2113-2. At this time, dedicated data signal 2462 is transmitted by means of MIMO communication or STC communication according to the spatial multiplexing information.

A signal transmitted from base station apparatus 2300, the selected base station apparatus, in this way is received by multi-antenna communication apparatus 2100, and receive data is obtained by means of reception processing by connected cell reception processing section 2105.

Thus, according to this embodiment, a determinant is found for a sampling timing at which the total received power is greater than or equal to a predetermined threshold value among sampling timings of a common pilot signal transmitted from a base station apparatus that is not the communicating party, this determinant is taken as the channel capacity, and the base station apparatus with the largest channel capacity is made the selected base station apparatus. Consequently, an increase in the processing load due to singular value decomposition processing for high-speed cell selection can be minimized, high-speed cell selection can be executed while preventing an increase in circuit scale, throughput can be dependably improved, and cell coverage can be enlarged. Also, in cell selection, the processing load can be reduced to a greater extent than when singular value decomposition processing is always performed.

In above Embodiments 7 through 9, it has been assumed that sampling timing used for channel capacity calculation is selected using the total received power at all antennas on the transmitting and receiving sides, but total received power limited to the transmitting-side or receiving-side antennas may also be used. That is to say, for example, one transmitting-side antenna may be decided upon, and sampling timing selected using only the received power from that antenna. This enables the cell selection processing load to be further reduced.

A multi-antenna communication apparatus according to a first aspect of Embodiments 7 through 9 employs a configuration that includes: a receiving section that samples a signal of a connected cell covered by the communicating party in the present time unit and a signal of a monitored cell adjacent to the connected cell at predetermined sampling timing via a plurality of antennas; a first calculation section that calculates the channel capacity of the connected cell using a signal of the connected cell; a timing selection section that selects one or more sampling timings from a plurality of sampling timings at which a signal of the monitored cell is sampled; a second calculation section that calculates the channel capacity of the monitored cell using a selected sampling timing; and a cell selection section that compares the channel capacity of the connected cell with the channel capacity of the monitored cell, and selects the cell with the larger channel capacity as the connected cell in the next time unit.

According to this configuration, since the channel capacity of the connected cell is calculated, one or more sampling timings are selected from monitored cell signal sampling timings and the channel capacity of the monitored cell is calculated, and the cell with the larger channel capacity is made the connected cell, the amount of processing necessary for monitored cell channel capacity calculation can be reduced, high-speed cell selection can be executed while preventing an increase in circuit scale, throughput can be dependably improved, and cell coverage can be enlarged.

A multi-antenna communication apparatus according to a second aspect of Embodiments 7 through 9 employs a configuration wherein, in the above-described first aspect, the timing selection section selects a sampling timing at which received power is greater than or equal to a predetermined threshold value among the plurality of sampling timings.

According to this configuration, since a sampling timing at which received power is greater than or equal to a predetermined threshold value is selected, a sampling timing at which received power is absolutely large rather than relatively large can be selected, and monitored cell channel capacity can be calculated more accurately.

A multi-antenna communication apparatus according to a third aspect of Embodiments 7 through 9 employs a configuration wherein, in the above-described first aspect, the timing selection section selects a sampling timing at which received power is largest among the plurality of sampling timings.

According to this configuration, since a sampling timing at which received power is largest is selected, a channel matrix used in channel capacity calculation is found accurately, and monitored cell channel capacity can be calculated accurately.

A multi-antenna communication apparatus according to a fourth aspect of Embodiments 7 through 9 employs a configuration wherein, in the above-described first aspect, the timing selection section selects a predetermined number of sampling timings from those with large received power among the plurality of sampling timings.

According to this configuration, since a predetermined number of sampling timings are selected from those with large received power, the number of sampling timings subject to channel capacity calculation is always constant, and sampling timings are selected dependably even if received power is low overall.

A multi-antenna communication apparatus according to a fifth aspect of Embodiments 7 through 9 employs a configuration wherein, in the above-described first aspect, the timing selection section selects a sampling timing according to received power at any one of the plurality of antennas.

According to this configuration, since a sampling timing is selected according to received power at one antenna, the amount of computation in received power calculation and so forth is reduced, and the processing load necessary for cell selection can be further reduced.

A multi-antenna communication apparatus according to a sixth aspect of Embodiments 7 through 9 employs a configuration wherein, in the above-described first aspect, the first calculation section has: a singular value decomposition processing section that performs singular value decomposition processing for a plurality of sampling timings at which a signal of the connected cell is sampled, and finds a singular value indicating channel quality per independent path in the connected cell every number of the plurality of sampling timings per independent path; a singular value processing section that executes predetermined processing on a found singular value, and obtains one singular value per independent path in the connected cell; and a channel capacity calculation section that calculates as the channel capacity of the connected cell the number of singular values greater than or equal to a predetermined threshold value among singular values per independent path in the connected cell obtained by the singular value processing section.

A multi-antenna communication apparatus according to a seventh aspect of Embodiments 7 through 9 employs a configuration wherein, in the above-described first aspect, the second calculation section has: a singular value decomposition processing section that performs singular value decomposition processing for the selected sampling timing, and finds one singular value indicating channel quality per independent path in the monitored cell; and a channel capacity calculation section that calculates as the channel capacity of the monitored cell the number of singular values greater than or equal to a predetermined threshold value among singular values per independent path in the monitored cell.

According to these configurations, since singular values per independent path are found from singular value decomposition processing results, and the number of singular values greater than or equal to a predetermined threshold value is taken as the cell channel quality, the larger the number of independent paths with high reception quality in a cell, the larger is the channel capacity. Therefore, the larger the channel capacity of a cell, the more suitable it is for MIMO communication, enabling a cell that allows throughput to be dependably improved to be selected.

A multi-antenna communication apparatus according to an eighth aspect of Embodiments 7 through 9 employs a configuration wherein, in the above-described first aspect, the first calculation section has: a determinant calculation section that performs computation on a plurality of sampling timings at which a signal of the connected cell is sampled, and calculates a determinant indicating the sum of channel qualities per independent path in the connected cell every number of the plurality of sampling timings per independent path; and a determinant processing section that executes predetermined processing on a calculated determinant, and obtains one determinant per independent path in the connected cell as the channel capacity of the connected cell.

A multi-antenna communication apparatus according to a ninth aspect of Embodiments 7 through 9 employs a configuration wherein, in the above-described first aspect, the second calculation section has a determinant calculation section that performs computation for the selected sampling timing, and calculates one determinant per independent path in the monitored cell as the channel capacity of the monitored cell.

According to these configurations, since a determinant indicating the sum of channel qualities per independent path is taken as the cell channel quality, the larger the sum of channel qualities per independent path of a cell, the larger is the channel capacity. Therefore, a cell suitable for MIMO communication can be selected without performing singular value decomposition processing, and the processing load necessary for cell selection can be reduced.

A multi-antenna communication apparatus according to a tenth aspect of Embodiments 7 through 9 employs a configuration wherein, in the above-described ninth aspect, there are further provided: a singular value decomposition processing section that, when a monitored cell in the present time unit is selected as a connected cell in the next time unit by the cell selection section, performs singular value decomposition processing for a sampling timing selected by the timing selection section, and finds one singular value per independent path in the monitored cell; and a generation section that generates spatial multiplexing information indicating that MIMO communication is to be performed if the number of singular values greater than or equal to a predetermined threshold value among singular values per independent path in the monitored cell is greater than or equal to a predetermined number, and generates spatial multiplexing information indicating that STC communication is to be performed if the number of singular values greater than or equal to a predetermined threshold value is less than a predetermined number.

According to this configuration, since singular value decomposition processing is performed only if a monitored cell becomes a connected cell as a result of determinant comparison, and spatial multiplexing information indicating whether MIMO communication or STC communication is to be performed is generated based on this result, the processing load can be reduced by performing singular value decomposition processing only when necessary, degradation of reception quality can be prevented even when MIMO communication is not possible, and diversity gain can be obtained.

A cell selection method according to a first aspect of Embodiments 7 through 9 includes: a step of sampling a signal of a connected cell covered by the communicating party in the present time unit and a signal of a monitored cell adjacent to the connected cell at predetermined sampling timing via a plurality of antennas; a step of calculating the channel capacity of the connected cell using a signal of the connected cell; a step of selecting one or more sampling timings from a plurality of sampling timings at which a signal of the monitored cell is sampled; a step of calculating the channel capacity of the monitored cell using a selected sampling timing; and a step of comparing the channel capacity of the connected cell with the channel capacity of the monitored cell, and selecting the cell with the larger channel capacity as the connected cell in the next time unit.

According to this method, since the channel capacity of the connected cell is calculated, one or more sampling timings are selected from monitored cell signal sampling timings and the channel capacity of the monitored cell is calculated, and the cell with the larger channel capacity is made the connected cell, the amount of processing necessary for monitored cell channel capacity calculation can be reduced, high-speed cell selection can be executed while preventing an increase in circuit scale, throughput can be dependably improved, and cell coverage can be enlarged.

The present application is based on Japanese Patent Application No. 2004-319478 filed on Nov. 2, 2004, Japanese Patent Application No. 2004-325230 filed on Nov. 9, 2004, Japanese Patent Application No. 2004-325231 filed on Nov. 9, 2004, and Japanese Patent Application No. 2005-8652 filed on Jan. 17, 2005, entire content of which is expressly incorporated herein by reference.

INDUSTRIAL APPLICABILITY

The present invention enables throughput in a handover area to be dependably improved, and cell coverage to be enlarged, in MIMO communication, and is useful for a mobile station apparatus and communicating party selection method that select a base station apparatus or antenna that becomes a communicating party in a system to which MIMO communication is applied or the like, for example.

Also, the present invention enables high-speed cell selection to be executed while preventing an increase in circuit scale, throughput to be dependably improved, and cell coverage to be enlarged, when MIMO communication and multicarrier communication are combined, and is useful for a mobile station apparatus and communicating party selection method that select the cell of a base station apparatus that becomes a communicating party in a short time cycle, such as a slot, for example.

The invention claimed is:

1. A mobile station apparatus that selects a communicating party in a mobile communication system to which MIMO communication is applied, the mobile station apparatus comprising:
   a receiving section that receives signals transmitted from a plurality of communicating party candidates;
   a channel estimation section that performs channel estimation per communicating party candidate using the received signals;
   a channel capacity calculation section that calculates a determinant of a matrix based on a channel matrix obtained by way of the channel estimation as channel capacity per communicating party candidate; and
   a selection section that selects a communicating party candidate whose acquired channel capacity is largest as a communicating party, wherein:
   the channel capacity calculation section, during a wait to communicate, calculates the determinant of the matrix based on the channel matrix as the channel capacity per communicating party candidate, and after communication starts, calculates singular values per path from a result of the channel estimation and takes a number of singular values greater than or equal to a predetermined threshold value, as channel capacity per communicating party candidate.

2. The mobile station apparatus according to claim 1, wherein the selection section selects a communicating party in a slot cycle.

3. A mobile station apparatus that selects a communicating party in a mobile communication system to which MIMO communication is applied, the mobile station apparatus comprising:
   a receiving section that receives signals transmitted from a plurality of communicating party candidates;
   a reception quality measuring section that measures reception quality of the received signals;
   a channel capacity calculation section that calculates channel capacity by performing singular value decomposition processing of the received signals; and
   a selection section that selects a communicating party from the plurality of communicating party candidates, wherein:
   the receiving section receives MIMO application or non-application information indicating whether or not the plurality of communicating party candidates perform MIMO communication; and
   the selection section selects a communicating party candidate whose channel capacity is largest as a communicating party using the calculated channel capacity, when all of the plurality of communicating party candidates perform MIMO communication, but selects a communicating party candidate whose reception quality is highest as a communicating party using the measured reception quality, when one communicating party candidate does not perform MIMO communication.

4. The mobile station apparatus according to claim 3, wherein the selection section selects a communicating party in a slot cycle.

5. A communicating party selection method that selects a communicating party in a mobile communication system to which MIMO communication is applied, the method comprising:
   receiving signals transmitted from a plurality of communicating party candidates;
   performing channel estimation per communicating party candidate using the received signals;
   during a wait to communicate, calculating a determinant of a matrix based on a channel matrix obtained by way of the channel estimation as channel capacity per communicating party candidate, and after communication starts, calculating singular values per path from a result of the channel estimation and taking a number of singular values greater than or equal to a predetermined threshold value, as channel capacity per communicating party candidate; and
   selecting a communicating party candidate whose acquired channel capacity is largest as a communicating party.

6. A communicating party selection method that selects a communicating party in a mobile communication system to which MIMO communication is applied, the method comprising:
   receiving signals transmitted from a plurality of communicating party candidates, and MIMO application or non-application information indicating whether or not the plurality of communicating party candidates perform MIMO communication;
   measuring reception quality of the received signals;
   calculating channel capacity by performing singular value decomposition processing of the received signals; and
   selecting a communicating party candidate whose channel capacity is largest as a communicating party using the calculated channel capacity, when all of the plurality of communicating party candidates perform MIMO communication, but selecting a communicating party candidate whose reception quality is highest as a communicating party using the measured reception quality, when one communicating party candidate does not perform MIMO communication.

* * * * *

UNITED STATES PATENT AND TRADEMARK OFFICE
CERTIFICATE OF CORRECTION

PATENT NO. : 7,843,887 B2  
APPLICATION NO. : 11/718371  
DATED : November 30, 2010  
INVENTOR(S) : Hiroki Haga et al.

Page 1 of 1

It is certified that error appears in the above-identified patent and that said Letters Patent is hereby corrected as shown below:

On the Title Page,  
Item (75), lines 1-4, incorrectly reads:  
"(75) Inventors: Hiroki Haga, Kanagawa (JP); Masayuki  
Hoshino, Osaka (JP); Katsuhiko  
Hiramatsu, Osaka (JP); Atsushi  
Sumasu, Osaka (JP)"  
and should read:  
"(75) Inventors: Hiroki Haga, Kanagawa (JP); Masayuki  
Hoshino, Kanagawa (JP); Katsuhiko  
Hiramatsu, Kanagawa (JP); Atsushi  
Sumasu, Kanagawa (JP)"

Signed and Sealed this  
Twenty-first Day of February, 2012

David J. Kappos  
*Director of the United States Patent and Trademark Office*